(12) United States Patent
Zhang et al.

(10) Patent No.: US 12,410,273 B2
(45) Date of Patent: Sep. 9, 2025

(54) COMB-BLOCK COPOLYMERS AND METHODS THEREOF

(71) Applicant: ExxonMobil Chemical Patents Inc., Baytown, TX (US)

(72) Inventors: Shanshan Zhang, Houston, TX (US); Peijun Jiang, Katy, TX (US); Ying Ying Sun, Shanghai (CN); Yujie Sheng, Shanghai (CN); Saifudin M. Abubakar, Shanghai (CN); Guangdi Chen, Shanghai (CN); Hongchao Wang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 540 days.

(21) Appl. No.: 17/905,222

(22) PCT Filed: Mar. 15, 2021

(86) PCT No.: PCT/US2021/022358
§ 371 (c)(1),
(2) Date: Aug. 29, 2022

(87) PCT Pub. No.: WO2021/202091
PCT Pub. Date: Oct. 7, 2021

(65) Prior Publication Data
US 2023/0118464 A1    Apr. 20, 2023

Related U.S. Application Data

(60) Provisional application No. 63/001,828, filed on Mar. 30, 2020, provisional application No. 63/001,842, filed on Mar. 30, 2020.

(51) Int. Cl.
*C08F 293/00* (2006.01)
*C08L 53/00* (2006.01)

(52) U.S. Cl.
CPC .......... *C08F 293/00* (2013.01); *C08L 53/00* (2013.01); *C08F 2420/09* (2021.01)

(58) Field of Classification Search
None
See application file for complete search history.

(56) References Cited

U.S. PATENT DOCUMENTS

| | | | |
|---|---|---|---|
| 8,071,681 B2 | 12/2011 | Iyer et al. | |
| 8,273,826 B2 | 9/2012 | Walton et al. | |
| 8,557,921 B2 | 10/2013 | Arriola et al. | |
| 8,907,034 B2 | 12/2014 | Hustad et al. | |
| 9,309,391 B2 | 4/2016 | Dabbous et al. | |
| 10,138,320 B2 | 11/2018 | Tsou et al. | |
| 10,246,542 B2 | 4/2019 | Tsou et al. | |
| 10,364,308 B2 | 7/2019 | Chen et al. | |
| 10,781,278 B2 | 9/2020 | Tsou et al. | |
| 2002/0038664 A1 | 4/2002 | Zenko et al. | |
| 2002/0190818 A1 | 12/2002 | Endou et al. | |
| 2003/0222100 A1 | 12/2003 | Husband et al. | |
| 2005/0137369 A1 | 6/2005 | Baugh et al. | |
| 2005/0197460 A1 | 9/2005 | Patel et al. | |
| 2006/0128505 A1 | 6/2006 | Sullivan et al. | |
| 2006/0214331 A1 | 9/2006 | Jacobs | |
| 2006/0247379 A1 | 11/2006 | Patel et al. | |
| 2006/0281588 A1 | 12/2006 | Sullivan et al. | |
| 2007/0237922 A1 | 10/2007 | Miyakawa | |
| 2008/0217201 A1 | 9/2008 | Keller et al. | |
| 2008/0312393 A1 | 12/2008 | Baugh et al. | |
| 2011/0082249 A1* | 4/2011 | Shan ................. | C08L 23/00 524/505 |

(Continued)

FOREIGN PATENT DOCUMENTS

| | | |
|---|---|---|
| CN | 1903917 | 1/2007 |
| CN | 101812732 | 8/2010 |

(Continued)

OTHER PUBLICATIONS

Lopez-Barron, Carlos R., et al., "Supporting Information for Strain Hardening of Polyethylene/Polypropylene Blends via Interfacial Reinforcement with Poly(ethylene-cb--propylene) Comb Block Copolymers," Macromolecules, (2017), pp. 2986-2995, vol. 50, Baytown, TX.

Lu, Ying., et al., "Influence of Propylene-Based Elastomer on Stress-Whitening for Impact Copolymer," Journal of Applied Polymer Science, (2017), pp. 1-9, vol. 134(20), Wiley Periodicals, Inc.

Jang, Hee Jung, et al., "Morphology and Stress Whitening of Heterophasic Poly(propylene) Copolymer/High Density Polyethylene Blends," Macromolecular Symposia, (2012), pp. 34-42, vol. 312(1), Weinheim.

Qiu, Biwei et al. "Simultaneously Enhancing Strength and Toughness for Impact Polypropylene Copolymers by Regulating the Dispersed Phase with High Density Polyethylene," RSC Adv., (2014), pp. 58999-59008, vol. 4(103).

(Continued)

*Primary Examiner* — Christopher M Rodd
(74) *Attorney, Agent, or Firm* — ExxonMobil Technology and Engineering Company

(57) ABSTRACT

The present disclosure relates to comb-block copolymers and methods thereof. In some embodiments, a copolymer includes a first block comprising an ethylene-propylene copolymer; and a second block comprising a high density polyethylene. In some embodiments, a polyethylene composition includes the copolymer and a branched vinyl/vinylidene-terminated high density polyethylene. In some embodiments, a process for producing a polyethylene composition includes polymerizing ethylene, at a temperature of at least 100° C., by introducing the ethylene to a first catalyst system having a first catalyst compound and a first activator to form a branched vinyl/vinylidene-terminated high density polyethylene. The process includes introducing the branched vinyl/vinylidene-terminated high density polyethylene to additional ethylene, propylene, and a second catalyst system having a second catalyst compound and a second activator. The process includes obtaining the polyethylene composition.

30 Claims, 6 Drawing Sheets

(56) References Cited

U.S. PATENT DOCUMENTS

| | | |
|---|---|---|
| 2011/0240064 A1 | 10/2011 | Wales et al. |
| 2011/0313107 A1 | 12/2011 | Shan et al. |
| 2011/0313108 A1 | 12/2011 | Shan et al. |
| 2012/0083575 A1* | 4/2012 | Hustad ............. C08F 210/16 502/155 |
| 2012/0097194 A1 | 4/2012 | McDaniel et al. |
| 2012/0157318 A1 | 6/2012 | Findlay et al. |
| 2013/0156995 A1 | 6/2013 | Crutchley et al. |
| 2013/0300027 A1 | 11/2013 | Jacobs |
| 2013/0316138 A1 | 11/2013 | Ikenaga et al. |
| 2014/0113112 A1 | 4/2014 | Klipmans et al. |
| 2016/0046087 A1 | 2/2016 | Jacobs |
| 2016/0257841 A1 | 9/2016 | Tang et al. |
| 2016/0262378 A1 | 9/2016 | Murasugi et al. |
| 2017/0037283 A1 | 2/2017 | Yamamoto et al. |
| 2017/0044404 A1 | 2/2017 | Yamamoto et al. |
| 2017/0073448 A1 | 3/2017 | Tsou et al. |
| 2017/0275409 A1 | 9/2017 | Tsou et al. |
| 2017/0275443 A1 | 9/2017 | Datta et al. |
| 2018/0051165 A1 | 2/2018 | Li Pi Shan et al. |
| 2018/0116211 A1 | 5/2018 | Murasugi et al. |
| 2018/0134816 A1 | 5/2018 | Canich et al. |
| 2018/0134827 A1 | 5/2018 | Hagadom et al. |
| 2018/0201698 A1 | 7/2018 | Hagadorn et al. |
| 2018/0208757 A1 | 7/2018 | Jiang et al. |
| 2018/0237662 A1 | 8/2018 | Widenbrant et al. |
| 2018/0244817 A1 | 8/2018 | Hagadorn et al. |
| 2018/0245332 A1 | 8/2018 | Widenbrant et al. |
| 2018/0251586 A1 | 9/2018 | Canich et al. |
| 2018/0281347 A1 | 10/2018 | Goss |
| 2018/0282533 A1 | 10/2018 | Jones et al. |
| 2018/0290433 A1 | 10/2018 | Gossi |
| 2018/0291177 A1 | 10/2018 | Komuro |
| 2018/0355130 A1 | 12/2018 | Mansour et al. |
| 2019/0055386 A1 | 2/2019 | Li Pi Shan et al. |
| 2019/0112407 A1 | 4/2019 | Wu et al. |
| 2019/0184690 A1 | 6/2019 | Parkinson et al. |
| 2019/0194370 A1* | 6/2019 | Tsou ................. C08F 290/042 |
| 2019/0218383 A1 | 7/2019 | Li Pi Shan et al. |

FOREIGN PATENT DOCUMENTS

| | | |
|---|---|---|
| CN | 102030871 | 10/2012 |
| CN | 109535323 | 8/2020 |
| WO | 1991/012285 | 8/1991 |
| WO | 2001/85839 | 11/2001 |
| WO | 2012134715 | 10/2012 |
| WO | 2017165009 | 9/2017 |

OTHER PUBLICATIONS

Tsou, Andy H., et al. "Processability-enhanced bimodal high-density polyethylene withcomb-branched high-density polyethylene," Journal of Applied Polymer Science, Nov. 7, 2017, pp. 1-7, vol. 135 (9), Wiley Periodicals, Inc.

* cited by examiner

COMB-BLOCK COPOLYMERS AND METHODS THEREOF

CROSS-REFERENCE TO RELATED APPLICATIONS

This application is a national stage application under 35 USC 371 of International Application No. PCT/US2021/022358 filed Mar. 15, 2021, which claims the benefit of priority to U.S. Ser. No. 63/001,828, filed Mar. 30, 2020 and U.S. Ser. No. 63/001,842, filed Mar. 30, 2020, the disclosure of each of which is incorporated herein by reference in its entirety.

FIELD

The present disclosure relates to comb-block copolymers, comb-block compositions and methods thereof.

BACKGROUND

Linear random copolymers (such as ethylene-propylene copolymers) can be elastomeric and are widely used in various end applications such as polymer molding & extrusion, flexible film applications, surface coatings, nonwoven fabrics, and adhesion applications. Elastomeric linear random copolymers can provide elasticity, softness, sealability, adhesion, toughness, cling and filler loading capability. However, elastomeric linear random copolymers have a limited performance window (e.g., low melting temperature and high glass transition temperature), which can limit the copolymers' body temperature elasticity, low temperature ductility, and use in injection molding. In addition, linear polyolefins are processed by melt extrusion and do not exhibit extensional flow hardening (a property useful for film blowing, thermoforming, extrusion casting, foaming, and blow molding).

There is a need for improved copolymers suitable for demanding high melt strength applications, low temperature applications, and or improved processability applications, such as foam applications (industrial, food packaging, construction, automotive), injection molding, and or compounding.

In addition, polypropylene (PP) is one of the most widely used thermoplastics in a variety of applications including packaging, automotive, consumer applications, cast films, and industrial applications, among others. In some applications, such as injection-molded and extruded automotive parts, it is beneficial to modify polypropylene and polypropylene copolymers in order to enhance strength and impact resistance. The most common way of increasing impact properties in PP, is the addition of elastomeric inclusions or other modifiers to the PP which promote plastic behavior and cavitation during a toughening phase. Although PP modified with elastomeric polymers exhibit improved toughness over neat PP, overall stiffness (e.g., as measured by flexural modulus) is often compromised.

For example, a polypropylene based impact copolymer (ICP) is typically a mixture of a continuous phase of a crystalline polypropylene polymer and a dispersed rubbery phase of a secondary polymer, e.g., an ethylene copolymer. ICPs are known for high impact properties and are commonly modified for further performance improvement for high impact applications. Modifiers used for ICPs include plastomers, elastomers, ethylene-butene copolymer, and rubbers like ethylene-propylene rubber. However, modified ICPs, like other modified polypropylene homopolymers and copolymers, have been found to increase toughness at the expense of stiffness when compared to its unmodified composition. Thus, there is a need to modify polypropylene, including impact copolymers, to increase toughness (impact strength) without significantly compromising stiffness properties (such as flexural strength).

Additionally, some applications of polypropylene, such as polypropylene films used in automotive, appliance, and rigid packaging, have aesthetic considerations. For example, consumers of products in a number of applications are often concerned when whitening occurs to the product when the material is stressed by bending or impact. Products produced by currently available polypropylene have failed to adequately address this phenomenon called "stress whitening." Thus, there is also a need to modify polypropylene, including impact copolymers, to reduce stress whitening of polypropylene films.

References for citing in an Information Disclosure Statement (37 C.F.R. 1.97(h)): E.P. Patent No.: 2,436,703; 2,057,205; 2,588,520; 2,588,520; C.N. Patent Nos.: CN109535323; CN102030871; CN101812732; CN1903917; PCT Publication No.: WO2017/58379 A1; WO1991/012285 A1; WO2001/85839; WO2006/020309 A1; U.S. Pat. Nos. 8,907,034; 8,273,826; 10,138,320; 10,246,542; 10,364,308;

U.S. Patent Publication Nos.: 2019/0218383; 2019/0184690; 2019/0112407; 2019/0055386; 2018/0291177; 2018/0282533; 2018/0251586; 2018/0244817; 2018/0208757; 2018/0201698; 2018/0134827; 2018/0134816; 2018/0116211; 2018/0051165; 2018/0355130; 2018/0290433; 2018/0281347; 2018/0245332; 2018/0162971; 2018/0237662; 2017/0275409; 2017/0073448; 2017/0044404; 2017/0037283; 2017/0275443; 2016/0257841; 2016/0262378; 2016/0046087; 2014/0113112; 2013/0316138; 2013/0300027; 2013/0156995; 2012/0157318; 2012/0097194; 2011/0313108; 2011/0313107; 2011/0240064; 2008/0312393; 20080217201; 2007/0237922; 2006/0214331; 2006/0281588; 2006/0247379; 2006/0128505; 2005/0197460; 2005/0137369; 2003/0222100; 2002/0190818; 2002/0038664; Non-Patent Publications: Lopez-Barron, Carlos R., et al. (2017) "Supporting Information for Strain Hardening of Polyethylene/Polypropylene Blends via Interfacial Reinforcement with Poly(ethylene-cb—propylene) Comb Block Copolymers," Macromolecules, v.50, 6 pages; Lu, Y., et al. (2017) "Influence of Propylene-Based Elastomer on Stress-Whitening for Impact Copolymer," Journal of Applied Polymer Science, v.134(20), 9 pgs.; Jang, H. et al. (2012), "Morphology and Stress Whitening of Heterophasic Poly(propylene) Copolymer/High Density Polyethylene Blends," Macromolecular Symposia, v.312(1), pp. 34-42; Qiu, B. et al. (2014) "Simultaneously Enhancing Strength and Toughness for Impact Polypropylene Copolymers by Regulating the Dispersed Phase with High Density Polyethylene," RSC Adv., v.4(103), pp. 58999-59008.

SUMMARY

The present disclosure relates to comb-block copolymers, compositions including a polypropylene and a comb-block polymer, and methods thereof.

In some embodiments, a copolymer includes a first block comprising an ethylene-propylene copolymer; and a second block comprising a high density polyethylene.

In some embodiments, a polyethylene composition includes the copolymer and a branched vinyl/vinylidene-terminated high density polyethylene.

In some embodiments, a process for producing a polyethylene composition includes polymerizing ethylene, at a temperature of at least 100° C., by introducing the ethylene to a first catalyst system having a first catalyst compound and a first activator to form a branched vinyl/vinylidene-terminated high density polyethylene. The process includes introducing the branched vinyl/vinylidene-terminated high density polyethylene to additional ethylene, propylene, and a second catalyst system having a second catalyst compound and a second activator. The process includes obtaining the polyethylene composition. The polyethylene composition includes a copolymer having a first block having an ethylene-propylene copolymer and a second block comprising a high density polyethylene. The composition has a branched vinyl/vinylidene-terminated high density polyethylene.

The present disclosure also provides for methods of producing a composition by blending a polypropylene polymer and a comb-block copolymer. In some embodiments, the polypropylene polymer is a homopolymer. In some embodiments, the polypropylene polymer is a copolymer of polypropylene.

DETAILED DESCRIPTION

Figure 1:
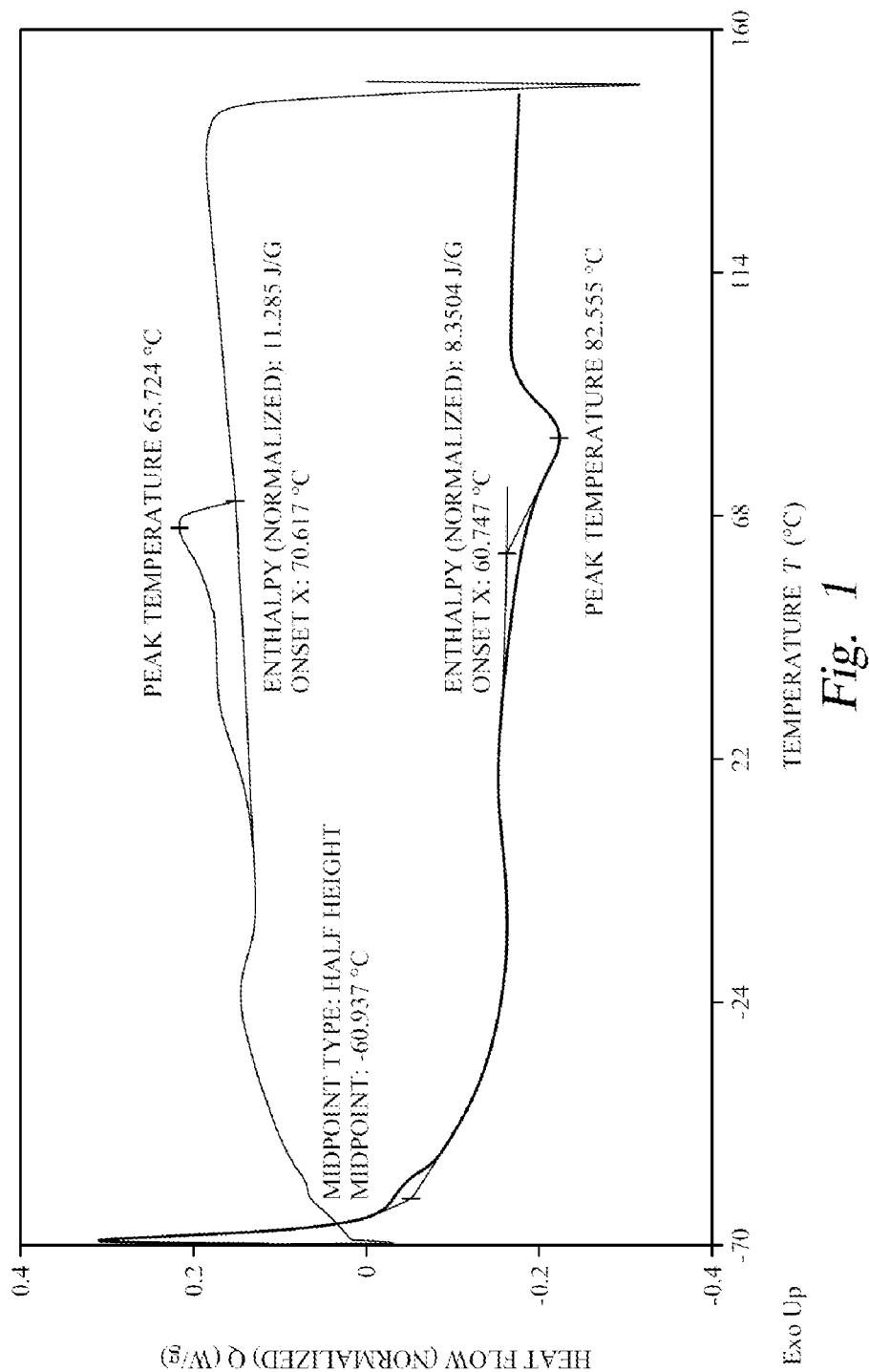
FIG. 1 is a differential scanning calorimetry curve of a comb-block ethylene-propylene copolymer, according to at least one embodiment.

The present disclosure relates to comb-block copolymers, compositions including a polypropylene and a comb-block copolymer and methods thereof. In at least one embodiment, a copolymer includes (1) a first block having an ethylene-propylene copolymer and (2) a second block having a high density polyethylene. The present disclosure further relates to compositions including the copolymer and a branched vinyl/vinylidene-terminated high density polyethylene. In some embodiments, the polypropylene polymer is a homopolymer. In some embodiments, the polypropylene polymer is a copolymer of propylene.

Copolymers and compositions of the present disclosure can provide one or more benefits over conventional comb-block polymers and or conventional compositions. For example, a composition having high density polyethylene (HDPE) and ethylene-propylene (EP) polymers is typically not miscible because the microstructure of HDPE differs substantially from the microstructure of EP. HDPE-EP copolymers of the present disclosure, however, can bring these different microstructures together into one molecule. So, for compatibilization applications and compounding applications, it has been discovered that a mixture of HDPE and EP would not work, while the comb microstructure of polymers of the present disclosure would work. Also, a composition of HDPE and EP polymers is still a composition of linear polymers. So, the conventional composition would not have high melt strength whereas an HDPE-PE comb-block copolymer does due to the comb-structure's long chain branching properties. The long chain branching properties can make the comb-block copolymers useful for, at least, foaming or thermoplastic olefin applications that involve high melt strength specifications. Also, the long chain branching properties of copolymers and compositions of the present disclosure can allow higher filler loading than a conventional mixture of HDPE and EP polymers. Additional filler/color loading provides improved master batch applications, improved heavy layer mat applications, etc.

The inventors have discovered processes for preparing comb-block ethylene-propylene copolymers having an ethylene-propylene backbone and HDPE side chains. The compositions can be prepared with a first catalyst precursor (a salan catalyst precursor) and an activator and then introduced to ethylene to form branched vinyl/vinylidene-terminated high density polyethylene. The branched vinyl/vinylidene-terminated high density polyethylene can be introduced to ethylene, propylene, and a second catalyst precursor and an activator to form a comb-block EP copolymer having an EP copolymer backbone and HDPE sidechains. Compositions and copolymers of the present disclosure can provide glass transition temperatures and melting temperatures that allow for applications in low temperature ductility, adhesion, compatibilization, compound modifiers, etc. In addition, the long chain branching of the comb-block EP copolymer (and compositions thereof) can provide high melt strength, which is beneficial for film blowing, thermoforming, extrusion casting, and foaming.

The inventors have further found that comb-block copolymer blended with one or more additional polymers improves a number of properties of the blends including impact properties and stress whitening, without significantly affecting stiffness properties. By way of example, a number of polypropylene polymers can be used in blends of the present disclosure, such as polypropylene homopolymers (hPP) and or copolymers of PP.

Definitions

For the purposes of this present disclosure and the claims thereto, the numbering scheme for the Periodic Table Groups is used as described in Chemical And Engineering News, v.63(5), pg. 27 (1985). Therefore, a "group 4 metal" is an element from group 4 of the Periodic Table, e.g. Hf, Ti, or Zr.

As referred to herein, a "high density polyethylene" (HDPE) is any polyethylene comprising at least 80 wt %, by weight of the polymer, of ethylene derived units and has a density (ASTM D4883-8) of at least 0.89 g/cm$^3$, such as at least 0.93 g/cm$^3$. Such HDPE's may be branched as referred to herein. Such HDPE's may be branched as referred to herein. In some embodiments, the high density polyethylene is a copolymer of ethylene and one or more of C1 to C12 alpha-olefins such as propylene, 1-butene, 1-hexene and 1-octene.

An "EP copolymer" is a polymer having ethylene and propylene units.

A "bVT-HDPE" is a branched vinyl/vinylidene-terminated high density polyethylene.

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers. "Different" as used to refer to mer units indicates that the mer units differ from each other by at least one atom or are different isomerically. An "ethylene polymer" or "ethylene copolymer" is a polymer or copolymer comprising at least 50 mol % ethylene derived units, a "propylene polymer" or "propylene copolymer" is a polymer or copolymer comprising at least 50 mol % propylene derived units, and so on.

As used herein, and unless otherwise specified, the term "Cn" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "Cm-Cy" group or compound refers to a group or compound comprising carbon atoms at a total number thereof from m to y. Thus, a $C_1$-$C_{50}$ alkyl group refers to an alkyl group comprising carbon atoms at a total number thereof from 1 to 50.

The terms "alkyl radical" and "alkyl" are used interchangeably throughout this disclosure. For purposes of this disclosure, "alkyl radical" is defined to be $C_1$-$C_{100}$ alkyls, that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, and the like including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, and the like, where each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "polymer" includes, but is not limited to, homopolymers, copolymers, terpolymers, etc., and alloys and blends thereof. The term "polymer" also includes impact, block, graft, random, and alternating copolymers. The term "polymer" shall further include all possible geometrical configurations unless otherwise specifically stated. Such configurations may include isotactic, syndiotactic and random symmetries.

The term "copolymer" is meant to include polymers having two or more monomers, optionally, with other monomers, and may refer to interpolymers, terpolymers, etc.

The term "blend" refers to a mixture of two or more polymers.

The term "monomer", can refer to the monomer used to form a polymer, including the unreacted chemical compound in the form prior to polymerization, and/or the monomer after it has been incorporated into the polymer. Different monomers are discussed herein, including propylene monomers, ethylene monomers, and diene monomers.

The term "comonomer" can refer to a second monomer used to form a polymer, including the unreacted chemical compound in the form prior to polymerization, and the comonomer after it has been incorporated into the polymer. Different comonomers are discussed herein, including ethylene monomers, and diene monomers, such as α,ω-dienes.

The terms "polypropylene" and "propylene polymer" are used interchangeably and include homopolymers and copolymers of propylene or mixtures thereof.

The term "impact copolymer of polypropylene" ("ICP") means those blends including at least two components: (1) a polypropylene and (2) an additional polymer that can be a copolymer.

The term "comb-block copolymer" typically refers to a multi-block copolymer, each block differing in one or more chemical or physical properties.

For purposes of the present disclosure, in relation to catalyst compounds, the term "substituted" means that a hydrogen group has been replaced with a hydrocarbyl group, a heteroatom, or a heteroatom containing group, such as halogen (such as Br, $C_1$, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, where each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are g/mol (g mol$^{-1}$).

A "catalyst system" is a combination of at least one catalyst compound, at least one activator, an optional co-activator, and an optional support material. When "catalyst system" is used to describe such a pair before activation, it means the unactivated catalyst complex (precatalyst) is together with an activator and, optionally, a co-activator. When it is used to describe such a pair after activation, it means the activated complex and the activator or other charge-balancing moiety. The transition metal compound may be neutral as in a precatalyst, or a charged species with a counter ion as in an activated catalyst system. For the purposes of this present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

For the purposes of this present disclosure, ethylene shall be considered an α-olefin. A "polyethylene composition" is a composition that includes "comb-block EP copolymers" produced, for example, in serial stages or reactors by copolymerizing, in the second stage or reactor, bVT-HDPE synthesized in the first stage or reactor, or otherwise provided from another source, with propylene and ethylene. Thus, one "block" of the comb-block HDPE is derived from the bVT-HDPE, and the second "block" is derived from polymer made in a second stage or reactor that also incorporates the bVT-HDPE blocks, thus producing a "comb-like" structure. The serial stage or reactor approach delivers concentrated bVT-HDPE macromer feed in the second stage or reactor for high incorporation and high degree of branching. The bVT-HDPE having a branching index (g') of less than 0.95 and vinyl and/or vinylidene content (e.g., of greater than 90%) may be synthesized using a salan catalyst. Hence, after copolymerization with ethylene and propylene in the second reactor, a comb-block HDPE is produced while some bVT-HDPE remains, thus forming an example of a "polyethylene composition".

Thus, provided in some embodiments is a polyethylene composition comprising two blocks comprising an ethylene-propylene copolymer backbone and high density polyethylene branches or "combs" pendant to the backbone. The "polyethylene composition" can typically comprise the comb-block EP copolymer and some unreacted bVT-HDPE, thus, characteristics describing the "polyethylene composition" can include both components.

In order to achieve a polyethylene composition, processes are provided where a bVT-HDPE is first generated, followed by incorporation of the bVT-HDPE into a forming EP copolymer backbone, the whole structure referred to as a "comb" structure having blocks derived from the bVT-HDPE and blocks derived from a second polymerization. Thus, also provided are processes for preparing comb-block EP copolymer by introducing, at a temperature of at least 100° C., ethylene to a first catalyst precursor and an activator to form bVT-HDPE having a number average molecular weight (Mn) of at least 5,000 g/mol; and introducing, at a temperature of at least 100° C., the vinyl/vinylidene-terminated high density polyethylene to ethylene, propylene, a second catalyst precursor and an activator to form comb-block EP copolymer. The "introducing" may occur as two stages together in one reactor, in two separate zones in one reactor, or in separate reactors such as in series reactors.

Catalyst Precursors and Activators

Polymerization processes of the present disclosure can be performed in two stages, each stage involving a different catalyst precursor for polymerizing the monomers. In at least one embodiment, the first and second polymerization stages take place in the same reactor and take place concurrently in the same reactor. The first and second polymerization stages can also take place in the same reactor, but at different times for multiple stage polymerizations. A first catalyst precursor (salan catalyst precursor) is used in a first polymerization stage or reactor until the polymerization reaction has run for a desired amount of time, followed by introducing a second catalyst to monomers. Alternatively, the first polymerization stage may take place in a different reactor than the second polymerization stage, such as in serial reactors where the reaction effluent from the first reactor is transferred to the second reactor, at least in part or whole, in a continuous process. In such a serial reaction scheme, a first catalyst (a salan catalyst) precursor can be added to the first reactor, followed by addition of a second catalyst to a second reactor along with the effluent from the first reactor. These polymerization steps may take place at the same or different temperatures, and may take place at the same or different pressures, such as a pressure of at least 1 MPa or 2 MPa, or from 1 MPa or 2 MPa to 4 MPa or 6 MPa or 8 MPa.

In at least one embodiment, a comb-block EP copolymer formation process takes place in a single reactor process with a premade vinyl/vinylidene-terminated high density polyethylene. For example, the pre-made vinyl/vinylidene-terminated high density polyethylene is dissolved in a solvent and added into the reactor in solution form.

The first polymerization stage can be the stage in which a bVT-HDPE is formed and thus a catalyst precursor that favors the formation of branched vinyl/vinylidene-terminated polyolefin is desirable, for example a salan catalyst precursor. A "salan" catalyst precursor is a Group 3 to 6 organometallic compound having the following ligands: two phenols and two Schiff bases (aryl-imine groups), where the nitrogens are bridged to one another through a divalent hydrocarbyl group, and for example where additionally the phenol groups and aryl-imine groups are bridged together as one ligand with four coordination sites to the metal.

In some embodiments, a catalyst precursor useful in forming bVT-HDPE is a salan catalyst such as described in U.S. Pat. Nos. 8,957,171 and 9,045,568. In at least one embodiment, the first catalyst precursor (salan catalyst precursor) is represented by Formula (I):

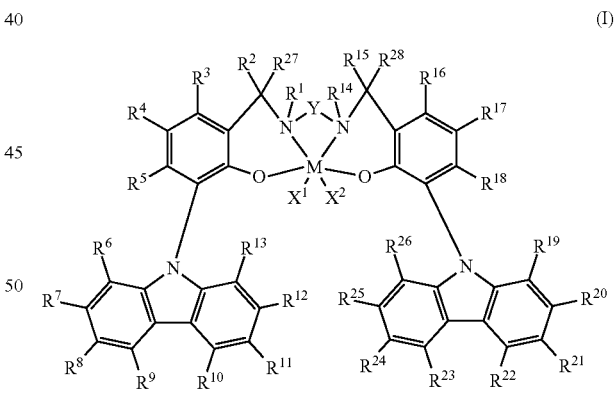

where M is a Group 3, 4, 5 or 6 transition metal chemically bonded to each oxygen atom and each nitrogen atom, such as a Group 4 metal;

each of $X^1$ and $X^2$ is independently a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;

each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is independently a hydrogen, a $C_1$ to $C_{40}$ hydrocarbyl (such as $C_1$ to $C_4$, or $C_6$, or $C_{10}$, or $C_{20}$, or $C_{30}$, or $C_{40}$ hydrocarbyl), a functional group comprising elements from Group 13 to 17 of the periodic table of the elements, or independently, may join together to form a $C_4$ to $C_{62}$ cyclic or polycyclic ring structure (such as $C_4$ to $C_{10}$, or $C_{16}$, or $C_{20}$, or $C_{30}$, or $C_{40}$, or $C_{50}$, or $C_{62}$ cyclic or polycyclic ring structure), or a combination thereof; and Y is a divalent hydrocarbyl radical, such as a $C_1$ to $C_6$ divalent hydrocarbyl radical. In at least one embodiment, two or more of $R^1$ to $R^{28}$ may independently join together to form a $C_4$ to $C_{62}$ cyclic or polycyclic ring structure (such as $C_4$ to $C_{10}$, or $C_{16}$, or $C_{20}$, or $C_{30}$, or $C_{40}$, or $C_{50}$, or $C_{62}$ cyclic or polycyclic ring structure).

The terms "hydrocarbyl radical," "hydrocarbyl group," or "hydrocarbyl" may be used interchangeably and are defined to mean a group consisting of hydrogen and carbon atoms only. Suitable hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl, cyclopropyl, cyclobutyl, cyclopentyl, cyclohexyl, cyclooctyl, aryl groups, such as phenyl, benzyl, or naphthyl.

In at least one embodiment, M is a Group 4 metal, or M is Hf, Ti and/or Zr, or M is Hf or Zr. In at least one embodiment, each of $X^1$ and $X^2$ is independently selected from the group consisting of hydrocarbyl radicals having from 1 to 20 carbon atoms, hydrides, amides, and alkoxides having from 1 to 20 carbon atoms, sulfides, phosphides, halides, amines, phosphines, ethers, and combinations thereof.

In at least one embodiment, $X^1$ and $X^2$ together form a part of a fused ring or a ring system having from 4 to 6, or 10, or 20, or 30, or 40, or 50, or 62 carbon atoms.

In at least one embodiment, each of $X^1$ and $X^2$ is independently selected from the group consisting of halides, alkyl radicals having from 1 to 7 carbon atoms, benzyl radicals, or a combination thereof.

In at least one embodiment, Y is a divalent $C_1$ to $C_3$, or $C_{10}$, or $C_{14}$, or $C_{20}$, or $C_{40}$ hydrocarbyl radical comprising a portion that comprises a linker backbone comprising from 1 to 18 carbon atoms. In at least one embodiment, Y is a $C_1$ to $C_{20}$ hydrocarbyl radical comprising a portion that comprises a linker backbone comprising from 1 to 18 carbon atoms wherein the hydrocarbyl comprises O, S, S(O), S(O)$_2$, Si(R*)$_2$, P(R*), N or N(R*), wherein each R* is independently a $C_1$ to $C_{18}$ hydrocarbyl. In at least one embodiment, Y is selected from the group consisting of ethylene (—CH$_2$CH$_2$—) and 1,2-cyclohexylene, and/or —CH$_2$CH$_2$CH$_2$— derived from propylene. In at least one embodiment, Y is —CH$_2$CH$_2$CH$_2$— derived from propylene.

In at least one embodiment, each X is, independently, a halogen or a $C_1$ to $C_7$ hydrocarbyl radical.

In at least one embodiment, each X is a benzyl radical. In at least one embodiment, each $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is, independently, hydrogen, a halogen, or a $C_1$ to $C_{30}$ hydrocarbyl radical, or a $C_1$ to $C_{10}$ hydrocarbyl radical. In at least one embodiment, one or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is a methyl radical, a fluoride (F), or a combination thereof.

In at least one embodiment, M is Zr or Hf; $X^1$ and $X^2$ are benzyl radicals; $R^1$ and $R^{14}$ are methyl radicals; $R^2$ through $R^{13}$ and $R^{15}$ through $R^{28}$ are hydrogen; and Y is ethylene (—CH$_2$CH$_2$—).

In at least one embodiment, M is Zr or Hf; $X^1$ and $X^2$ are benzyl radicals; $R^1$, $R^4$, $R^{14}$ and $R^{17}$ are methyl radicals; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In at least one embodiment, M is Zr or Hf; $X^1$ and $X^2$ are benzyl radicals; $R^1$ and $R^{14}$ are methyl radicals; $R^4$ and $R^{17}$ are fluoride (F) functional groups; $R^2$, $R^3$, $R^5$ through $R^{13}$, $R^{15}$, $R^{16}$ and $R^{18}$ through $R^{28}$ are hydrogen; and Y is ethylene (—CH$_2$CH$_2$—).

In at least one embodiment, M is Zr or Hf; $X^1$ and $X^2$ are benzyl radicals; $R^1$, $R^4$, $R^{14}$ and $R^{17}$ are methyl radicals; $R^8$, $R^{11}$, $R^{21}$, and $R^{24}$ are tert-butyl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In at least one embodiment, M is Zr or Hf; $X^1$ and $X^2$ are benzyl radicals; $R^1$, $R^4$, $R^{14}$ and $R^{17}$ are methyl radicals; $R^8$, $R^{11}$, $R^{21}$ and $R^{24}$ are mesityl radicals; $R^2$, $R^3$, $R^5$, $R^6$, $R^7$, $R^9$, $R^{10}$, $R^{12}$, $R^{13}$, $R^{15}$, $R^{16}$, $R^{18}$, $R^{19}$, $R^{20}$, $R^{22}$, $R^{23}$, $R^{25}$, $R^{26}$, $R^{27}$, and $R^{28}$ are hydrogen; and Y is ethylene (—CH$_2$CH$_2$—).

In some embodiments, the salan catalyst may include a chelated transition metal complex as described in Paragraphs [0093]-[0098] of International Patent Application No. PCT/US2015/067582, which description is herein incorporated by reference. These include in particular biphenyl phenol transition metal complexes, such as those in accordance with the description in Paragraphs [0094]-[0098] of International Patent Application No. PCT/US2015/067582, which description is herein incorporated by reference. For further description of catalyst compounds, see also WO2003/091262, WO2005/108406, US 2006/0025548, US 2006/0052554, WO2007/136494, WO2007/136496, WO2007/136495, WO2009/064482, and WO2013/096573, each of which is incorporated by reference herein.

Second Catalyst

The second stage of a polymerization process provides a backbone EP copolymer formed in the presence of the reactor effluent of the first stage, which contains bVT-HDPE. Accordingly, the second catalyst can be one that favors the incorporation of vinyl/vinylidene-terminated polyolefins as a macromonomer unit while forming the backbone EP copolymer.

In at least one embodiment, the second catalyst precursor is a metallocene catalyst compound. A "metallocene" catalyst compound is a transition metal catalyst compound having one, two or three, typically one or two, substituted or unsubstituted cyclopentadienyl ligands (such as substituted or unsubstituted Cp, Ind or Flu) bound to the transition metal. Metallocene catalyst compounds include metallocenes including Group 3 to Group 12 metal complexes, such as, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, where each $Cp^A$ and $Cp^B$ is independently selected from cyclopentadienyl ligands (for example, Cp, Ind, or Flu) and ligands isolobal to cyclopentadienyl, one or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms; X' is an anionic leaving group; n is 0 or an integer from 1 to 4; each R" is independently selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, indacenyl, tetrahydroindenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated and substituted versions thereof. Each $Cp^A$ and $Cp^B$ may independently be indacenyl or tetrahydroindenyl.

The metallocene catalyst compound may be a bridged metallocene catalyst compound represented by the formula: $Cp^A(T)Cp^B M'X'_n$, where each $Cp^A$ and $Cp^B$ is independently selected from cyclopentadienyl ligands (for example, Cp, Ind, or Flu) and ligands isolobal to cyclopentadienyl, where onene or both $Cp^A$ and $Cp^B$ may contain heteroatoms, and one or both $Cp^A$ and $Cp^B$ may be substituted by one or more R" groups; M' is selected from Groups 3 through 12 atoms and lanthanide Group atoms, such as Group 4; X' is an anionic leaving group; n is 0 or an integer from 1 to 4; (T) is a bridging group selected from divalent alkyl, divalent substituted alkyl, divalent heteroalkyl, divalent alkenyl, divalent substituted alkenyl, divalent heteroalkenyl, divalent alkynyl, divalent substituted alkynyl, divalent heteroalkynyl, divalent alkoxy, divalent aryloxy, divalent alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R" is selected from alkyl, substituted alkyl, heteroalkyl, alkenyl, substituted alkenyl, heteroalkenyl, alkynyl, substituted alkynyl, heteroalkynyl, alkoxy, aryloxy, alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated, and substituted versions thereof, such as cyclopentadienyl, n-propylcyclopentadienyl, indenyl, pentamethylcyclopentadienyl, tetramethylcyclopentadienyl, and n-butylcyclopentadienyl. Each $Cp^A$ and $Cp^B$ may independently be indacenyl or tetrahydroindenyl.

(T) can be a bridging group containing at least one Group 13, 14, 15, or 16 element, such as boron or a Group 14, 15 or 16 element. In some embodiments, (T) is O, S, NR', or SiR'$_2$, where each R' is independently hydrogen or $C_1$-$C_{20}$ hydrocarbyl.

In at least one embodiment, the metallocene catalyst compound is represented by the formula:

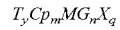

where Cp is independently a substituted or unsubstituted cyclopentadienyl ligand (for example, substituted or unsubstituted Cp, Ind, or Flu) or substituted or unsubstituted ligand isolobal to cyclopentadienyl; M is a Group 4 transition metal; G is a heteroatom group represented by the formula $JR^*_z$ where J is N, P, O or S, and $R^*$ is a linear, branched, or cyclic $C_1$-$C_{20}$ hydrocarbyl; z is 1 or 2; T is a bridging group; y is 0 or 1; X is a leaving group; m=1, n=1, 2 or 3, q=0, 1, 2 or 3, and the sum of m+n+q is equal to the coordination number of the transition metal.

In at least one embodiment, J is N, and $R^*$ is methyl, ethyl, propyl, butyl, pentyl, hexyl, heptyl, octyl, nonyl, cyclooctyl, cyclododecyl, decyl, undecyl, dodecyl, adamantyl or an isomer thereof.

In at least one embodiment, the catalyst compound is represented by Formula (II) or Formula (III):

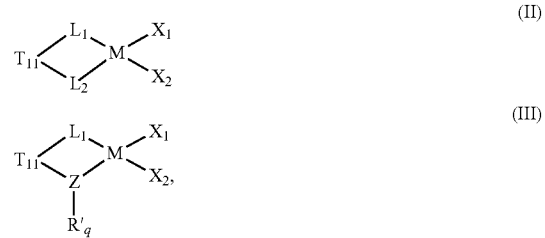

where in each of Formula (II) and Formula (III):
M is the metal center, and is a Group 4 metal, such as titanium, zirconium or hafnium, such as zirconium or hafnium when $L_1$ and $L_2$ are present and titanium when Z is present;
n is 0 or 1;
T is an optional bridging group which, if present, is a bridging group containing at least one Group 13, 14, 15, or 16 element, such as boron or a Group 14, 15 or 16 element, such as T is selected from dialkylsilyl, diarylsilyl, dialkylmethyl, ethylenyl (—CH$_2$—CH$_2$—) or hydrocarbylethylenyl where one, two, three or four of the hydrogen atoms in ethylenyl are substituted by hydrocarbyl, where hydrocarbyl can be independently $C_1$ to $C_{16}$ alkyl or phenyl, tolyl, xylyl and the like), and when T is present, the catalyst represented can be in a racemic or a meso form;
$L_1$ and $L_2$ are independently cyclopentadienyl, indenyl, tetrahydroindenyl or fluorenyl, optionally substituted, that are each bonded to M, or $L_1$ and $L_2$ are independently cyclopentadienyl, indenyl, tetrahydroindenyl or fluorenyl, which are optionally substituted, in which two adjacent substituents on $L_1$ and $L_2$ are optionally joined to form a substituted or unsubstituted, saturated, partially unsaturated, or aromatic cyclic or polycyclic substituent;
Z is nitrogen, oxygen, sulfur, or phosphorus;
q is 1 or 2;
R' is a cyclic, linear or branched $C_1$ to $C_{40}$ alkyl or substituted alkyl group;

X₁ and X₂ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or X₁ and X₂ are joined and bound to the metal atom to form a metallacycle ring containing from about 3 to about 20 carbon atoms; or both together can be an olefin, diolefin or aryne ligand.

In some embodiments of Formulas (II) or (III), Z is N. In some embodiments of Formulas (II) or (III), when Z is N then q is 1.

In some embodiments of Formulas (II) or (III), T is present and is a bridging group containing at least one Group 13, 14, 15, or 16 element, such as a Group 14 element. Examples of suitable bridging groups include P(=S)R', P(=Se)R', P(=O)R', R'₂C, R'₂Si, R'₂Ge, R'₂CCR'₂, R'₂CCR'₂CR'₂, R'₂CCR'₂CR'₂CR'₂, R' C=CR', C=CR' CR'₂, R'₂CCR'=CR' CR'₂, R' C=CR' CR'=CR', C=CR' CR'₂CR'₂, R'₂CSiR'₂, R'₂SiSiR'₂, R'₂SiOSiR'₂, R'₂CSiR'₂CR'₂, R'₂SiCR'₂SiR'₂, R' C—CR' SiR'₂, R'₂CGeR'₂, R'₂GeGeR'₂, R'₂CGeR'₂CR'₂, R'₂GeCR'₂GeR'₂, R'₂SiGeR'₂, R'C=CR'GeR'₂, R'B, R'₂C—BR', R'₂CR'₂C—O—CR'₂CR'₂, R'₂C—O—CR'₂CR'₂, R'₂C—O—CR'=CR', R'₂C—S—CR'₂, R'₂CR'₂C—S—CR'₂CR'₂, R'₂C—S—CR'₂CR'₂, R'₂C—S—CR'=CR', R'₂C—Se—CR'₂, R'₂CR'₂C—Se—CR'₂CR'₂, R'₂C—Se—CR'₂CR'₂, R'₂C—Se—CR'=CR', R'₂C—N=CR', R'₂C—NR'—CR'₂, R'₂C—NR'—CR'₂CR'₂, R'₂C—NR'—CR'=CR', R'₂CR'₂C—NR'—CR'₂CR'₂, R'₂C—P=CR', R'₂C—PR'—CR'₂, O, S, Se, Te, NR', PR', AsR', SbR', O—O, S—S, R'N—NR', R'P—PR', O—S, O—NR', O—PR', S—NR', S—PR', and R'N—PR' where R' is hydrogen or a C₁-C₂₀ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Suitable examples for the bridging group T include CH₂, CH₂CH₂, SiMe₂, SiPh₂, SiMePh, Si(CH₂)₃, Si(CH₂)₄, O, S, NPh, PPh, NMe, PMe, NEt, NPr, NBu, PEt, PPr, Me₂SiOSiMe₂, and PBu.

In some embodiments of Formulas (II) or (III), T is represented by the formula R<sup>a</sup>₂J or (R<sup>a</sup>₂J)₂, where J is C, Si, or Ge, and each Ra is, independently, hydrogen, halogen, C₁ to C₂₀ hydrocarbyl (such as methyl, ethyl, propyl, butyl, pentyl, hexyl, heptyl, octyl, nonyl, decyl, undecyl, or dodecyl) or a C₁ to C₂₀ substituted hydrocarbyl, and two IV can form a cyclic structure including aromatic, partially saturated, or saturated cyclic or fused ring system. In some embodiments of Formulas (II) or (III), T is a bridging group including carbon or silica, such as dialkylsilyl, such as where T is selected from CH₂, CH₂CH₂, C(CH₃)₂, SiMe₂, SiPh₂, SiMePh, silylcyclobutyl (Si(CH₂)₃), (Ph)₂C, (p-(Et)₃SiPh)₂C, Me₂SiOSiMe₂, and cyclopentasilylene (Si (CH₂)₄).

In at least one embodiment of Formulas (II) or (III), the catalyst compound has a symmetry that is C₂ symmetrical.

For example, in at least one embodiment, the metallocene catalyst compound is represented by Formula (IV):

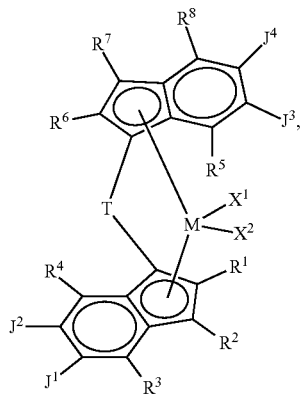

wherein:
M is a Group 4 metal such as Hf, Zr, or Ti;
T is a bridging group;
each of X¹ and X² is a univalent anionic ligand, or X¹ and X² are joined to form a metallocycle ring;
each of R¹, R², R³, R⁴, R⁵, R⁶, R⁷, R⁸ is independently hydrogen, a halogen, an unsubstituted C₁-C₄₀ hydrocarbyl, a C₁-C₄₀ substituted hydrocarbyl, an unsubstituted C₄-C₆₂ aryl, a substituted C₄-C₆₂ aryl, an unsubstituted C₄-C₆₂ heteroaryl, a substituted C₄-C₆₂ heteroaryl, —NR'₂, —SR', —OR, —SiR'₃, —OSiR'₃, —PR'₂, or —R"—SiR'₃, where R" is C₁-C₁₀ alkyl and each R' is hydrogen, halogen, C₁-C₁₀ alkyl, or C₆-C₁₀ aryl;
J¹ and J² are joined to form a substituted or unsubstituted C₄-C₆₂ saturated or unsaturated cyclic or polycyclic ring structure, or a combination thereof; and
J³ and J⁴ are joined to form a substituted or unsubstituted C₄-C₆₂ saturated or unsaturated cyclic or polycyclic ring structure, or a combination thereof.

For example, T can be selected from R'₂CSiR'₂, R'₂SiSiR'₂, R'₂SiOSiR'₂, R'₂CSiR'₂CR'₂, R'₂SiCR'₂SiR'₂, R'C=CR' SiR'₂, where R' is hydrogen or a C₁-C₂₀ containing hydrocarbyl, and optionally two or more adjacent R' may join to form a substituted or unsubstituted, saturated, partially unsaturated or aromatic, cyclic or polycyclic substituent. Suitable examples for the bridging group T include CH₂, CH₂CH₂, SiMe₂, SiPh₂, SiMePh, Si(CH₂)₃, or Si(CH₂)₄. In at least one embodiment, T is Si(CH₂)₄.

In at least one embodiment, each of J¹ and J² and J³ and J⁴ are joined to form independently an unsubstituted C₅-C₁₀ saturated cyclic ring structure.

In at least one embodiment, each of R³, R⁴, R⁵, and R⁸ are independently selected from methyl, ethyl, propyl, butyl, pentyl, hexyl, heptyl, octyl, nonyl, decyl.

In at least one embodiment, T is Si(CH₂)₄, each of J¹ and J² and J³ and J⁴ are joined to form an unsubstituted C₅ saturated cyclic ring, each of R³, R⁴, R⁵, and R⁸ is methyl, and each of R¹, R², R⁶, and R⁷ is hydrogen.

A metallocene catalyst according to some embodiments includes 1,1'-bis(4-triethylsilylphenyl)methylene-(cyclopentadienyl)(2,7-di-tertiary-butyl-fluoren-9-yl)hafnium dimethyl. In other embodiments, the metallocene catalyst may comprise a mono-Cp amido group 4 complex, such as those in accordance with the description at Paragraphs [0079]-[0085] of International Patent Application No. PCT/US2015/067582, which description is herein incorporated by reference.

Methods to Prepare Metallocene Catalyst Compounds: In some embodiments, silyl-bridged cyclopentadienyl ligands R'$_2$Si(CpH)$_2$ (where R'=Me, Ph) may be synthesized by direct salt metathesis reaction between R'$_2$SiCl$_2$ and two equivalents of a lithium-cyclopentadienide, for example, in tetrahydrofuran solvent at ambient temperature. The synthesized neutral ligands may be deprotonated with, for example, n-butyl lithium at −25° C. The salt elimination route has been adopted to synthesis corresponding Group IV metal dichloride by an equimolar ratio of the above lithium salt of cyclopentadienide ligands with Group IV metal tetrachloride, such as hafnium tetrachloride. Further, treatment of silyl-bridged cyclopentadienide Group IV metal dichloride with two equivalents of methyl magnesium bromide under milder reaction conditions can provide metallocene catalyst compounds. Catalyst compound precursors and catalyst compounds can be confirmed by $^1$H NMR spectroscopy.

EP copolymer backbones of the present disclosure can be propylene rich having a propylene content of, for example, about 50 wt % or greater, such as about 60 wt % or greater, such as about 70 wt % or greater, such as about 80 wt % or greater, such as from about 50 wt % to about 99 wt %, or about 60 wt % to about 95 wt %, or about 75 wt % to about 95 wt %, or about 85 wt % to about 95 wt %, based on the weight of the EP copolymer backbone. Additionally or alternatively, an EP copolymer backbone can have an ethylene content of, for example, about 50 wt % or less, such as about 40 wt % or less, such as about 25 wt % or less, such as about 15 wt % or less, such as from about 1 wt % to about 50 wt %, or about 5 wt % to about 20 wt %, or about 10 wt % to about 20 wt %, based on the weight of the EP copolymer backbone. An EP copolymer backbone of the present disclosure can have a weight average molecular weight (Mw) of from about 50,000 g/mol to about 300,000 g/mol, such as from about 100,000 g/mol to about 200,000 g/mol, based on the molecular weight of the EP copolymer backbone. Unless otherwise specified, ethylene content in a polymer is determined using Fourier-transform infrared spectroscopy (FTIR) according to ASTM D3900.

Activator

The catalyst compounds for the first stage and the second stage can be combined with at least one activator to promote polymerization of the ethylene to form the bVT-HDPE and polymerization of the ethylene and propylene with the bVT-HDPE to form the EP copolymer backbone (and polyethylene composition). Exemplary activators for catalysts of the first stage and the second stage include those having a non-coordinating borate anion and a bulky organic cation. Alternatively, an activator for the first stage and/or second stage can be an alumoxane.

The terms "cocatalyst" and "activator" are used herein interchangeably.

The catalyst systems described herein typically include a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, include alumoxanes, aluminum alkyls, ionizing activators, which may be neutral or ionic, and conventional-type cocatalysts. Suitable activators typically include alumoxane compounds, modified alumoxane compounds, and ionizing anion precursor compounds that abstract a reactive, σ-bound, metal ligand making the metal compound cationic and providing a charge-balancing noncoordinating or weakly coordinating anion, e.g. a non-coordinating anion.

Ionizing/Non Coordinating Anion Activators

The term "non-coordinating anion" (NCA) means an anion which either does not coordinate to a cation or which is only weakly coordinated to a cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with this present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

It is within the scope of this present disclosure to use an ionizing activator, neutral or ionic. It is also within the scope of this present disclosure to use neutral or ionic activators alone or in combination with alumoxane or modified alumoxane activators. For descriptions of useful activators please see U.S. Pat. Nos. 8,658,556 and 6,211,105.

Suitable activators include N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenyl carbenium tetrakis(perfluorophenyl)borate, [Me$_3$NH$^+$][B(C$_6$F$_5$)$_4^-$]; 1-(4-(tris(pentafluorophenyl)borate)-2,3,5,6-tetrafluorophenyl)pyrrolidinium; and tetrakis(pentafluorophenyl)borate, 4-(tris(pentafluorophenyl)borate)-2,3,5,6-tetrafluoropyridine.

In at least one embodiment, the activator comprises a triaryl carbenium (such as triphenylcarbenium tetraphenylborate, tri phenyl carbenium tetrakis(pentafluorophenyl)borate, triphenylcarbenium tetrakis-(2,3,4,6-tetrafluorophenyl)borate, triphenylcarbenium tetrakis(perfluoronaphthyl)borate, triphenylcarbenium tetrakis(perfluorobiphenyl)borate, and triphenylcarbenium tetrakis(3,5-bis (trifluoromethyl)phenyl)borate).

In at least one embodiment, the activator comprises one or more of trialkylammonium tetrakis(pentafluorophenyl)borate, N,N-dialkylanilinium tetrakis(pentafluorophenyl)borate, dioctadecylmethylammonium tetrakis(pentafluorophenyl)borate, dioctadecylmethylammonium tetrakis (perfluoronaphthyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl) borate, trialkylammonium tetrakis(perfluorobiphenyl) borate, N,N-dialkylanilinium tetrakis(perfluorobiphenyl) borate, trialkylammonium tetrakis(3,5-bis(trifluoromethyl) phenyl)borate, N,N-dialkylanilinium tetrakis(3,5-bis (trifluoromethyl)phenyl)borate, N,N-dialkyl-(2,4,6-trimethylanilinium) tetrakis(3,5-bis(trifluoromethyl)phenyl)borate, and di-(i-propyl)ammonium tetrakis(pentafluorophenyl)borate, (where alkyl is methyl, ethyl, propyl, n-butyl, sec-butyl, or t-butyl).

In at least one embodiment, the activator is represented by the formula:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3, such as Z is (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl. The anion component A$^{d-}$ includes those having the formula [M$^{k+}$Q$_n$]$^{d-}$ wherein k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms (optionally with the proviso that in not more than 1 occurrence is Q a halide). Each Q can be a fluorinated hydrocarbyl group having 1 to 20 carbon atoms, such as a fluorinated aryl group, such as a pentafluoryl aryl group or perfluoronaphthyl group. Examples of suitable A$^{d-}$ also include diboron compounds as disclosed in U.S. Pat. No. 5,447,895, which is fully incorporated herein by reference.

When Z$_d^+$ is the activating cation (L-H)$_d^+$, it can be a Brønsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

Bulky activators are also useful herein as NCAs. "Bulky activator" as used herein refers to anionic activators represented by the formula:

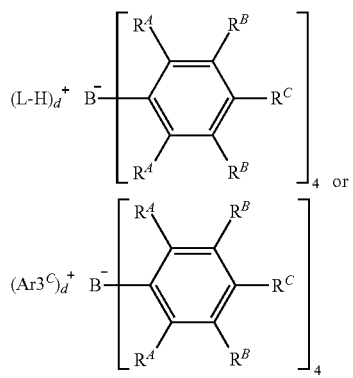

where:
each R$^A$ is independently a halide, such as a fluoride; Ar is substituted or unsubstituted aryl group (such as a substituted or unsubstituted phenyl), such as substituted with C$_1$ to C$_{40}$ hydrocarbyls, such as C$_1$ to C$_{20}$ alkyls or aromatics; each R$^B$ is independently a halide, a C$_6$ to C$_{20}$ substituted aromatic hydrocarbyl group or a siloxy group of the formula —O—Si—R$^D$, where R$^D$ is a C$_1$ to C$_{20}$ hydrocarbyl or hydrocarbylsilyl group (such as R$^B$ is a fluoride or a perfluorinated phenyl group); each R$^C$ is a halide, C$_6$ to C$_{20}$ substituted aromatic hydrocarbyl group or a siloxy group of the formula —O—Si—R$^D$, where R$^D$ is a C$_1$ to C$_{20}$ hydrocarbyl or hydrocarbylsilyl group (such as R$^D$ is a fluoride or a C$_6$ perfluorinated aromatic hydrocarbyl group); where R$^B$ and R$^C$ can form one or more saturated or unsaturated, substituted or unsubstituted rings (such as R$^B$ and R$^C$ form a perfluorinated phenyl ring);
L is a Lewis base; (L-H)$^+$ is a Brønsted acid; d is 1, 2, or 3;
where the anion has a molecular weight of greater than about 1,020 g/mol; and where at least three of the substituents on the B atom each have a molecular volume of greater than about 250 cubic Å, alternatively greater than about 300 cubic Å, or alternatively greater than about 500 cubic Å. The anion can have a molecular weight of greater than about 700 g/mol, and at least three of the substituents on the boron atom each have a molecular volume of greater than about 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v.71(11), November 1994, pp. 962-964. Molecular volume (MV), in units of cubic Å, is calculated using the formula: MV=8.3 Vs, where Vs is the scaled volume. Vs is the sum of the relative volumes of the constituent atoms, and is calculated from the molecular formula of the substituent using Table 1 below of relative volumes. For fused rings, the Vs is decreased by 7.5% per fused ring. The Calculated Total MV of the anion is the sum of the MV per substituent, for example, the MV of perfluorophenyl is 183 Å3, and the Calculated Total MV for tetrakis(perfluorophenyl)borate is four times 183 Å3, or 732 Å3.

TABLE 1

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Suitable activator-to-catalyst ratio, e.g., all NCA activators-to-catalyst ratio can be about a 1:1 molar ratio. Alternatively, suitable ranges may include from about 0.1:1 to about 100:1, alternatively from about 0.5:1 to about 200:1, alternatively from about 1:1 to about 500:1 alternatively from about 1:1 to about 1000:1. For example, suitable range can be from about 0.5:1 to about 10:1, such as about 1:1 to about 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Particularly useful activators include dimethylaniliniumtetrakis (pentafluorophenyl) borate and dimethyl anilinium tetrakis(heptafluoro-2-naphthyl) borate. For a more detailed description of useful activators please see WO 2004/026921 page 72, paragraph [00119] to page 81 paragraph [00151]. A list of particularly useful activators that can be used in the practice of this present disclosure may be found at page 72, paragraph to page 74, paragraph [00178] of WO 2004/046214.

Alumoxane Activators

Alumoxane activators can be utilized as activators in the catalyst systems described herein. Alumoxanes are generally oligomeric compounds containing —Al($R^1$)—O— subunits, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. A visually clear methylalumoxane can be used. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584). Another useful alumoxane is solid polymethylaluminoxane as described in U.S. Pat. Nos. 9,340,630; 8,404,880; and 8,975,209.

When the activator is an alumoxane (modified or unmodified), at least one embodiment selects the maximum amount of activator typically at up to about a 5,000-fold molar excess Al/M over the catalyst compound (per metal catalytic site). The minimum activator-to-catalyst-compound is about a 1:1 molar ratio. Alternative suitable ranges include from about 1:1 to about 500:1, alternatively from 1:1 to 200:1, alternatively from about 1:1 to about 100:1, or alternatively from about 1:1 to about 50:1.

In an alternative embodiment, little or no alumoxane is used in the polymerization processes described herein. For example, alumoxane is present at about zero mole %, alternatively the alumoxane is present at a molar ratio of aluminum to catalyst compound transition metal less than about 500:1, such as less than about 300:1, such as less than about 100:1, such as less than about 1:1.

Optional Scavengers, Co-Activators, Chain Transfer Agents

In addition to activator compounds, scavengers or co-activators may be used. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and diethyl zinc.

Chain transfer agents may be used in the compositions and/or processes described herein. Useful chain transfer agents are typically alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Optional Support Materials

In embodiments herein, the catalyst system of the first stage or the second stage may comprise an inert support material. The supported material can be a porous support material, for example, talc, and inorganic oxides. Other support materials include zeolites, clays, organoclays, or any other organic or inorganic support material, or mixtures thereof.

For example, the support material can be an inorganic oxide in a finely divided form. Suitable inorganic oxide materials for use in catalyst systems herein include Groups 2, 4, 13, and 14 metal oxides, such as silica, alumina, and mixtures thereof. Other inorganic oxides that may be employed either alone or in combination with the silica, or alumina are magnesia, titania, zirconia. Other suitable support materials, however, can be employed, for example, finely divided functionalized polyolefins, such as finely divided polyethylene. Particularly useful supports include magnesia, titania, zirconia, montmorillonite, phyllosilicate, zeolites, talc, clays. Also, combinations of these support materials may be used, for example, silica-chromium, silica-alumina, silica-titania. Suitable support materials include $Al_2O_3$, $ZrO_2$, $SiO_2$, and combinations thereof, such as $SiO_2$, $Al_2O_3$, or $SiO_2/Al_2O_3$.

The support material, such as an inorganic oxide, can have a surface area of from about 10 to about 700 m$^2$/g, pore volume from about 0.1 to about 4.0 cc/g and average particle size from about 5 to about 500 µm. Furthermore, the surface area of the support material can be, for example, from about 50 m$^2$/g to about 500 m$^2$/g, pore volume of from about 0.5 cc/g to about 3.5 cc/g and average particle size of from about 10 µm to about 200 µm. The surface area of the support material can further be from about 100 m$^2$/g to about 400 m$^2$/g, pore volume from about 0.8 cc/g to about 3.0 cc/g and average particle size is from about 5 µm to about 100 µm. For purposes of the present disclosure, the average pore size of the support material can be from 10 Å to 1000 Å, such as 50 Å to about 500 Å, such as 75 Å to about 350 Å. In at least one embodiment, the support material is a high surface area, amorphous silica (surface area=300 m$^2$/gm; pore volume of 1.65 cm$^3$/gm). Suitable silicas are marketed under the tradenames of DAVISON™ 952 or DAVISON™ 955 by the Davison Chemical Division of W.R. Grace and Company. In other embodiments DAVISON™ 948 is used. Alternatively, a silica can be ES-70™ silica (PQ Corporation, Malvern, Pennsylvania) that has been calcined (such as at 875° C.), for example.

The support material should be dry, that is, free of absorbed water. Drying of the support material can be effected by heating or calcining at about 100° C. to about 1000° C., such as at least about 600° C. When the support material is silica, it is heated to at least 200° C., such as about 200° C. to about 850° C., such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of this present disclosure. The calcined support material is then contacted with at least one polymerization catalyst comprising at least one catalyst compound and an activator.

The support material, having reactive surface groups, typically hydroxyl groups, is slurried in a non-polar solvent and the resulting slurry is contacted with a solution of a catalyst compound and an activator. In at least one embodiment, the slurry of the support material is first contacted with the activator for a period of time from about 0.5 hours to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In an alternative embodiment, the slurry of the support material is first contacted with the catalyst compound for a period of time from about 0.5 hours to about 24 hours, from about 2 hours to about 16 hours, or from about 4 hours to about 8 hours. The slurry of the supported catalyst compound is then contacted with the activator solution.

The mixture of the catalyst, activator and support is heated to about 0° C. to about 70° C., such as about 23° C. to about 60° C., such as at room temperature. Contact times typically range from about 0.5 hours to about 24 hours, from about 2 hours to about 16 hours, or from about 4 hours to about 8 hours.

Suitable non-polar solvents are materials in which all of the reactants used herein, e.g., the activator, and the catalyst compound, are at least partially soluble and which are liquid at reaction temperatures. Suitable non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

Polyethylene compositions of the present disclosure having the comb-block EP copolymers can be made by any polymerization process such as those referred to as gas phase processes, slurry process, and/or solution processes, and any of these can be combined in serial reactor processes. For example, a polymerization process is a solution polymerization process, and the process can take place in two reactors in series where the reactants, such as ethylene, the catalyst precursor, and activator are kept under solution polymerization conditions. For example, copolymerizations can be carried out in one or more single-phase, liquid-filled, stirred tank reactors with continuous flow of feeds to the system and continuous withdrawal of products under steady state conditions. When more than one reactor is used, the reactors can be operated in a serial configuration. Advantageously, the reactors produce polymers with different properties, such as different molecular weights, or different monomer compositions, or different levels of long-chain branching, or any combinations thereof due to the use of different catalysts and/or other polymerization conditions in each reactor.

Polymerizations of the first stage and/or second stage can be performed using one or more alpha olefin monomers. Monomers useful herein include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment of the present disclosure, the monomer comprises propylene and an optional comonomers comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups. In at least one embodiment, the monomer comprises ethylene and an optional comonomers comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, such as norbornene, norbornadiene, and dicyclopentadiene.

Optional "dienes" may be added to a polymerization medium, including so-called "dual-polymerizable dienes" and "non-conjugated dienes". In at least one embodiment, the "dual-polymerizable dienes" are selected from vinyl substituted strained bicyclic and unconjugated dienes, and alpha-omega linear dienes where both sites of unsaturation are polymerizable by a polymerization catalyst (e.g., Ziegler-Natta, vanadium, metallocene, etc.); such as non-conjugated vinyl norbornenes and $C_8$-$C_{12}$ alpha-omega linear dienes (e.g., 1,7-heptadiene and 1,9-decadiene), such as 5-vinyl-2-norbornene. In at least one embodiment, the mole percent of the dual-polymerizable diene that is combined (e.g., present in the feed leading to the polymerization reactor) is less than about 0.30, or about 0.28, or about 0.26 mol % relative to the other monomers, or from about 0.05 to about 0.26 or about 0.28 or about 0.30 mol %. The polyethylene formed therefrom may comprise "dual-polymerizable diene derived monomer units".

In at least one embodiment, a "non-conjugated diene" is one in which only one of the double bonds is activated by a polymerization catalyst and is selected from cyclic and linear alkylenes, non-limiting examples of which include 1,5-cyclooctadiene, an unconjugated diene (and other structures where each double bond is two carbons away from the other), norbornadiene, and other strained bicyclic and unconjugated dienes, and dicyclopentadiene. For example, the non-conjugated diene can be selected from $C_7$ to $C_{30}$ cyclic non-conjugated dienes.

In at least one embodiment, dienes are absent from the polymerization process, that is, they are not purposefully combined with the ethylene, propylene, and catalyst components in any stage of the process of forming the comb-block PE copolymers.

Polymerizations can be performed in a system with a solvent comprising any one or more of $C_4$ to $C_{12}$ alkanes and/or the olefin monomers, using soluble (soluble in carrier solvent or in reactor solvent) metallocene catalysts or other single-site catalysts and discrete, non-coordinating borate anions as co-catalysts.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof, such as can be found commercially (Isopar™ fluids); perhalogenated hydrocarbons, such as perfluorinated $C_{4-10}$ alkanes, chlorobenzene, and aromatic and alkylsubstituted aromatic compounds, such as benzene, toluene, mesitylene, and xylene. Suitable solvents also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof cyclic and alicyclic hydrocarbons, such as cyclohexane, cycloheptane, methylcyclohexane, methylcycloheptane, and mixtures thereof. In at least one embodiment, the solvent is not aromatic, such as aromatics are present in the solvent at less than about 1 wt %, such as less than about 0.5 wt %, such as 0 wt % based upon the weight of the solvents.

A homogeneous dilute solution of, for example, tri-n-octyl aluminum in a suitable solvent, may be used as a scavenger in concentrations appropriate to maintain reaction. Chain transfer agents, such as hydrogen, can be added to control molecular weight. Polymerizations can be at high temperatures and high conversions to maximize macromer re-insertions that create long chain branching, if so desired.

Suitable polymerizations can be run at any temperature and or pressure suitable to obtain the desired ethylene polymers. Suitable temperatures and/or pressures may include a temperature of from about 0° C. to about 300° C., such as about 20° C. to about 200° C., such as about 35° C. to about 150° C., such as from about 40° C. to about 120° C., such as from about 45° C. to about 80° C.; and at a pressure of from about 0.35 MPa to about 10 MPa, such as from about 0.45 MPa to about 6 MPa, such as from about 0.5 MPa to about 4 MPa. In at least one embodiment, the reactor temperature in either the first stage/reactor and/or second stage/reactor is greater than about 100° C., or about 105° C., or about 110° C., or a range from about 100° C., or about 105° C., or about 110° C. to about 130° C., or about 140° C., or about 150° C., or about 160° C. This combination of a homogeneous, continuous, solution process helps to ensure that the polymer products have narrow composition and sequence distributions.

In at least one embodiment hydrogen is present in the polymerization reactor at a partial pressure of about 0.001 to about 50 psig (about 0.007 to about 345 kPa), such as from about 0.01 to about 25 psig (about 0.07 to about 172 kPa), such as about 0.1 to about 10 psig (about 0.7 to about 70 kPa).

In at least one embodiment, little or no alumoxane is used in the process to produce the polymers. Alumoxane can be present at about zero mol %, alternatively the alumoxane can be present at a molar ratio of aluminum to transition metal less than about 500:1, such as less than about 300:1, such as less than about 100:1, such as less than about 1:1.

In at least one embodiment, little or no scavenger is used in the process to produce the ethylene polymer. For example, scavenger (such as trialkyl aluminum) can be present at zero mol %, alternatively the scavenger can be present at a molar ratio of scavenger metal to transition metal of less than about 100:1, such as less than about 50:1, such as less than about 15:1, such as less than about 10:1.

In at least one embodiment, the polymerization of the first stage and or second stage: 1) is conducted at temperatures of about 0 to about 300° C. (such as about 25 to about 150° C., such as about 40 to about 120° C., such as about 100° C. or greater); 2) is conducted at a pressure of about atmospheric pressure to about 10 MPa (such as about 0.35 to about 10 MPa, such as from about 0.45 to about 6 MPa, such as from about 0.5 to about 4 MPa); 3) is conducted in an aliphatic hydrocarbon solvent (such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof; such as where aromatics (such as toluene) can be present in the solvent at less than 1 wt %, such as less than 0.5 wt %, such as at 0 wt % based upon the weight of the solvents); 4) wherein the catalyst system includes a borate activator; 5) the polymerization occurs in one reaction zone; and/or 6) optionally scavengers (such as trialkyl aluminum compounds) are absent (e.g., present at zero mol %, alternatively the scavenger is present at a molar ratio of scavenger metal to transition metal of less than about 100:1, such as less than about 50:1, such as less than about 15:1, such as less than about 10:1); and/or 7) optionally hydrogen is present in the polymerization reactor at a partial pressure of about 0.001 to about 50 psig (about 0.007 to about 345 kPa) (such as from about 0.01 to about 25 psig (about 0.07 to about 172 kPa), such as about 0.1 to about 10 psig (about 0.7 to about 70 kPa)).

In at least one embodiment, the catalyst system used in the polymerization comprises no more than one catalyst compound. A "reaction zone" also referred to as a "polymerization zone" is a vessel where polymerization takes place, for example a batch reactor. When multiple reactors are used in either series or parallel configuration, each reactor is considered as a separate polymerization zone. For a multi-stage polymerization in both a batch reactor and a continuous reactor, each polymerization stage is considered as a separate polymerization zone. In at least one embodiment, the polymerization occurs in one reaction zone. Room temperature is 23° C. unless otherwise noted.

Other additives may also be used in the polymerization, as desired, such as one or more scavengers, promoters, modifiers, reducing agents, oxidizing agents, hydrogen, aluminum alkyls, silanes, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

In at least one embodiment of the first stage of a polymerization process, the salan catalyst precursor and activator are combined under suitable conditions, such as in a first stage or first reactor, with ethylene, and optionally other comonomers, to produce a bVT-HDPE. In at least one embodiment, the bVT-HDPE block has a branching index (g') of less than about 0.95, or less than about 0.9; or from about 0.8, or about 0.85 to about 0.9, or about 0.95. In at least one embodiment, the level of allyl terminal groups (vinyl and/or vinylidene) is greater than about 90% (as determined by $^1H$ or $^{13}C$ nuclear magnetic resonance spectroscopy), or greater than about 95% relative to all unsaturated chain ends of the vinyl/vinylidene-terminated polymers. In at least one embodiment, the bVT-HDPE has a number average molecular weight (Mn) of at least about 5,000 g/mol, such as at least about 8,000 g/mol; such as from about 5,000 g/mol, or about 8,000 g/mol to about 20,000 g/mol, or about 25,000 g/mol, or about 30,000 g/mol, and/or an Mw/Mn value from about 2.0, or about 2.1, or about 2.2 to about 2.8, or about 3.0, or about 3.2.

The bVT-HDPE is then combined in a second stage or reactor with ethylene and propylene to form the comb-block EP copolymers. The bVT-HDPE is a "macromonomer" in further co-polymerization with ethylene, propylene, and the second catalyst precursor in the second stage/reactor. Because salan catalyst can still be present, it may continue to polymerize ethylene in the second stage or reactor so a certain amount of bVT-HDPE may be present in the final product (polyethylene composition), and/or, in any case, some un-reacted bVT-HDPE may still be present in the final product (polyethylene composition).

For the first and or second stage, the reactor(s) can be maintained at a pressure in excess of the vapor pressure of the reactant mixture to keep the reactants in the liquid phase. In this manner the reactors can be operated liquid-full in a homogeneous single phase. Ethylene (as well as the optional propylene, $C_4$ to $C_{12}$ α-olefins and/or dienes) can be combined into one stream and then mixed with a solvent stream. A solution of, for example, a tri-n-octyl aluminum scavenger in any suitable solvent may be added to the combined solvent and monomer stream just before it entered the reactor to further reduce the concentration of any catalyst poisons. A mixture of the catalyst components (catalyst precursor and/or activator) in solvent may be pumped separately to the reactor and entered through a separate port. In at least one embodiment, cooled isothermal reactors can be used that do not require feed chilling.

A reaction mixture (catalyst system+monomer(s)) in a reactor may be stirred by any suitable means to provide thorough mixing over a broad range of solution viscosities. Flow rates can be set to maintain an average residence time in a reactor of from about 10 minutes to about 30 minutes, or from about 10 minutes to about 45 minutes. On exiting the reactor, the polymer mixture may be subjected to quenching, a series of concentration steps, heat and vacuum stripping and pelletization, or alternatively, may be fed to a subsequent reactor where another α-olefin such as ethylene and propylene will be copolymerized with the bVT-HDPE macromonomer from the first reactor, or fed to a line containing solution or slurry (or a combination of both) polyolefin where intimate mixing may occur. Water or water/alcohol mixture is then supplied to quench the polymerization reaction, which might otherwise continue in the presence of surviving catalyst, unreacted monomer, and elevated temperature. Antioxidants can be also used to quench the polymerization reaction.

The polyethylene composition comprising the comb-block EP copolymer can be recovered from the effluent of either the second polymerization stage by separating the polymer from other constituents of the effluent using any suitable separation. For example, polymer can be recovered from either effluent by liquid-liquid separation or coagulation with a non-solvent, such as methanol, isopropyl alcohol, acetone, or n-butyl alcohol, or the polymer can be recovered by stripping the solvent or other media with heat or steam. After removal of solvent and monomer, pelletized polymer can be blended with polyolefin(s). If in situ blends are desired, the removal of solvent takes place after intimate mixing with the solution or slurry phase polyolefin.

The lean phase and volatiles removed downstream of the liquid phase separation can be recycled to be part of the polymerization feed. As used herein, "lean phase" refers to the solvent with lean polymer phase. In the process, a degree of separation and purification takes place to remove polar impurities or internally unsaturated olefins that might undermine the activity of the catalyst. Otherwise internally unsaturated olefins which are difficult to polymerize can gradually build up in the lean phase and recycle streams. Any adverse effects on the polymerization activity may be mitigated by removing these olefins from the recycle stream and/or encouraging their incorporation in the polymer, favored by high polymerization temperatures.

In at least one embodiment, a polyethylene composition can be produced in an industrial scale process. For example, the catalyst productivity can be about 20,000 kg polymer per kg of catalyst or more, such as about 40,000 kg polymer per kg of catalyst or more.

Polyethylene Product

Polyethylene compositions of the present disclosure including a comb-block EP copolymer having an EP polymer backbone and one or more branched high density polyethylene combs pendant to the backbone. The combs may have a number average molecular weight (Mn) of at least about 5,000 g/mol, or at least about 8,000 g/mol, or a range from about 5,000 g/mol, or about 8,000 g/mol to about 20,000 g/mol, or about 25,000 g/mol, or about 30,000 g/mol, wherein the polyethylene composition has a branching index (g') of less than about 0.9, or less than about 0.85, or a range from about 0.5, or about 0.55 to about 0.85 or about 0.9. The polyethylene composition may include a comb-block EP copolymer and some unreacted bVT-HDPE. Polyethylene compositions of the present disclosure may have a g' value of from about 0.4, or about 0.5 to about 0.6, or about 0.7, or about 0.8.

In some embodiments, the comb-block copolymer has a melt flow ratio (MFR) of about 6 g/10 min to about 8 g/10 min, according to ASTM D1238 (230° C., 2.16 g).

In at least one embodiment, such polyethylene composition is produced and/or processed in the absence of a chemical modification process (e.g., "post-reactor modification") such as, for example, by oxygen tailoring by extrusion in the presence of oxygen, or other means of effecting crosslinking of the polyethylene such as exposure to gamma-ray and/or x-ray irradiation, or addition of other cross-linking agents.

In at least one embodiment, the polyethylene composition has a bimodal molecular weight distribution, wherein the GPC chromatograph exhibits a positive and negative inflection, or two "peaks" and one "trough." In at least one embodiment, the component A is (1) a comb-block EP copolymer or (2) a combination of a comb-block EP copolymer component and an unreacted bVT-HDPE.

Polyethylene compositions may have a number average molecular weight (Mn) from about 20,000 g/mol, or about 25,000 g/mol to about 40,000 g/mol, or about 50,000, or about 100,000 g/mol, or about 200,000 g/mol. In at least one embodiment, the polyethylene composition has a weight average molecular weight (Mw) from about 50,000 g/mol, or about 75,000 g/mol 400,000 g/mol, or about 300,000 g/mol, or about to about 200,000 g/mol, or about 150,000 g/mol, or about 100,000 g/mol. In at least one embodiment, the polyethylene composition has a z-average molecular weight (Mz) of greater than about 100,000 g/mol, or about 150,000 g/mol, or about 175,000 g/mol, or from about 100,000 g/mol, or about 150,000 g/mol, or about 175,000 g/mol to about 500,000 g/mol, or about 300,000 g/mol, or about 250,000 g/mol. In at least one embodiment the polyethylene composition has a molecular weight distribution (Mw/Mn) of greater than about 2, or about 2.5, or about 3, or from about 2, or about 2.5, or about 3 to about 10, or about 7, or about 5, or about 4.5, or about 4, or about 3.5.

Polyethylene compositions may have a g' vis of about 0.9 or less, such as about 0.8 or less, such as from about 0.5 to about 0.9, or about 0.6 to about 0.85, or about 0.65 to about 0.8, or about 0.7 to about 0.8. In at least one embodiment, the polyethylene composition has an ethylene content of about 50 wt % or greater, such as from about 50 wt % to about 90 wt %, or from about 55 wt % to about 75 wt %, or from about 55 wt % to about 70 wt %, or from about 60 wt % to about 70 wt %, or from about 60 wt % to about 65 wt %. Polyethylene compositions can have a propylene content of about 20 wt % or greater, or about 25 wt % or greater, such as from about 20 wt % to about 50 wt %, or about 25 wt % to about 50 wt %, or about 25 wt % to about 40 wt %, or about 30 wt % to about 40 wt %, determined using FTIR according to ASTM A propylene content, for example, above about 20 wt % can provide a polyethylene composition having a high melting temperature (Tm) such that the polyethylene composition is suitable for use in applications with a need for a high melting temperature. In at least one embodiment, a polyethylene composition has a peak melting temperature (Tm), as determined by the differential scanning calorimetry according to the procedure described in ASTM D3418, of from about 60° C. to about 130° C., or about 70° C. to about 125° C., or about 70° C. to about 120° C., or about 75° C. to about 115° C., or about 80° C. to about 110° C. or about 75° C. to about 85° C., or about 80° C. to about 85° C. (the melt peak on the first cycle is not used here). In at least one embodiment, a polyethylene composition has a peak of crystallization temperature (Tc), as determined by differential scanning calorimetry according to the procedure described in ASTM D3418, of from about 30° C. to about 100° C., or about 40° C. to about 90° C., or about 50° C. to about 75° C., or about 55° C. to about 70° C., or about 60° C. to about 70° C. In at least one embodiment, a polyethylene composition has a glass transition temperature (Tg), as determined by differential scanning calorimetry according to the procedure described in ASTM D3418, of from about −80° C. to about 0° C., or about −70° C. to about −20° C., or about −70° C. to about −30° C., or about −70° C. to about −40° C., or about −65° C. to about −55° C.

In at least one embodiment, the HDPE combs in the polyethylene composition has a peak melting temperature (Tm), as determined by the differential scanning calorimetry using the procedure described in ASTM D3418, of from about 60° C. to about 135° C., or about 70° C. to about 130° C., or about 70° C. to about 120° C., or about 75° C. to about 110° C. (the melt peak on the first cycle is not used here). In some embodiments, the HDPE combs in the polyethylene composition has a peak melting temperature of at least about 120° C., such as at least about 125° C., such as at least about 130° C. In at least one embodiment, the HDPE combs in the polyethylene composition have a crystallization temperature (Tc), as determined by differential scanning calorimetry according to the procedure described in ASTM D3418, of from about 30° C. to about 125° C., or about 40° C. to about 120° C., or about 50° C. to about 110° C., or about 55° C. to about 110° C. In at least one embodiment, the HDPE combs of the polyethylene composition have a glass transition temperature (Tg), as determined by differential scanning calorimetry using the procedure described in ASTM D3418, of from about −80° C. to about 0° C., or about −70° C. to about −20° C., or about −70° C. to about −30° C., or about −70° C. to about −40° C., or about −65° C. to about −55° C.

Polyethylene compositions can have a heat of melting (ΔHm), as determined by the differential scanning calorimetry procedure described below, of from 6 J/g to 15 J/g, such as from 9 J/g to 12 J/g. The heat of melting is proportional to how much crystallinity is present in the polyethylene composition. Typically, ΔHm is normalized by the weight of the sample being tested and reported as J/g. Polyethylene compositions can have a cold crystallization (ΔHc), as determined by the differential scanning calorimetry procedure described below, of from about 4 J/g to about 12 J/g, such as from about 7 J/g to 9 J/g. The crystallinity can be derived from both the high density polyethylene combs and ethylene/propylene copolymer back bone.

As characterized by $C^{13}$ NMR, a polyethylene composition can have from about 1, or about 1.2, or about 1.3 to about 2, or about 3, or about 4 branches per 1,000 carbon atoms. In at least one embodiment, a polyethylene composition has a density of greater than about 0.935 g/cm$^3$, or about 0.94 g/cm$^3$, or from about 0.935 g/cm$^3$, or about 0.94 g/cm$^3$ to about 0.955 g/cm$^3$, or about 0.960 g/cm$^3$, or about 0.965 g/cm$^3$, according to ASTM D1505.

As characterized by $C^{13}$ NMR, the HDPE combs can have from about 0.1, or about 0.2, or about 0.5 or about 1, or about 1.2, or about 1.3 to about 2, or about 3, or about 4 branches per 1,000 carbon atoms. In at least one embodiment, the HDPE combs have a density of at least about 0.91, or at least about 0.90, or from about 0.91 to about 0.95 g/cm$^3$, according to ASTM D1505.

In at least one embodiment, the melt strength of a composition (e.g., of a film as described below) may be from about 1 cN to about 540 cN, about 1 cN to about 50 cN, about 1 cN to about 25 cN, about 3 cN to about 15 cN, about 4 cN to about 12 cN, or about 5 cN to about 10 cN, or about 5 cN to about 15 cN, when measured at 190° C. In some embodiments, the composition has a melt strength of at least about 5 cN, at least about 10 cN, or at least about 15 cN, and about 30 up to about 20 cN, when measured at 190° C. The melt strength of a composition at a particular temperature may be determined with a Gottfert Rheotens Melt Strength Apparatus. To determine the melt strength, a composition (e.g., of a film) melt strand extruded from the capillary die is gripped between two counter-rotating wheels on the apparatus. The take-up speed is increased at a constant acceleration of about 12 mm/s$^2$. The maximum pulling force (in the unit of cN) achieved before the strand breaks or starts to show draw-resonance is determined as the melt strength. The temperature of the rheometer is set at 190° C. The capillary die has a length of about 30 mm and a diameter of about 2 mm. The film melt is extruded from the die at a speed of about 10 mm/s. The distance between the die exit and the wheel contact point should be about 122 mm.

The polyethylene compositions of the present disclosure can be useful in a number of applications, and can be useful as an additive or modifier for other types of polyolefins, especially other EP copolymers that are typically linear. More particularly, the polyethylene compositions may be a modifier for polyethylene, polypropylene, or blend of polyethylene/polypropylene, or a linear and/or bimodal polymer. In at least one embodiment a polyethylene composition is a modifier for another polyolefin composition having from about 0.05 wt %, or about 0.5 wt %, or about 1 wt % to about 6 wt %, or about 7.5 wt %, or about 10 wt % by weight of the polyethylene composition. Desirable uses include pipes and conduits, and other molded articles of manufacture. Other uses include blow molded articles, especially for large articles, and film making, especially blown films. The polyethylene compositions of the present disclosure may also be useful in foamed articles.

Component A: Polyethylene Composition

In some embodiments, component A is a comb-block copolymer. In some embodiments, component A is a polyethylene composition having a comb-block copolymer. For example, the comb-block copolymer has a structure with an ethylene/propylene ("EP") copolymer backbone and one or more branched high density polyethylene ("HDPE") combs pendant to the backbone. For example, the EP backbone, HDPE comb block structure is referred to as "EP-cb-HDPE". For example, the comb-block copolymer can be prepared with a first salan catalyst precursor and an activator then introduced to ethylene to form branched vinyl/vinylidene-terminated high density polyethylene "bVT-HDPE." The branched vinyl/vinylidene-terminated high density polyethylene can be introduced to ethylene, propylene, and a second catalyst precursor and an activator to form a comb-block EP copolymer having an EP copolymer backbone and HDPE sidechains. In other words, one "block" of the comb-block copolymer is derived from the bVT-HDPE in a first stage or reactor, and another "block" is derived from polymer made in a second stage or reactor that also incorporates the bVT-HDPE blocks, thus producing a "comb-like" structure. The serial stage or reactor approach delivers concentrated bVT-HDPE macronomomer feed in the second stage or reactor for high incorporation and high degree of branching. The bVT-HDPE having a branching index ($g'_{vis}$) of less than 0.98 and vinyl and/or vinylidene content (e.g., of greater than 90%) may be synthesized using a salan catalyst. Hence, after copolymerization with ethylene and propylene in the second reactor, EP-cb-HDPE is produced while some bVT-HDPE remains, thus forming an example of a "polyethylene composition." An exemplary polyethylene composition can provide glass transition temperatures and melting temperatures that allow for applications in low temperature ductility, adhesion, compatibilization, compound modifiers, etc. In addition, the long chain branching of the comb-block EP copolymer (and compositions thereof) can provide high melt strength, which is beneficial for film blowing, thermoforming, extrusion casting, and foaming.

An exemplary comb-block copolymer (or polyethylene composition thereof) of the present disclosure can provide one or more benefits over conventional comb-block polymers and or conventional compositions. For example, a composition having high density polyethylene (HDPE) and ethylene-propylene (EP) polymers is typically not miscible because the microstructure of HDPE differs substantially from the microstructure of EP. Comb-block copolymer with EP backbone and HDPE side chains, or "EP-cb-HDPE copolymers," however, can bring these different microstructures together into one molecule. So, for compatibilization applications and compounding applications, it has been discovered that a mixture of HDPE and EP would not work, while the comb microstructure of EP-cb-HDPE would. Also, a composition of HDPE and EP polymers is still a composition of linear polymers. So, the conventional composition would not have high melt strength whereas a EP-cb-HDPE does due to the comb-structure's long chain branching properties. The long chain branching properties can make the comb-block copolymers useful for, at least, foaming or thermoplastic olefin applications that involve high melt strength specifications. Also, the long chain branching properties of copolymers and compositions of an exemplary polyethylene composition can allow higher filler loading than a conventional mixture of HDPE and EP polymers. Additional filler/color loading provides improved master batch applications, improved heavy layer mat applications, etc.

In at least one aspect of the present disclosure, the HDPE "combs" have a number average molecular weight (Mn) of at least about 5,000 g/mole, or at least about 8,000 g/mol, or from about 5,000 g/mol, or about 8,000 g/mol to about 20,000 g/mol, or about 25,000 g/mol, or about 30,000 g/mol. In some embodiments, the HDPE combs have a number average molecular weight of about 20,000 g/mol or less, such as about 15,000 g/mol or less. In some embodiments, the HDPE combs has an ethylene content of at least about 95 wt %, such as at least 98 wt %, by total weight of the HDPE combs.

In some embodiments, component A includes EP-cb-HDPE and some unincorporated bVT-HDPE. As referred to herein, a "high density polyethylene" (HDPE) is any polyethylene comprising at least 80 wt %, by weight of the polymer, of ethylene derived units and has a density of at least 0.89 g/cm$^3$, such as at least 0.93 g/cm$^3$ in accordance with ASTM D1505. Such HDPE's may be branched as referred to herein. In some embodiments, the high density polyethylene is a copolymer of ethylene and one or more of $C_1$ to $C_{12}$ alpha-olefins such as propylene, 1-butene, 1-hexene and 1-octene.

Component B: Polypropylene

Polypropylenes (also referred to as "propylene-based polymers") include those typically high-molecular weight plastic resins that primarily include units deriving from the polymerization of propylene. In some embodiments, at least 75%, in other embodiments at least 90%, in other embodiments at least 95%, and in other embodiments at least 97% of the units of the propylene-based polymer are derived from the polymerization of propylene. For example, a "propylene homopolymer" is a polypropylene-based polymer with little or substantially no comonomer content, such as about 5 wt % or less, about 4 wt % or less, about 1 wt % or less, 0.5 wt % or less, 0.1 wt % or less, or 0.05 wt % or less (substantially no comonomer).

A wide range of polypropylene homopolymers are available in the market with a wide range of physical properties including homopolymer suitable for general-purpose injection molding, automotive applications, compounding, consumer applications, cast film, medical/healthcare applications, and packaging.

In some embodiments, a polypropylene includes a homopolymer of a high-crystallinity isotactic or syndiotactic polypropylene. For example, the polypropylene can have a density of from about 0.89 g/cm$^3$ to about 0.91 g/cm$^3$, or from about 0.8 g/cm$^3$ to about 1.0 g/cm$^3$, such as an isotactic polypropylene having a density of from about 0.90 g/cm$^3$ to about 0.91 g/cm$^3$. Also, high and ultra-high molecular weight polypropylene that has a melt flow rate (MFR) of about 1 or less can be employed. In some embodiments, polypropylene resins may be characterized by a MFR that is about 11 g/10 min to about 15 g/10 min or less, according to ASTM D1238 (2.16 kg @ 230° C.). In some embodiments, polypropylene has a molecular weight ($M_w$) of about 200,000 g/mol to about 270,000 g/mol, such as from about 200,000 g/mol to about 220,000 g/mol according to GPC-3D. For example, the molecular weight ($M_w$) for the polypropylene can be approximated from the MFR of the polypropylene according to the correlation equation, $M_w = 543337 * MFR^{-0.309}$. For example, polypropylene with an MFR of from about 10 g/10 min to about 15 g/10 min can have an approximate $M_w$ of from about 235,000 g/mol to about 267,000 g/mol. In some embodiments, polypropylene has an Izod impact strength of from about 15 J/m to about 55 J/m, or about 17 J/m to about 21 J/m, at room temperature according to ASTM D256A. In some embodiments, the polypropylene has an Izod impact strength of from about 10 J/m to about 25 J/m, such as from about 15 J/m to about 17 J/m, at −29° C. according to ASTM D256A. In some embodiments, the polypropylene has a flexural modulus of from about 1,000 MPa to about 1,500 MPA, such as from about 1,250 MPa to about 1,300 MPa, according to ASTM D790A.

In some embodiments, the polypropylene includes a homopolypropylene of high melt strength useful for producing impact copolymers of polypropylene. For example, the polypropylene can have a density of from about 0.8 g/cm$^3$ to about 1.0 g/cm$^3$, or about 0.9 g/cm$^3$. In some embodiments, polypropylene may be characterized by a MFR that is about 0.8 g/10 min to about 2.0 g/10 min, or about 0.83 g/10 min to about 1.8 g/10 min, according to ASTM D1238 (2.16 g @ 230° C.). In some embodiments, polypropylene has a molecular weight ($M_w$) of about 140,000 g/mol to about 180,000 g/mol (GPC-3D). In some embodiments, polypropylene has an Izod impact strength of from about 40 J/m to about 55 J/m, or about 44 J/m to about 50 J/m, at room temperature according to ASTM D256A. In some embodiments, the polypropylene has an Izod impact strength of from about 10 J/m to about 30 J/m, such as from about 17 J/m to about 25 J/m, at −18° C. according to ASTM D256A. In some embodiments, the polypropylene has a flexural modulus of from about 1,000 MPa to about 1,136 MPa to about 1,704 MPa, according to ASTM D790A.

In some embodiments of the present disclosure, comb-block copolymer (or a composition thereof) (as component A) is blended with neat propylene homopolymer (component B). In some embodiments, comb-block copolymer is blended with a copolymer of polypropylene (component B). In some embodiments, the comb-block copolymer (component A) is blended with propylene-based polymers comprising at least one other copolymer. For example, an exemplary composition of the present disclosure includes component A, component B, and an ethylene-propylene rubber, e.g. as described below.

Component C: Ethylene-Propylene Rubber

In some aspects of the present disclosure, a composition includes a comb-block copolymer, a polypropylene, and an ethylene-propylene rubber ("EP rubber"). EP rubber can provide improved impact properties, as compared to compositions of the present disclosure without EP rubber. EP rubber is formed by polymerization of ethylene and propylene. The EP rubber includes those solid, typically high-molecular weight resins that include units derived from the polymerization of ethylene, units derived from polymerization of propylene, and optionally units derived from polymerization of at least one α,ω-diene. In some embodiments, EP rubber includes units deriving from the polymerization of additional α-olefins selected from 1-butene, 1-hexene, 1-octene, 2-methyl-1-propene, 3-methyl-1-pentene, 4-methyl-1-pentene, 5-methyl-1-hexene, or mixtures thereof.

In some embodiments, EP rubber includes a propylene content of about 20 wt % or more, about 30 wt % or more, about 35 wt % or more, about 40 wt % or more, about 45 wt % or more, about 50 wt % or more, or about 60 wt % or more. Additionally, EP rubber may include a propylene content at about 90 wt % or less, about 85 wt % or less, about 80 wt % or less, about 75 wt % or less, about 70 wt % or less, or about 65 wt % or less. For example, EP rubber may include a propylene content from about 30 wt % to about 80 wt %, from about 35 wt % to about 70 wt %, from about 40 wt % to about 65 wt %, or from about 60 wt % to about 80 wt %.

In some embodiments, EP rubber includes an ethylene content of about 20 wt % or more, about 25 wt % or more, about 30 wt % or more, about 35 wt % or more, about 40 wt % or more, or about 45 wt % or more. Additionally, EP rubber may have an ethylene content of about 85 wt % or less, about 80 wt % or less, about 75 wt % or less, about 70 wt % or less, about 65 wt % or less, about 60 wt % or less, or about 55 wt % or less. For example, EP rubber may have an ethylene content from about 20 wt % to about 80 wt %, from about 25 wt % to about 75 wt %, from about 30 wt % to about 70 wt %, from about 35 wt % to about 65 wt %, from about 40 wt % to about 60 wt %, from about 45 wt % to about 55 wt %, or from about 20 wt % to about 45 wt %, determined using FTIR according to ASTM D3900.

In some embodiments, the EP rubber includes ethylene propylene diene monomer (EPDM). As used herein, the term "EPDM" or "EPDM terpolymer" refers to a terpolymer composed of units derived from ethylene, one or more α-olefins such as propylene, and one or more polyenes, preferably one or more dienes). In some embodiments, EPDM terpolymer includes about 50 to about 80 wt % ethylene, about 0.5 wt % to about 20 wt % of a diene monomer, and about 0.5 wt % to about 49.5 wt % propylene. In some embodiments, the diene monomer is a non-conjugated diene, such as 1,4-hexadiene, dicyclopentadiene, ethylidene norbornene, and any combination thereof. In at least one embodiment, the diene monomer is 5-Ethylidene-2-norbornene (ENB). In at least one embodiment, the EPDM terpolymer includes from about 4 to about 15 wt % ENB, from about 45 wt % to about 75 wt % ethylene; and from about 25 wt % to about 55 wt % propylene. EPDM terpolymers useful for EP rubbers of the present disclosure have a number average molecular weight (Mw) of about 50,000 g/mol to about 1,000,000 g/mol, such as from about 80,000 g/mol to about 750,000 g/mol, such as from 100,000 g/mol to about 720,000 g/mol. The Mooney viscosity (ML, 1+4 @ 125° C.) of the EPDM terpolymer is about 30 MU to about 100 MU, such as from about 50 MU to about 100, and most preferably, about 60 MU to about 90 MU, in accordance with ASTM D1646-04. In some embodiments, the EPDM has a Mooney viscosity of 100 mu or more.

Impact Copolymers

As discussed above, compositions of the present disclosure can further include EP rubber. The combination of a propylene-based polymer ("component B") and EP rubber ("component C") of compositions of the present disclosure can be referred to as an "impact copolymer" (alternatively an "impact polymer component") of a composition. Impact copolymers ("ICP") typically include at least two components and may include, for example, a propylene-based polymer ("component B") and EP rubber ("component C"). An ICP may include from about 40 wt % to about 95 wt % propylene-based polymer and from about 5 wt % to about 60 wt % EP rubber, or from about 50 wt % to about 90 wt % propylene-based polymer and from about 10 wt % to about 50 wt % EP rubber, or from about 60 wt % to about 90 wt % propylene-based polymer and from about 10 wt % to about 40 wt % EP rubber, or from about 70 wt % to about 85 wt % propylene-based polymer and from about 15 wt % to about 30 wt % EP rubber. In some embodiments, the ICP may consist essentially of propylene-based polymer and EP rubber.

The overall comonomer (e.g., ethylene and optional α,ω-diene) content of the ICP may be from about 3 wt % to about 40 wt %, or from about 5 wt % to about 25 wt %, or from about 6 wt % to about 20 wt %, or from about 7 wt % to about 15 wt %.

The ICPs may, in some embodiments, be reactor blends, meaning that components B and C are not physically or mechanically blended together after polymerization but are produced in the same polymerization system with at least one reactor, often in two or more reactors in series. The ICP as obtained from the reactor or reactors, however, is then blended with various other components including other polymers or additives, such as comb-block copolymer (component A). In other embodiments, however, an ICP may be formed by producing components B and C in separate reactors and physically blending the components (e.g., along with component A) once they have exited their respective reactors.

In some embodiments, an ICP may be described as "heterophasic." The term "heterophasic" means that the polymers have two or more phases in solid state. Typically, heterophasic ICPs include a matrix component in one phase and an elastomeric component phase in solid state, for example rubber phase, dispersed within the matrix of polypropylene.

In some embodiments, the ICPs include a matrix phase including a propylene-based polymer (component B) and a dispersed phase including an EP rubber (component C). The EP rubber (component C) has rubbery characteristics and provides impact resistance, while the propylene-based polymer (component B) provides overall stiffness. Examples of polypropylene useful for ICP production may include polypropylenes with broad molecular weight distribution as described in U.S. Pat. Nos. 9,453,093 and 9,464,178; or other polypropylenes described in US2018/0016414 or US2018/0051160. Examples of polypropylene useful for ICP production may include ExxonMobil™ PP5341 (available from ExxonMobil Chemical Co., Baytown, TX); Achieve™ PP6282NE1 (available from ExxonMobil Chemical Co., Baytown, TX); Waymax MFX6 (available from Japan Polypropylene Corp.); Borealis Daploy™ WB140 (available from Borealis AG); and Braskem Ampleo 1025MA and Braskem Ampleo 1020GA (available from Braskem Ampleo). In some embodiments, polypropylene use for ICP production may have molecular weight ($M_w$) of about 140,000 to about 180,000 (GPC-3D). In some embodiments, polypropylene useful for ICP production may have an MFR of about 60 g/10 min to about 80 g/10 min, according to ASTM D1238 (230° C., 2.16 g).

In at least one embodiment, an ICP (component B+component C) has a melt flow ratio (MFR) of about 25 g/10 min or greater, such as about 30 g/10 min or greater, such as from about 40 g/10 min to about 100 g/min, according to ASTM D1238 (230° C., 2.16 g). In some aspects of some embodiments, the ICP has one or more of the following properties: an average particle size of about 0.17 μm or greater; an Izod impact strength of from about 72 J/m to about 85 J/m, at room temperature according to ASTM D256A; or a flexural modulus of from about 1,200 MPa to about 1,350 MPa, according to ASTM D790A. In some embodiments, an ICP has a stress whitening reduction of greater than about 19, such as greater than about 21, such as greater than about 23, on the Hunter L scale according to Gardner impact test ASTM 5420-04, modified as described herein.

It has been found that one or more of these properties of component B when combined with component C exhibit favorable impact properties. The inventors have found that the combination of components B and C can be further improved by blending with the comb-block copolymer (component A) of the present disclosure. Moreover, the inventors have also found that the properties of component B can also be improved by blending with the comb-block copolymer (component A) of the present disclosure.

Compositions of Component a (Comb-Block Copolymer)+Component B (Polypropylene)+Optionally Component C (EP Rubber)

In some embodiments, the composition produced herein is a combination of comb-block copolymer (component A) and polypropylene (component B) prior to being formed into a film, molded part or other article. The compositions may be produced by mixing component A of the present disclosure with component B. The mixing may be done using conventional equipment and methods, for example, the components are combined by connecting reactors together in series to make reactor blends or by using more than one catalyst in the same reactor to produce multiple species of polymer. The polymers can be mixed together prior to being put into the extruder or may be mixed in an extruder. For example, the polymers can be dry mixed in granular form using, for example, a tumble blender, where the granules (and optional additive) are brought into contact first, without intimate mixing, which may then be followed by melt blending in an extruder. In some embodiments, each component can be formed into pellets before being melt-blended in a homogenizer. In some embodiments, the homogenizer is a single-screw extruder, or a multi-screw extruder, the extruder may include a compounding extruder and a side-arm extruder used directly downstream of a polymerization process, which may include blending powders or pellets of the resins at the hopper of the extruder. In some embodiments, the homogenizer is a batch mixer, such as, for example, a Banbury mixer, a Haake mixer, a Brabender internal mixer.

In some embodiments, the method of blending involves a "master batch" approach, where the final concentration of components is achieved by combining a neat polymer with an appropriate amount of component A that had been previously prepared at a higher component A concentration. The mixing may take place as part of a processing method used to fabricate articles, such as in the extruder on an injection molding machine or blown-film line or fiber line.

In at least one embodiment of the present disclosure, component A and component B, along with optional additional polymers, and optional additional additive(s) may be "melt blended" in an apparatus such as an extruder (single or twin screw) or batch mixer or may be "dry blended" with one another using a tumbler, double-cone blender, ribbon blender, or other suitable blender. In yet another embodiment, the polymers and the optional additional additive(s) are blended by a combination of approaches, for example a tumbler followed by an extruder. A suitable method of blending is to include the final stage of blending as part of an article fabrication step, such as in the extruder used to melt and convey the composition for a molding step like injection molding or blow molding. This can include direct injection of one or more polymer and/or elastomer into the extruder, either before or after a different one or more polymer and/or elastomer is fully melted. Extrusion technology for polymers is described in more detail in, for example, *Plastics Extrusion Technology* p. 26-37 (Friedhelm Hensen, ed. Hanser Publishers 1988).

Additionally, additives may be included in the composition, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from BASF); phosphites (e.g., IRGAFOS™ 168 available from BASF); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Polypropylene manufacturers often offer a select number of high volume grades in its grade slate, for example, a homopolymer exhibiting known melt properties. Typically, customized solutions are provided to consumers of various industries that require tailoring of physical proprieties based on how the grade will be processed and used. One solution for consumers requiring greater impact strength is to blend the homopolypropylene grade with elastomeric compositions. In particular, Vistamaxx™ performance polymers are propylene based thermoplastic elastomers that have been widely used as PP modifiers in part due to its toughness, elasticity, softness, sealability, transparency and adhesion. Vistamaxx™ polymers are typically composed of isotactic propylene repeat units with random ethylene distribution, and produced using metallocene catalyst technology.

In an exemplary embodiment, the composition comprises less than about 20 wt % of component A, based on the total weight of the composition. In some embodiments, the composition comprises about 0.1 wt % to 20 wt % component A, or about 1 wt % to 10 wt % component A, or about 3 wt % to 7 wt % of component A, or about 7 wt % to 13 wt % of component A. For example, the composition comprises greater than about 80 wt % polypropylene (component B), based on the total weight of the composition. In some embodiments, the composition comprises about 80 wt % to about 99.9 wt % component B, or about 90 wt % to 99 wt % component B, or about 93 wt % to 97 wt % of component B, or about 88 wt % to 92 wt % of component B, based on the total weight of the composition. In some embodiments the composition comprises less than 3 wt % total additive, or less than about 2 wt % additive, based on the total weight of the composition. For example, the composition comprises about 1 wt % of antioxidant. By way of example, the composition comprises about 0.5 wt % IRGANOX™ 1010 and about 0.5 wt % IRGAFOS™ 168. In some embodiments, the composition comprises about 0.5 wt % filler, such as talc.

Exemplary compositions of the present disclosure having polypropylene homopolymer and comb-block copolymer provide an improvement to notched Izod impact strength of the homopolymer component at both room temperature (23° C.) and low temperature (-29° C.) in accordance with ASTM D256A. For example, the notched Izod impact strength at room temperature ("RTNI") of a molded sample made from an exemplary composition of the present disclosure can be from about 35 J/m to about 56 J/m, or from about 46 J/m to about 56 J/m, or from about 50 J/m to about 56 J/m, and has a flexural modulus from about 1,010 MPa to about 1,180 MPa, or from about 1,080 MPa to about 1,180 MPa, or from about 1,100 MPa to about 1,180 MPa, according to ASTM D790A. The exemplary results are about 1.5 times, the notched Izod impact strength of a homopolypropylene component. For example, the notched Izod impact strength of the composition is about 33% greater, or about 25%, or about 10% greater than the Izod impact strength of the homopolypropylene component. In addition, a molded sample made from an exemplary composition has a reduction of flexural modulus of less than about 15%, or less than about 10%, or less than about 6%, as compared to the homopolypropylene alone. In some embodiments, the RTNI of a molded sample made from an exemplary composition of the present disclosure is at least about 2 times, such as from about 2 to about 3.3 times, or from about 2 to about 3 times, the RTNI of the homopolypropylene with a reduction of flexural modulus less than about 15%, or less than about 10%, or less than about 6%, as compared to a molded sample made from homopolypropylene alone. For example, the notched Izod impact strength at -29° C. ("LTNI") of a molded sample made from an exemplary composition of the present disclosure is from about 23 J/m to about 27 J/m, or about 25 J/m to about 27 J/m. The results are at least about 10% greater than the LTNI of the homopolypropylene with a reduction of flexural modulus less than about 15%, or less than about 10%, or less than about 6%. In some embodiments, the LTNI of a molded sample made from an exemplary composition of the present disclosure is at least about 30% greater, such as from about 30% to 100% greater. For example, a molded sample made from an exemplary composition of the present disclosure has an LTNI from about 30% to 100% greater than the LTNI of the homopolypropylene with a reduction of flexural modulus less than about 15%, or less than about 10%, or less than about 6%, as compared to the homopolypropylene alone.

Compositions of Component a (Comb-Block Copolymer)+Component B (Polypropylene)+Component C (EP Rubber)

In some embodiments, the composition produced herein is a combination of comb-block copolymer (component A), polypropylene (component B), and EP rubber (component C) prior to being formed into a film, molded part or other article. In some embodiments, the polymer with a polypropylene component and an EP rubber component is an impact copolymer of polypropylene (ICP). In an exemplary embodiment, the composition comprises less than about 20 wt % of component A, based on the total weight of the composition. In some embodiments, the composition comprises about 0.1 wt % to 20 wt % component A, or about 1 wt % to 10 wt % component A, or about 3 wt % to 7 wt % of component A, or about 7 wt % to 13 wt % of component A, based on the total weight of the composition. For example, the composition comprises greater than about 80 wt % ICP (component B+component C), based on the total weight of the composition. In some embodiments, the composition comprises about 80 wt % to about 99.9 wt % ICP, or about 90 wt % to 99 wt % ICP, or about 93 wt % to 97 wt % ICP, or about 88 wt % to 92 wt % ICP, based on the total weight of the composition. In some embodiments the composition comprises less than 3 wt % total additive, or less than about 2 wt % additive, based on the total weight of the composition. For example, the composition comprises about 1 wt % of antioxidant. By way of example, the composition comprises about 0.5 wt % IRGANOX™ 1010 and about 0.5 wt % IRGAFOS™ 168. In some embodiments, the composition comprises about 0.5 wt % filler, such as talc.

In some embodiments, a molded sample made from an exemplary composition has an Izod impact strength of from about 400 J/m to about 700 J/m, or about from 500 J/m to about 700 J/m, or about 600 J/m to about 700 J/m, at room temperature according to ASTM D256A and the sample has a flexural modulus of from about 800 MPa to about 1400 MPa, or about 1,000 MPa to about 1,400 MPa, or about 1,200 MPa to about 1,400 MPa, according to ASTM D790A. In some embodiments, a molded sample made from an exemplary composition has an average particle size of from about 0.2 µm to about 0.8 µm, such as from about 0.4 µm to about 0.5 µm. In some embodiments, samples prepared from the composition has a stress whitening reduction of less than about 10, such as less than about 5, such as less than about 3 on the Hunter L scale according to Gardner impact test ASTM 5420-04, modified as described herein.

By way of comparison, a molded sample made from an exemplary composition of the present disclosure having ICP and comb-block copolymer provide an improvement to notched Izod impact strength of the ICP component at room temperature (23° C.) with minimal effect on flexural modulus results. For example, the notched Izod impact strength at room temperature of a molded sample made from an exemplary composition of the present disclosure is at least about 2 times the notched Izod impact strength of the ICP component with a reduction of flexural modulus of about 20% or less, such as from about 10% to about 15%, or about 10% to about 13%. In some embodiments, the RTNI of a molded sample made from exemplary composition of the present disclosure is at least about 3 times, such as from about 3 to 5 times, or from about 5 to 8 times, the RTNI of the ICP component with a reduction of flexural modulus less than about 20%, such as from about 10% to about 15%, or about 10% to about 13%.

Blends

In at least one embodiment, the polyethylene composition produced herein is combined with one or more additional polymers prior to being formed into a film, molded part or other article. The one or more additional polymers can include polyethylene, isotactic polypropylene, highly isotactic polypropylene, syndiotactic polypropylene, random copolymer of propylene and ethylene, and/or butene, and/or hexene, polybutene, ethylene vinyl acetate, low density polyethylene (LDPE), linear low density polyethylene (LLDPE), high density polyethylene (HDPE), ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polyethylene composition is present in the above blends, at from about 10 wt% to about 99 wt%, based upon the weight of the polymers in the blend, such as about 20 wt% to about 95 wt%, such as at least about 30 wt% to about 90 wt%, such as at least about 40 wt% to about 90 wt%, such as at least about 50 wt% to about 90 wt%, such as at least about 60 wt% to about 90 wt%, such as at least about 70 wt% to about 90 wt%.

The blends described above may be produced by mixing a polyethylene composition of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; and talc.

Films

Polyethylene compositions (and or blends thereof) of the present disclosure can be used in monolayer films or multilayer films. These films may be formed by any suitable extrusion or coextrusion technique. Films may be unoriented, uniaxially oriented, or biaxially oriented. Physical properties of the film may vary depending on the film forming techniques used.

One or more of the foregoing polymers, such as the foregoing blends thereof, may be used in a variety of end-use applications, such as mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxial orientation can be accomplished using typical cold drawing or hot drawing methods. Biaxial orientation can be accomplished using tenter frame equipment or a double bubble process and may occur before or after the individual layers are brought together. For example, a composition layer can be extrusion coated or laminated onto an oriented composition layer or both composition layers can be coextruded together into a film and then oriented. Likewise, oriented composition could be laminated to oriented composition or oriented composition could be coated onto polypropylene or polyethylene (or vice versa) then optionally the combination could be oriented even further. In some embodiments, the films are oriented in the Machine Direction (MD) at a ratio of up to about 15, such as from about 3 to about 15, alternatively from about 1 to about 3, such as from about 5 to about 7, and in the Transverse Direction (TD) at a ratio of up to about 15, such as from about 3 to about 15, alternatively from about 1 to about 3, such as about 7 to about 9. However, in at least one embodiment the film is oriented to the same extent in both the MD and TD directions.

The films may vary in thickness depending on the intended application; however, films of a thickness from about 1 μm to about 150 μm are usually suitable, such as from about 10 μm to about 150 μm. Films intended for packaging are usually from about 10 μm to about 70 μm thick. The thickness of the sealing layer is typically about 0.2 μm to about 50 μm. There may be a sealing layer on both the inner and outer surfaces of the film or the sealing layer may be present on only the inner or the outer surface.

In at least one embodiment, one or more layers may be modified by corona treatment, electron beam irradiation, gamma irradiation, flame treatment, or microwave. In at least one embodiment, one or both of the surface layers is modified by corona treatment.

Films of the present disclosure include any suitable film structure and film application. Specific end use films include, for example, blown films, cast films, stretch films, stretch/cast films, stretch cling films, stretch handwrap films, machine stretch wrap, shrink films, shrink wrap films, green house films, laminates, and laminate films. Exemplary films are prepared by any suitable technique, such as for example, techniques utilized to prepare blown, extruded, and/or cast stretch and/or shrink films (including shrink-on-shrink applications).

In at least one embodiment, multilayer films (or multiple-layer films) may be formed by any suitable method. The total thickness of multilayer films may vary based upon the application desired. A total film thickness of about 5-100 μm, more typically about 10 μm-50 μm, is suitable for most applications. Those skilled in the art will appreciate that the thickness of individual layers for multilayer films may be adjusted based on desired end-use performance, resin or copolymer employed, equipment capability, and other factors. The materials forming each layer may be coextruded through a coextrusion feedblock and die assembly to yield a film with two or more layers adhered together but differing in composition. Coextrusion can be adapted for use in both cast film or blown film processes. Exemplary multilayer films have at least two, at least three, or at least four layers. In at least one embodiment the multilayer films are composed of five to 11 layers.

To facilitate discussion of different film structures, the following notation is used herein. Each layer of a film is denoted "A" or "B". Where a film includes more than one A layer or more than one B layer, one or more prime symbols (', ", "', etc.) are appended to the A or B symbol to indicate layers of the same type that can be the same or can differ in one or more properties, such as chemical composition, density, melt index, thickness, etc. Finally, the symbols for adjacent layers are separated by a slash (/). Using this notation, a three-layer film having an inner layer disposed between two outer layers would be denoted AB/A'. Similarly, a five-layer film of alternating layers would be denoted AB/A'/B'/A". Unless otherwise indicated, the left-to-right or right-to-left order of layers does not matter, nor does the order of prime symbols; e.g., an A/B film is equivalent to a B/A film, and an A/A'B/A" film is equivalent to an A/B/A'/A" film, for purposes described herein. The relative thickness of each film layer is similarly denoted, with the thickness of each layer relative to a total film thickness of about 100 (dimensionless) indicated numerically and separated by slashes; e.g., the relative thickness of an A/B/A' film having A and A' layers of about 10 μm each and a B layer of about 30 μm is denoted as 20/60/20.

In some embodiments, and using the nomenclature described above, the present disclosure provides for multilayer films with any of the following exemplary structures: (a) two-layer films, such as A/B and B/B'; (b) three-layer films, such as A/B/A', A/A'B, B/A'B' and B/B'/B"; (c) four-layer films, such as A/A'/A"/B, A/A'B/A", A/A'/B/B', A/B/A'B', A/B/B'A', B/A/A'B', A/B/BB", B/A/B'B" and B/B'B"/B'''; (d) five-layer films, such as A/A'/A"/A'''/B, A/A'A"/B/A", A/A'B/A"/A''', A/A'A"/B/B', A/A'B/A"/B', A/A'/B/B'A", AB/A'B'/A", A/B/A'/A"/B, B/A/A'/A"/B', A/A'/B/B'B", AB/A'/B'/B", A/B/B'B"/A', B/A/A'B'B", B/A/B'A'B", B/A/BB"/A', A/B/B'B"/B''', B/A/B'/B"B''', B/B'A/B"'/B''', and B/B'B"/B'''/B''''; and similar structures for films having six, seven, eight, nine, twenty-four, forty-eight, sixty-four, one hundred, or any other number of layers. It should be appreciated that films can have still more layers.

In any of the embodiments above, one or more A layers can be replaced with a substrate layer, such as glass, plastic, paper, metal, etc., or the entire film can be coated or laminated onto a substrate. Thus, although the discussion herein has focused on multilayer films, the films may also be used as coatings for substrates such as paper, metal, glass, plastic, and any other suitable material.

The films can further be embossed, or produced or processed according to other known film processes. The films can be tailored to specific applications by adjusting the thickness, materials and order of the various layers, as well as the additives in or modifiers applied to each layer.

Stretch Films

Compositions of the present disclosure may be utilized to prepare stretch films. Stretch films can be used in a variety of bundling and packaging applications. The term "stretch film" indicates films capable of stretching and applying a bundling force, and includes films stretched at the time of application as well as "pre-stretched" films, i.e., films which are provided in a pre-stretched form for use without additional stretching. Stretch films can be monolayer films or multilayer films, and can include conventional additives, such as cling-enhancing additives such as tackifiers, and non-cling or slip additives, to tailor the slip/cling properties of the film.

Shrink Films

Compositions of the present disclosure may be utilized to prepare shrink films. Shrink films, also referred to as heat-shrinkable films, are widely used in both industrial and retail bundling and packaging applications. Such films are capable of shrinking upon application of heat to release stress imparted to the film during or subsequent to extrusion. The shrinkage can occur in one direction or in both longitudinal and transverse directions. Conventional shrink films are described, for example, in WO 2004/022646.

Industrial shrink films can be used for bundling articles on pallets. Typical industrial shrink films are formed in a single bubble blown extrusion process to a thickness of about 80 to 200 μm, and provide shrinkage in two directions, typically at a machine direction (MD) to transverse direction (TD) ratio of about 60:40.

Retail films can be used for packaging and/or bundling articles for consumer use, such as, for example, in supermarket goods. Such films are typically formed in a single bubble blown extrusion process to a thickness of about 35 μm to 80 μm with a typical MD:TD shrink ratio of about 80:20.

Films may be used in "shrink-on-shrink" applications. "Shrink-on-shrink," as used herein, refers to the process of applying an outer shrink wrap layer around one or more items that have already been individually shrink wrapped (herein, the "inner layer" of wrapping). In these processes, it is desired that the films used for wrapping the individual items have a higher melting (or shrinking) point than the film used for the outside layer. When such a configuration is used, it is possible to achieve the desired level of shrinking in the outer layer, while preventing the inner layer from melting, further shrinking, or otherwise distorting during shrinking of the outer layer. Some films described herein may have a sharp shrinking point when subjected to heat from a heat gun at a high heat setting, which indicates that they may be especially suited for use as the inner layer in a variety of shrink-on-shrink applications.

Greenhouse Films

Compositions of the present disclosure may be utilized to prepare stretch to prepare greenhouse films. Greenhouse films are generally heat retention films that, depending on climate requirements, retain different amounts of heat. Less demanding heat retention films are used in warmer regions or for spring time applications. More demanding heat retention films are used in the winter months and in colder regions.

Bags

Compositions of the present disclosure may be utilized to prepare bags. Bags include those bag structures and bag applications known to those skilled in the art. Exemplary bags include shipping sacks, trash bags and liners, industrial liners, produce bags, and heavy duty bags.

Packaging

Compositions of the present disclosure may be utilized to prepare packaging. Packaging includes those packaging structures and packaging applications known to those skilled in the art. Exemplary packaging includes flexible packaging, food packaging, e.g., fresh cut produce packaging, frozen food packaging, bundling, packaging and unitizing a variety of products. Applications for such packaging include various foodstuffs, rolls of carpet, liquid containers, and various like goods normally containerized and/or palletized for shipping, storage, and/or display.

Blow Molded Articles

Compositions of the present disclosure may be used in suitable blow molding processes and applications. Such processes involve a process of inflating a hot, hollow thermoplastic preform (or parison) inside a closed mold. In this manner, the shape of the parison conforms to that of the mold cavity, enabling the production of a wide variety of hollow parts and containers.

In a typical blow molding process, a parison is formed between mold halves and the mold is closed around the parison, sealing one end of the parison and closing the parison around a mandrel at the other end. Air is then blown through the mandrel (or through a needle) to inflate the parison inside the mold. The mold is then cooled and the part formed inside the mold is solidified. Finally, the mold is opened and the molded part is ejected. The process can be performed to provide any suitable design having a hollow shape, including bottles, tanks, toys, household goods, automobile parts, and other hollow containers and/or parts.

Blow molding processes may include extrusion and/or injection blow molding. Extrusion blow molding is typically suited for the formation of items having a comparatively heavy weight, such as greater than about 12 ounces, including but not limited to food, laundry, or waste containers. Injection blow molding is typically used to achieve accurate and uniform wall thickness, high quality neck finish, and to process polymers that cannot be extruded. Typical injection blow molding applications include, but are not limited to, pharmaceutical, cosmetic, and single serving containers, typically weighing less than 12 ounces.

Injection Molded Articles

Compositions of the present disclosure may also be used in injection molded applications. Injection molding is a process commonly known in the art, and is a process that usually occurs in a cyclical fashion. Cycle times generally range from 10 to 100 seconds and are controlled by the cooling time of the polymer or polymer blend used.

In a typical injection molding cycle, polymer pellets or powder are fed from a hopper and melted in a reciprocating screw type injection molding machine. The screw in the machine rotates forward, filling a mold with melt and holding the melt under high pressure. As the melt cools in the mold and contracts, the machine adds more melt to the mold to compensate. Once the mold is filled, it is isolated from the injection unit and the melt cools and solidifies. The solidified part is ejected from the mold and the mold is then closed to prepare for the next injection of melt from the injection unit.

Injection molding processes offer high production rates, good repeatability, minimum scrap losses, and little to no need for finishing of parts. Injection molding is suitable for a wide variety of applications, including containers, household goods, automobile components, electronic parts, and many other solid articles.

Extrusion Coating

Compositions of the present disclosure may be used in extrusion coating processes and applications. Extrusion coating is a plastic fabrication process in which molten polymer is extruded and applied onto a non-plastic support or substrate, such as paper or aluminum in order to obtain a multi-material complex structure. This complex structure typically combines toughness, sealing and resistance properties of the polymer formulation with barrier, stiffness or aesthetic attributes of the non-polymer substrate. In this process, the substrate is typically fed from a roll into a molten polymer as the polymer is extruded from a slot die, which is similar to a cast film process. The resultant structure is cooled, typically with a chill roll or rolls, and formed into finished rolls.

Extrusion coating materials can be used in, for example, food and non-food packaging, pharmaceutical packaging, and manufacturing of goods for the construction (insulation elements) and photographic industries (paper).

Foamed Articles

Compositions of the present disclosure may be used in foamed applications. In an extrusion foaming process, a blowing agent, such as, for example, carbon dioxide, nitrogen, or a compound that decomposes to form carbon dioxide or nitrogen, is injected into a polymer melt by means of a metering unit. The blowing agent is then dissolved in the polymer in an extruder, and pressure is maintained throughout the extruder. A rapid pressure drop rate upon exiting the extruder creates a foamed polymer having a homogenous cell structure. The resulting foamed product is typically light, strong, and suitable for use in a wide range of applications in industries such as packaging, automotive, aerospace, transportation, electric and electronics, and manufacturing.

Wire and Cable Applications

Also provided are electrical articles and devices including one or more layers formed of or comprising composition(s) of the present disclosure. Such devices include, for example, electronic cables, computer and computer-related equipment, marine cables, power cables, telecommunications cables or data transmission cables, and combined power/telecommunications cables.

Electrical devices can be formed by methods well known in the art, such as by one or more extrusion coating steps in a reactor/extruder equipped with a cable die. Such cable extrusion apparatus and processes are well known. In a typical extrusion method, an optionally heated conducting core is pulled through a heated extrusion die, typically a cross-head die, in which a layer of melted polymer composition is applied. Multiple layers can be applied by consecutive extrusion steps in which additional layers are added, or, with the proper type of die, multiple layers can be added simultaneously. The cable can be placed in a moisture curing environment, or allowed to cure under ambient conditions.

Rotomolded Products

Also provided are rotomolded products including one or more layers formed of or comprising composition(s) of the present disclosure. Rotomolding or rotational molding involves adding an amount of material to a mold, heating and slowly rotating the mold so that the softened material coats the walls of the mold. The mold continues to rotate at all times during the heating phase, thus maintaining even thickness throughout the part and preventing any deformation during the cooling phase. Examples of rotomolded products include but are not limited to furniture, toys, tanks, road signs tornado shelters, containers including United Nations-approved containers for the transportation of nuclear fissile materials.

Additional Aspects

The present disclosure provides, among others, the following aspects, each of which may be considered as optionally including any alternate aspects.

Clause 1. A copolymer comprising:
a first block comprising an ethylene-propylene copolymer; and
a second block comprising a high density polyethylene.

Clause 2. The copolymer of Clause 1, wherein the copolymer comprises a plurality of blocks comprising a high density polyethylene.

Clause 3. The copolymer of Clauses 1 or 2, wherein the ethylene-propylene copolymer has a propylene content of from 75 wt % to 95 wt %, based on the weight of the ethylene-propylene copolymer, as determined by Fourier-transform infrared spectroscopy.

Clause 4. The copolymer of any of Clauses 1 to 3, wherein the ethylene-propylene copolymer has an ethylene content of from 5 wt % to 25 wt %, based on the weight of the ethylene-propylene copolymer, as determined by Fourier-transform infrared spectroscopy.

Clause 5. The copolymer of any of Clauses 1 to 4, wherein the ethylene-propylene copolymer has a weight average molecular weight of from 50,000 g/mol to 300,000 g/mol, based on the molecular weight of the ethylene-propylene copolymer, as determined by gel permeation chromatography-4D.

Clause 6. The copolymer of any of Clauses 1 to 5, wherein the ethylene-propylene copolymer has a weight average molecular weight of from 100,000 g/mol to 200,000 g/mol, based on the molecular weight of the ethylene-propylene copolymer, as determined by gel permeation chromatography-4D.

Clause 7. The copolymer of any of Clauses 1 to 6, wherein the high density polyethylene has a branching index (g') of from 0.8 to 0.95, as determined by gel permeation chromatography-4D.

Clause 8. The copolymer of Clause 1, wherein the copolymer has a branching index (g') of from 0.4 to 0.8, as determined by gel permeation chromatography-4D.

Clause 9. The copolymer of any of Clauses 1 to 8, wherein the copolymer has a branching index (g') of from 0.6 to 0.8, as determined by gel permeation chromatography-4D.

Clause 10. A polyethylene composition comprising:
the copolymer of any of Clauses 1 to 9; and
a branched vinyl/vinylidene-terminated high density polyethylene.

Clause 11. The composition of Clause 10, wherein the branched vinyl/vinylidene-terminated high density polyethylene has a number average molecular weight (Mn) of from 5,000 g/mol to 30,000 g/mol, as determined by gel permeation chromatography-4D.

Clause 12. The composition of Clauses 10 or 11, wherein the branched vinyl/vinylidene-terminated high density polyethylene has a branching index (g') of from 0.8 to 0.95, as determined by gel permeation chromatography-4D.

Clause 13. The composition of any of Clauses 10 to 12, wherein the branched vinyl/vinylidene-terminated high density polyethylene has a level of allyl terminal groups (vinyl and/or vinylidene) of greater than 90% relative to all unsaturated chain ends of the branched vinyl/vinylidene-terminated high density polyethylene, as determined by $^1$H nuclear magnetic spectroscopy.

Clause 14. The composition of any of Clauses 10 to 13, wherein the branched vinyl/vinylidene-terminated high density polyethylene has an Mw/Mn value from 2.0 to 3.2, as determined by gel permeation chromatography-4D.

Clause 15. The composition of any of Clauses 10 to 14, wherein the polyethylene composition has a number average molecular weight (Mn) of from 20,000 g/mol to 100,000 g/mol, as determined by gel permeation chromatography-4D.

Clause 16. The composition of any of Clauses 10 to 15, wherein the polyethylene composition has a number average molecular weight (Mn) of from 25,000 g/mol to 40,000 g/mol, as determined by gel permeation chromatography-4D.

Clause 17. The composition of any of Clauses 10 to 16, wherein the polyethylene composition has a weight average molecular weight (Mw) of from 50,000 g/mol to 200,000 g/mol, as determined by gel permeation chromatography-4D.

Clause 18. The composition of any of Clauses 10 to 17, wherein the polyethylene composition has a weight average molecular weight (Mw) of from 25,000 g/mol to 100,000 g/mol, as determined by gel permeation chromatography-4D.

Clause 19. The composition of any of Clauses 10 to 18, wherein the polyethylene composition has a z-average molecular weight (Mz) of from 100,000 g/mol to 500,000 g/mol, as determined by gel permeation chromatography-4D.

Clause 20. The composition of any of Clauses 10 to 19, wherein the polyethylene composition has a z-average molecular weight (Mz) of from 175,000 g/mol to 250,000 g/mol, as determined by gel permeation chromatography-4D.

Clause 21. The composition of any of Clauses 10 to 20, wherein the polyethylene composition has a molecular weight distribution (Mw/Mn) of from 2 to 10, as determined by gel permeation chromatography-4D.

Clause 22. The composition of any of Clauses 10 to 21, wherein the polyethylene composition has a molecular weight distribution (Mw/Mn) of from 3 to 4, as determined by gel permeation chromatography-4D.

Clause 23. The composition of any of Clauses 10 to 22, wherein the polyethylene composition has a branching index (g') of from 0.6 to 0.85, as determined by gel permeation chromatography-4D.

Clause 24. The composition of any of Clauses 10 to 23, wherein the polyethylene composition has a branching index (g') of from 0.65 to 0.8, as determined by gel permeation chromatography-4D.

Clause 25. The composition of any of Clauses 10 to 24, wherein the polyethylene composition has an ethylene content of from 50 wt % to 90 wt %, based on the weight of the polyethylene composition, as determined by Fourier-transform infrared spectroscopy.

Clause 26. The composition of any of Clauses 10 to 25, wherein the polyethylene composition has an ethylene content of from 60 wt % to 70 wt %, based on the weight of the polyethylene composition, as determined by Fourier transform infrared spectroscopy.

Clause 27. The composition of any of Clauses 10 to 26, wherein the polyethylene composition has a propylene content of from 20 wt % to 50 wt %, based on the weight of the polyethylene composition, as determined by Fourier-transform infrared spectroscopy.

Clause 28. The composition of any of Clauses 10 to 27, wherein the polyethylene composition has a propylene content of from 30 wt % to 40 wt %, based on the weight of the polyethylene composition, as determined by Fourier-transform infrared spectroscopy.

Clause 29. The composition of any of Clauses 10 to 28, wherein the polyethylene composition has a peak melting temperature (Tm) of from 75° C. to 85° C., as determined by differential scanning calorimetry.

Clause 30. The composition of any of Clauses 10 to 29, wherein the polyethylene composition has a heat of crystallization (Tc) of from 60° C. to 70° C., as determined by differential scanning calorimetry.

Clause 31. The composition of any of Clauses 10 to 30, wherein the polyethylene composition has a glass transition temperature (Tg) of from −65° C. to −55° C., as determined by differential scanning calorimetry.

Clause 32. The composition of any of Clauses 10 to 31, wherein the polyethylene composition has a density of from 0.935 g/cm³ to 0.955 g/cm³, as determined by ASTM D1505.

Clause 33. The composition of any of Clauses 10 to 32, wherein the polyethylene composition has a melt strength (at 190° C.) of from 1 cN to 50 cN.

Clause 34. The composition of any of Clauses 10 to 33, wherein the polyethylene composition has a melt strength (at 190° C.) of from 5 cN to 15 cN.

Clause 35. A process for producing a polyethylene composition comprising:
polymerizing ethylene, at a temperature of at least 100° C., by introducing the ethylene to a first catalyst system comprising a first catalyst compound and a first activator to form a branched vinyl/vinylidene-terminated high density polyethylene;
introducing the branched vinyl/vinylidene-terminated high density polyethylene to additional ethylene, propylene, and a second catalyst system comprising a second catalyst compound and a second activator; and
obtaining the polyethylene composition, the polyethylene composition comprising:
a copolymer comprising:
a first block comprising an ethylene-propylene copolymer, and
a second block comprising a high density polyethylene; and
a branched vinyl/vinylidene-terminated high density polyethylene.

Clause 36. The process of Clause 35, wherein the first catalyst compound is represented by Formula (I):

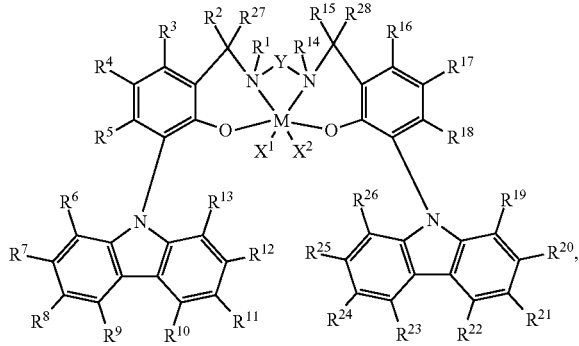

(I)

wherein:
M is a Group 3, 4, 5 or 6 transition metal chemically bonded to each oxygen atom and each nitrogen atom;
each of $X^1$ and $X^2$ is independently a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is independently a hydrogen, a $C_1$ to $C_{40}$ hydrocarbyl, a functional group comprising elements from Group 13 to 17 of the periodic table of the elements, or independently, may join together to form a $C_4$ to $C_{62}$ cyclic or polycyclic ring structure, or a combination thereof; and
Y is a divalent hydrocarbyl radical.

Clause 37. The process of Clauses 35 or 36, wherein the second catalyst compound is represented by Formula (IV):

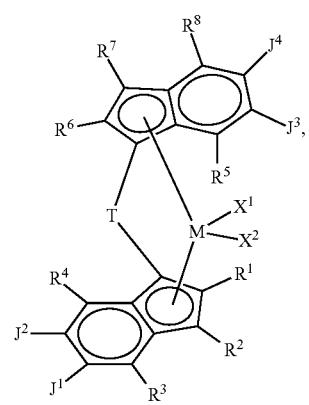

(IV)

wherein:
M is a Group 4 metal such as Hf, Zr, or Ti;
T is a bridging group;
each of $X^1$ and $X^2$ is a univalent anionic ligand, or $X^1$ and $X^2$ are joined to form a metallocycle ring;
each of $R^1$, $R^2$, $R^3$, $R^4$, $R^5$, $R^6$, $R^7$, $R^8$ is independently selected from the group consisting of hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —NR'$_2$, —SR', —OR, —SiR'$_3$, —OSiR'$_3$, —PR'$_2$, or —R"—SiR'$_3$, wherein R" is $C_1$-$C_{10}$ alkyl and each R' is hydrogen, halogen, $C_1$-$C_{10}$ alkyl, or $C_6$-$C_{10}$ aryl;

$J^1$ and $J^2$ are joined to form a substituted or unsubstituted $C_4$-$C_{62}$ saturated or unsaturated cyclic or polycyclic ring structure, or a combination thereof; and $J^3$ and $J^4$ are joined to form a substituted or unsubstituted $C_4$-$C_{62}$ saturated or unsaturated cyclic or polycyclic ring structure, or a combination thereof.

Clause 38. The process of any of Clauses 35 to 37, wherein, for the second catalyst compound represented by Formula (IV), T is Si(CH$_2$)$_4$, each of $J^1$ and $J^2$ and $J^3$ and $J^4$ are joined to form an unsubstituted $C_5$ saturated cyclic ring, each of $R^3$, $R^4$, $R^5$, and $R^8$ is methyl, and each of $R^1$, $R^2$, $R^6$, and $R^7$ is hydrogen.

Clause 39. The process of any of Clauses 35 to 38, wherein the first activator is a borate activator and the second activator is a borate activator.

Clause 40. The process of any of Clauses 35 to 39, wherein the polyethylene composition has:
an ethylene content of from 60 wt % to 70 wt %, based on the weight of the polyethylene composition, as determined by Fourier-transform infrared spectroscopy; and
a propylene content of from 30 wt % to 40 wt %, based on the weight of the polyethylene composition, as determined by Fourier-transform infrared spectroscopy.

Clause 41. The process of any of Clauses 35 to 40, wherein the polyethylene composition has one or more of the following properties:
a number average molecular weight (Mn) of from 25,000 g/mol to 40,000 g/mol, as determined by gel permeation chromatography;
a weight average molecular weight (Mw) of from 25,000 g/mol to 100,000 g/mol, as determined by gel permeation chromatography;
a z-average molecular weight (Mz) of from 175,000 g/mol to 250,000 g/mol, as determined by gel permeation chromatography;
a molecular weight distribution (Mw/Mn) of from 3 to 4, as determined by gel permeation chromatography;
a branching index (g') of from 0.65 to 0.8, as determined by gel permeation chromatography;
a peak melting temperature (Tm) of from 75° C. to 85° C., as determined by differential scanning calorimetry;
a heat of crystallization (Tc) of from 60° C. to 70° C., as determined by differential scanning calorimetry;
a glass transition temperature (Tg) of from −65° C. to −55° C., as determined by differential scanning calorimetry;
a density of from 0.935 g/cm$^3$ to 0.955 g/cm$^3$, as determined by ASTM D1505; or a melt strength (at 190° C.) of from 5 cN to 15 cN.

Clause 42. The process of any of Clauses 35 to 41, wherein the polyethylene composition has five or more of the following properties:
a number average molecular weight (Mn) of from 25,000 g/mol to 40,000 g/mol, as determined by gel permeation chromatography;
a weight average molecular weight (Mw) of from 25,000 g/mol to 100,000 g/mol, as determined by gel permeation chromatography;
a z-average molecular weight (Mz) of from 175,000 g/mol to 250,000 g/mol, as determined by gel permeation chromatography;
a molecular weight distribution (Mw/Mn) of from 3 to 4, as determined by gel permeation chromatography;
a branching index (g') of from 0.65 to 0.8, as determined by gel permeation chromatography;
a peak melting temperature (Tm) of from 75° C. to 85° C., as determined by differential scanning calorimetry;
a heat of crystallization (Tc) of from 60° C. to 70° C., as determined by differential scanning calorimetry;
a glass transition temperature (Tg) of from −65° C. to −55° C., as determined by differential scanning calorimetry;
a density of from 0.935 g/cm$^3$ to 0.955 g/cm$^3$, as determined by ASTM D1505; or
a melt strength (at 190° C.) of from 5 cN to 15 cN.

Clause 43. The process of any of Clauses 35 to 42, wherein the polyethylene composition has each of the following properties:
a number average molecular weight (Mn) of from 25,000 g/mol to 40,000 g/mol, as determined by gel permeation chromatography;
a weight average molecular weight (Mw) of from 25,000 g/mol to 100,000 g/mol, as determined by gel permeation chromatography;
a z-average molecular weight (Mz) of from 175,000 g/mol to 250,000 g/mol, as determined by gel permeation chromatography;
a molecular weight distribution (Mw/Mn) of from 3 to 4, as determined by gel permeation chromatography;
a branching index (g') of from 0.65 to 0.8, as determined by gel permeation chromatography;
a peak melting temperature (Tm) of from 75° C. to 85° C., as determined by differential scanning calorimetry;
a heat of crystallization (Tc) of from 60° C. to 70° C., as determined by differential scanning calorimetry;
a glass transition temperature (Tg) of from −65° C. to −55° C., as determined by differential scanning calorimetry;
a density of from 0.935 g/cm$^3$ to 0.955 g/cm$^3$, as determined by ASTM D1505; and
a melt strength (at 190° C.) of from 5 cN to 15 cN.

Clause 44. A composition comprising:
a polypropylene; and
a copolymer comprising a first block comprising an ethylene-propylene copolymer
and a second block comprising a high density polyethylene.

Clause 45. The composition of clause 44, wherein the polypropylene further comprises ethylene-propylene rubber.

Clause 46. The composition of clauses 44 or 45, wherein the composition has a melt flow ratio (MFR) of about 7 g/10 min or greater, according to ASTM D1238 (230° C., 2.16 g).

Clause 47. The composition of any of clauses 44 to 46, wherein the polypropylene has one or more of the following properties:
a melt flow ratio (MFR) of from about 25 g/10 min to about 35 g/10 min according to ASTM D1238 (230° C., 2.16 g);
an Izod impact strength of from about 72 J/m to about 85 J/m, at room temperature according to ASTM D256A; and a flexural modulus of from about 1,200 MPa to about 1,350 MPa, according to ASTM D790A.

Clause 48. The composition of any of clauses 44 to 47, wherein the composition comprises less than 15 wt % of the copolymer, based on the total weight of the composition.

Clause 49. The composition of any of clauses 44 to 48, wherein the composition comprises from about 4 wt % to about 15 wt % of the copolymer (such as from about 4 wt % to about 10 wt %, such as from about 4 wt % to about 6 wt %), based on the total weight of the composition.

Clause 50. The composition of any of clauses 44 to 49, wherein the polypropylene is homopolypropylene.

Clause 51. The composition of any of clauses 44 to 50, wherein the composition has an Izod impact strength of from about 400 J/m to about 700 J/m, at room temperature according to ASTM D256A.

Clause 52. The composition of any of clauses 44 to 51, wherein the composition has a flexural modulus of from about 800 MPa to about 1,400 MPa, according to ASTM D790A.

Clause 53. The composition of any of clauses 44 to 52 (such as any of clauses 2, 7, or 8), wherein the composition has an average particle size of about 0.4 µm to about 0.5 µm.

Clause 54. The composition of any of clauses 44 to 53, wherein the composition has a stress whitening reduction of less than about 3 on the Hunter L scale according to modified Gardner impact test ASTM 5420-04.

Clause 55. The composition of any of clauses 44 to 54, wherein the polypropylene has one or more of the following properties:
a melt flow ratio (MFR) of about 11 g/10 min to about 15 g/10 min, according to ASTM D1238 (230° C., 2.16 g);
Mw of about 200,000 g/mol to about 270,000 g/mol (GPC-3D);
an Izod impact strength of from about 17 J/m to about 21 J/m, at room temperature according to ASTM D256A;
an Izod impact strength of from about 15 J/m to about 17 J/m, at −29° C. according to ASTM D256A; and
a flexural modulus of from about 1,250 MPa to about 1,300 MPa, according to ASTM D790A.

Clause 56. The composition of any of clauses 44 to 55, wherein the composition has an Izod impact strength of from about 35 J/m to about 60 J/m, at room temperature according to ASTM D256A.

Clause 57. The composition of any of clauses 44 to 56, wherein the composition has an Izod impact strength of from about 23 J/m to about 27 J/m, at −29° C. according to ASTM D256A.

Clause 58. The composition of any of clauses 44 to 57, wherein the composition has flexural modulus of from about 1,000 MPa to about 1,200 MPa, according to ASTM D790A.

Clause 59. The composition of any of clauses 44 to 58, wherein the copolymer has a melt flow ratio (MFR) of about 6 g/10 min to about 8 g/10 min, according to ASTM D1238 (230° C., 2.16 g).

Clause 60. A method of making a composition comprising:
blending a polypropylene with a copolymer comprising a first block comprising an ethylene-propylene copolymer and a second block comprising a high density polyethylene to form the composition.

Clause 61. The method of clause 60, wherein the polypropylene is blended as polypropylene granules, and wherein the copolymer is blended as copolymer granules.

Clause 62. The method of clauses 60 or 61, wherein the polypropylene is blended as polypropylene pellets and wherein the copolymer is blended as copolymer pellets.

Clause 63. The method of any of clauses 60 to 62, further comprising extruding the composition to form pellets.

Clause 64. The method of any of clauses 60 to 63, wherein the polypropylene has one or more of the following properties:
a melt flow ratio (MFR) of about 25 g/10 min to about 35 g/10 min, according to ASTM D1238 (230° C., 2.16 g);
an Izod impact strength of from about 70 J/m to about 85 J/m, at room temperature according to ASTM D256A; and
a flexural modulus of from about 1,200 MPa to about 1,350 MPa, according to ASTM D790A.

Clause 65. The method of any of clauses 60 to 64, further comprising compression molding the pellets.

Clause 66. The method of any of clauses 60 to 65, further comprising blending an antioxidant with the polypropylene and the copolymer, wherein the composition comprises about 1 wt % to 2 wt % of the antioxidant, based on the weight of the composition.

Clause 67. The method of any of clauses 60 to 66, wherein blending the polypropylene with the copolymer comprises mixing the polypropylene granules with the copolymer granules in a tumble blender to form a dry mix; and melting the dry mix in an extruder.

Clause 68. The method of any of clauses 60 to 67, wherein blending the polypropylene with the copolymer comprises mixing the polypropylene pellets with the copolymer pellets and melt blending in an extruder or batch mixer.

Clause 69. The method of any of clauses 60 to 68, wherein the composition Izod impact strength is about at least four times the polypropylene Izod impact strength, at room temperature according to ASTM D256A.

Clause 70. The composition of any of clauses 60 to 69, wherein the copolymer comprises branched vinyl/vinylidene-terminated high density polyethylene.

Clause 71. The method of any of clauses 60 to 70, further comprising blending a branched vinyl/vinylidene-terminated high density polyethylene with the polypropylene and the copolymer (and optional EP rubber).

Clause 72. The method of any of clauses 60 to 71, wherein the polypropylene has an average particle size of from about 0.17 µm to about 0.21 µm before blending.

Experimental

Characterization:

Differential Scanning Calorietry (DSC): Peak melting point, Tm, (also referred to as melting point), peak crystallization temperature, Tc, (also referred to as crystallization temperature), glass transition temperature (Tg), heat of fusion (ΔHf or Hf) of comb-block EP copolymers were measured using DSC using commercially available equipment such as a TA Instruments Q200 according to the procedure of ASTM D3418. Samples weighing approximately 5-10 mg were sealed in an aluminum hermetic sample pan. The DSC data was recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]* 100, where B is the heat of fusion for the 100% crystalline homopolymer of the major monomer component. These values for B are to be obtained from the *Polymer Handbook*, Fourth Edition, published by John Wiley and Sons, New York 1999, provided; however, that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of the polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Gel Permeation Chromatography—3D

If GPC-3D is specified, values for GPC-3D are found using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: Sun, T. et al. (2001)*Macromolecules*, v.34(19), pp. 6812-6820, and references therein. Three Polymer Laboratories PLgel 10 mm Mixed-B LS columns are used. The nominal flow rate is 0.5 cm$^3$/min, and the nominal injection volume is 300 μL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1,2,4 trichlorobenzene (TCB). The TCB mixture is then filtered through a 0.7 μm glass pre-filter and subsequently through a 0.1 μm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. For, the refractive index, n=1.500 for TCB at 145° C. and λ=690 nm. For purposes of the present disclosure and the claims thereto (dn/dc)=0.104 for propylene polymers, 0.098 for butene polymers and 0.1 otherwise. Units on parameters throughout this description of the SEC method are such that concentration is expressed in g/cm$^3$, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, *Light Scattering from Polymer Solutions*, Academic Press, 1971):

$$\frac{K_0 c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient [for purposes of the present disclosure, A2=0.0006 for propylene polymers, 0.0015 for butene polymers and 0.001 otherwise], (dn/dc)=0.104 for propylene polymers, 0.098 for butene polymers and 0.1 otherwise, P(θ) is the form factor for a monodisperse random coil, and $K_o$ is the optical constant for the system:

$$K_0 = \frac{4\pi^2 n^2 (dn/dc)^2}{\lambda^4 N_A}$$

where $N_A$ is Avogadro's number, and (dn/dc) is the refractive index increment for the system. For the refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the above SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromotographic slices, i, between the integration limits. The branching index $g'_{vis}$ is defined as:

$$g'vis = \frac{[\eta]_{avg}}{kM_v^\alpha}$$

where, for purpose of the present disclosure and claims thereto, $\alpha=0.695$ and $k=0.000579$ for linear ethylene polymers, $\alpha=0.705$ $k=0.000262$ for linear propylene polymers, and $\alpha=0.695$ and $k=0.000181$ for linear butene polymers. $M_v$ is the viscosity-average molecular weight based on molecular weights determined by LS analysis.

Molecular Weight, Comonomer Composition and Long Chain Branching Determination by Polymer Char GPC-IR Hyphenated with Multiple Detectors (GPC-4D)

For purposes of the claims, and unless otherwise indicated, the distribution and the moments of molecular weight (Mw, Mn, Mw/Mn, etc.), the comonomer content ($C_2$, $C_3$, $C_6$, etc.) and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-µm Mixed-B LS columns are used to provide polymer separation. Aldrich reagent grade 1,2,4-trichlorobenzene (TCB) with 300 ppm antioxidant butylated hydroxytoluene (BHT) is used as the mobile phase. The TCB mixture is filtered through a 0.1-µm Teflon filter and degassed with an online degasser before entering the GPC instrument. The nominal flow rate is 1.0 ml/min and the nominal injection volume is 200 µL. The whole system including transfer lines, columns, and detectors are contained in an oven maintained at 145° C. Given amount of polymer sample is weighed and sealed in a standard vial with 80 µL flow marker (Heptane) added to it. After loading the vial in the autosampler, polymer is automatically dissolved in the instrument with 8 ml added TCB solvent. The polymer is dissolved at 160° C. with continuous shaking for about 1 hour for most PE samples or 2 hour for PP samples. The TCB densities used in concentration calculation are 1.463 g/ml at room temperature and 1.284 g/ml at 145° C. The sample solution concentration is from 0.2 to 2.0 mg/ml, with lower concentrations being used for higher molecular weight samples. The concentration (c), at each point in the chromatogram is calculated from the baseline-subtracted IR5 broadband signal intensity (I), using the following equation: $c=\beta I$, where $\beta$ is the mass constant determined with PE or PP standards. The mass recovery is calculated from the ratio of the integrated area of the concentration chromatography over elution volume and the injection mass which is equal to the pre-determined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $\alpha_{PS}=0.67$ and $K_{PS}=0.000175$ while $\alpha$ and K are for other materials are as calculated as published in literature (Sun, T. et al. (2001) *Macromolecules*, v.34, pg. 6812), except that for purposes of the present disclosure and the claims thereto, $\alpha$ and K are 0.695 and 0.000579 respectively, for ethylene polymers; $\alpha$ and K are 0.705 and 0.0002288 respectively for propylene polymers; and $\alpha$ and K are 0.695 and 0.000579*(1-0.0075*wt % hexene comonomer), respectively, for ethylene-hexene copolymer.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. For the purposes of the claims of the present disclosure, comonomer compositions were determined by FTIR.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_0 c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=665 nm. For the ethylene-hexene copolymers analyzed, dn/dc=0.1048 ml/mg and $A_2$=0.0015.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from the equation $[\eta]=\eta_s/c$, where c is concentration and is determined from the IR5 broadband channel output. The viscosity MW at each point is calculated as $M=K_{PS}M^{\alpha_{PS}+1}/[\eta]$, where $\alpha_{PS}$ is 0.67 and $K_{PS}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'vis = \frac{[\eta]_{avg}}{kM_v^\alpha},$$

where $M_v$ is the viscosity-average molecular weight based on molecular weights determined by LS analysis and the K and a are for the reference linear polymer, which for purposes of the present disclosure and claims thereto, $\alpha=0.705$ k=0.000262 for linear propylene polymers, $\alpha=0.695$ and k=0.000181 for linear butene polymers. and $\alpha$ is 0.695 and K is 0.000579*(1-0.0075*wt % hexene comonomer) for ethylene-hexene copolymer and $\alpha=0.695$ and k=0.000579 for all other ethylene polymers. Concentrations are expressed in g/cm³, molecular weight is expressed in g/mole, and intrinsic viscosity is expressed in dL/g unless otherwise noted.

Stress Whitening Test (Modified ASTM 5420-04)

If "stress whitening" is specified, the method involves quantifying the stress whitening of plastic materials, for example, polypropylene and related color concentrates. The plastic composition is first injection molded into an ASTM 4 inch Gardner impact disk or plaque with thickness of 3.2±0.3 mm as specified in ASTM 5420-04. The molded samples are conditioned at 23±2° C. and 50±10% relative humidity for a minimum of 40 hours. The conditioned sample is then placed at the center of the Gardner Impact Tester platform (IG-1142).

A Gardner Impact Tester (IG-1142) is used with a 4 pound weight at a height of 5 inches above the surface of the sample. A four pound weight is raised at a height of 5 inches above the surface of the sample and dropped at the center of the sample. The sample is conditioned once again at 23±2° C. and 50±10% relative humidity for 24 hours.

The reconditioned, impacted sample is then tested using a Color Spectrophotometer, such as Hunter Lab Lab Scan XE or Greytag Macbeth Ci-5. The sample is tested at a point of impact and a non-impacted portion of the disk for L color readings in which L is a light to dark scale. The $L_A$ value is the color reading at the center (point of impact) of the disc and the $L_B$ is the average color reading at 4 points, each being one inch away from the center impact point (not impacted). Stress whitening is recorded as $\Delta L_1 = L_A - L_B$. Each composition will have three specimen tested and recorded as $\Delta L_1$, $\Delta L_2$ and $\Delta L_3$. The final stress whitening value $\Delta L = (\Delta L_1 + \Delta L_2 + \Delta L_3)/3$.

Modified Izod impact Testing ASTM D256A using injection molded samples.

Unless otherwise specified, the modified Izod impact test method as used herein, involves quantifying impact strength of compositions formed into injection molded samples. For example, four samples can be compounded using Tse-11 extruder machine and finished using antioxidants 1010 and 168. A talc filler can be used to prevent the modifiers from self-agglomerating during the process. The stabilized pellets are then introduced to injection molding equipment, such as BOY XS. The injection molded samples can be formed in for IZOD impact testing as shown in FIG. 4.

Figure 4:
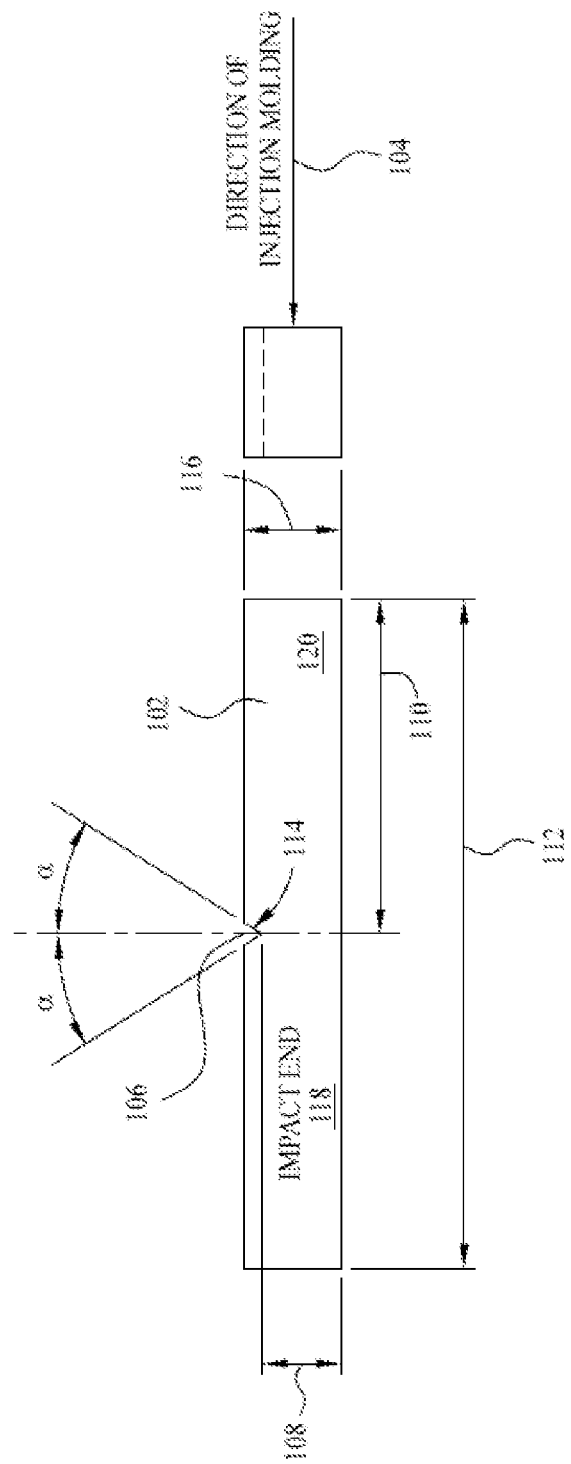
FIG. 4 depicts an exemplary injection molded sample used in Izod impact testing.

FIG. 4 depicts an exemplary injection molded sample 102. For example, the sample 102 is extruded from an injection molding machine (not shown), said sample having a longitudinal length 112 in the machine direction 104 and a width in the transverse direction 116. The impact end 118 of the sample is the end of the sample 102 that first exits the die of the injection molding machine and the machine end 120 is the portion of the sample that is the last to exit the injection molding machine. A notch 114 is placed on the sample at a distance 110 from the machine end at angles $\alpha$ outward at each direction from midpoint 106 of the notch 114 as depicted in FIG. 4. The dimensions are summarized in the table below. The samples can then be used to test for notched Izod impact based on ASTM D256A.

TABLE 2 injection molded sample dimensions.

| Dimension | Measurement (in) |
|---|---|
| 108 distance from long edge to notch | 0.4 |
| 110 distance from short edge to notch | 1.25 |
| 112 Length of sample | 2.5 |
| 114 Notch depth | 0.1 |
| 116 Width of sample | 0.5 |
| $\alpha$ angles of notch | 22.5° |

Long chain branching was determined using a Polymer Laboratories Model 220 high temperature GPC-SEC equipped with on-line differential refractive index (DRI), light scattering (LS), and viscometer (VIS) detectors (so called GPC-3D, Gel Permeation Chromatography-3 Detectors). It used three Polymer Laboratories PLgel 10 m Mixed-B columns for separation using a flow rate of 0.54 ml/min and a nominal injection volume of 300 μL. The detectors and columns were contained in an oven maintained at 135° C. The stream emerging from the size exclusion chromatography (SEC) columns was directed into the miniDAWN (Wyatt Technology, Inc.) optical flow cell and then into the DRI detector, or IR detector. The DRI detector was an integral part of the Polymer Laboratories SEC. The viscometer was inside the SEC oven, positioned after the DRI detector.

Molecular weights (number average molecular weight (Mn), weight average molecular weight (Mw), and z-average molecular weight (Mz)) were determined using Polymer Char GPC-IR. GPC-IR is a high temperature Gel Permeation Chromatograph or Size Exclusion Chromatograph (GPC/SEC) with an infrared detector, a built-in viscometer and a Multi-Angle Light Scattering (DAWN™ HELEOS™ II 8 or 18 angle of Wyatt Technology). This is also called GPC-4D, four detectors, since infrared detector measures both the concentration and composition. Counting concentration, composition, along with the viscosity from viscometer and the coil dimension from MALS (multi-angle light scattering), there are four parameters being measured using GPC-IR, hence, GPC-4D.

Extensional Viscosity Fixture: Extensional test was conducted at 190° C. on ARES instrument with extensional viscosity fixture (EVF), Hencky rate is set at 0.01, 0.1, 1 and 10/s. A nitrogen atmosphere was used to avoid oxidative degradation. Sample preparation: sample was compressed at 190 degree C. with 20 KN preheat 1 minute, heat 1 minute degassing 1 time on ARES instrument.

Polymerizations:

Polymerizations were carried out in a continuous stirred tank reactor system. A 1-liter Autoclave reactor was equipped with a stirrer, a pressure controller, and a water cooling/steam heating element with a temperature controller. The reactor was operated in liquid fill condition at a reactor pressure in excess of the bubbling point pressure of the reactant mixture, keeping the reactants in liquid phase. Isohexane and propylene were pumped into the reactors by Pulsa feed pumps. Ethylene flowed as a gas under its own pressure through a Brooks flow controller. Monomers (e.g., ethylene and propylene) feeds were combined into one stream and then mixed with a pre-chilled isohexane stream that had been cooled to at least 0° C. The mixture was then fed to the reactor through a single line. Scavenger solution was also added to the combined solvent and monomer stream just before it entered the reactor to further reduce any catalyst poisons. Similarly, catalyst solution was fed to the reactor using an ISCO syringe pump through a separated line.

An isohexane solution of tri-n-octyl aluminum (TNOA) (25 wt % in hexane, Sigma Aldrich) was used as scavenger solution. "Catalyst 2" was activated with N,N-dimethylanilinium tetrakis(heptafluoro-2-naphthyl)borate at a molar ratio of about 1:1 in 900 ml of toluene. "Catalyst 1" was activated with N,N-dimethyl anilinium tetrakis (pentafluorophenyl) borate at a molar ratio of about 1:1 in 900 ml of toluene.

Catalyst 1 is the catalyst compound having the following structure:

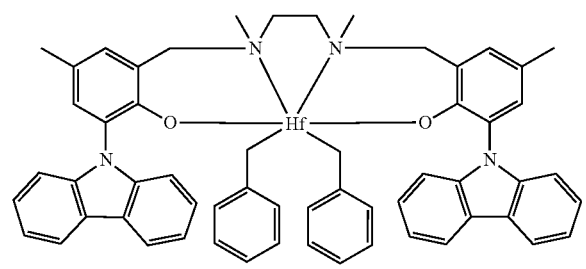

Catalyst 2 is the catalyst compound having the following structure:

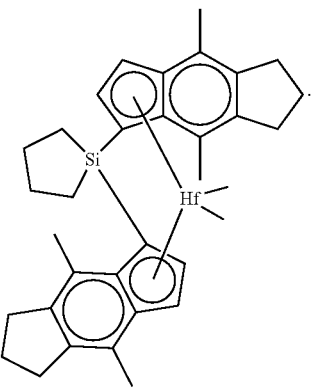

The polymer produced in the reactor exited through a back pressure control valve that reduced the pressure to atmospheric. This caused the unconverted monomers in the solution to flash into a vapor phase which was vented from the top of a vapor liquid separator. The liquid phase, comprising mainly polymer and solvent, was collected for polymer recovery. The collected samples were first air-dried in a hood to evaporate most of the solvent, and then dried in a vacuum oven at a temperature of about 90° C. for about 12 hours. The vacuum oven dried samples were weighed to obtain yields. Additional processing conditions for the polymerization process and the properties of the comb-block EP copolymers produced are shown in Table 3 below. "MFR" is melt flow rate, as measured according to ASTM D-1238.

The comb-block EP copolymer molecular structure is shown in Schematic 1 with HDPE as the side chain and flexible EP as the backbone.

Schematic 1. Diagram of comb-block copolymer structure.

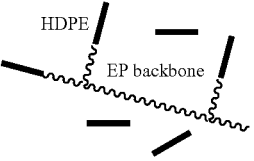

TABLE 3

| Polymerization | 1 | 2 | 3 | 4 | 5 | 6 |
|---|---|---|---|---|---|---|
| Temperature | 100 | 100 | 100 | 100 | 100 | 100 |
| Pressure (psig) | 350 | 350 | 350 | 350 | 350 | 350 |
| $C_2$ (SLPM) | 6 | 6 | 6 | 6 | 6 | 6 |
| $C_3$ (g/min) | 6 | 6 | 6 | 6 | 6 | 6 |
| Catalyst 2 (mol/min) | 3.043E−08 | 3.043E−08 | 3.043E−08 | 3.043E−08 | 3.043E−08 | 3.043E−08 |
| Catalyst 1 (mol/min) | 1.967E−08 | 2.622E−08 | 3.278E−08 | 9.833E−09 | 1.311E−08 | 1.639E−08 |
| Conversion (%) | 0.786 | 0.781 | 0.776 | 0.723 | 0.749 | 0.793 |
| MFR | 4.49 | 6.58 | 7.09 | | | |
| MFR HL | | | | 3.7 | 4.15 | 10.38 |
| Mn_DRI (g/mol) | 28,979 | 24,031 | 26,013 | | | |
| Mw_DRI (g/mol) | 95,878 | 86,290 | 87,108 | | | |
| Mz_DRI (g/mol) | 222,297 | 178,203 | 185,434 | | | |
| MWD | 3.31 | 3.59 | 3.35 | | | |
| Mn_LS (g/mol) | 34,788 | 30,489 | 31,634 | | | |
| Mw_LS (g/mol) | 105,782 | 99,358 | 98,444 | | | |

TABLE 3-continued

| Polymerization | 1 | 2 | 3 | 4 | 5 | 6 |
|---|---|---|---|---|---|---|
| Mz_LS (g/mol) | 218,973 | 227,576 | 214,474 | | | |
| Mn_IR (g/mol) | 26,417 | 25,467 | 24,651 | 71,445 | 67,276 | 51,729 |
| Mw_IR (g/mol) | 87,163 | 83,914 | 82,618 | 211,281 | 198,968 | 157,616 |
| Mz_IR (g/mol) | 205,093 | 190,164 | 186,058 | 432,947 | 409,765 | 337,867 |
| GPC · g'$_{vis}$ | 0.763 | 0.752 | 0.75 | | | |
| GPC_IR · g'$_{vis}$ | 0.737 | 0.742 | 0.739 | 0.825 | 0.819 | 0.785 |
| Ethylene (wt %) | 62.6% | 63.3% | 64.4% | 64.2% | 63.7% | 61.9% |

Figure 2A:
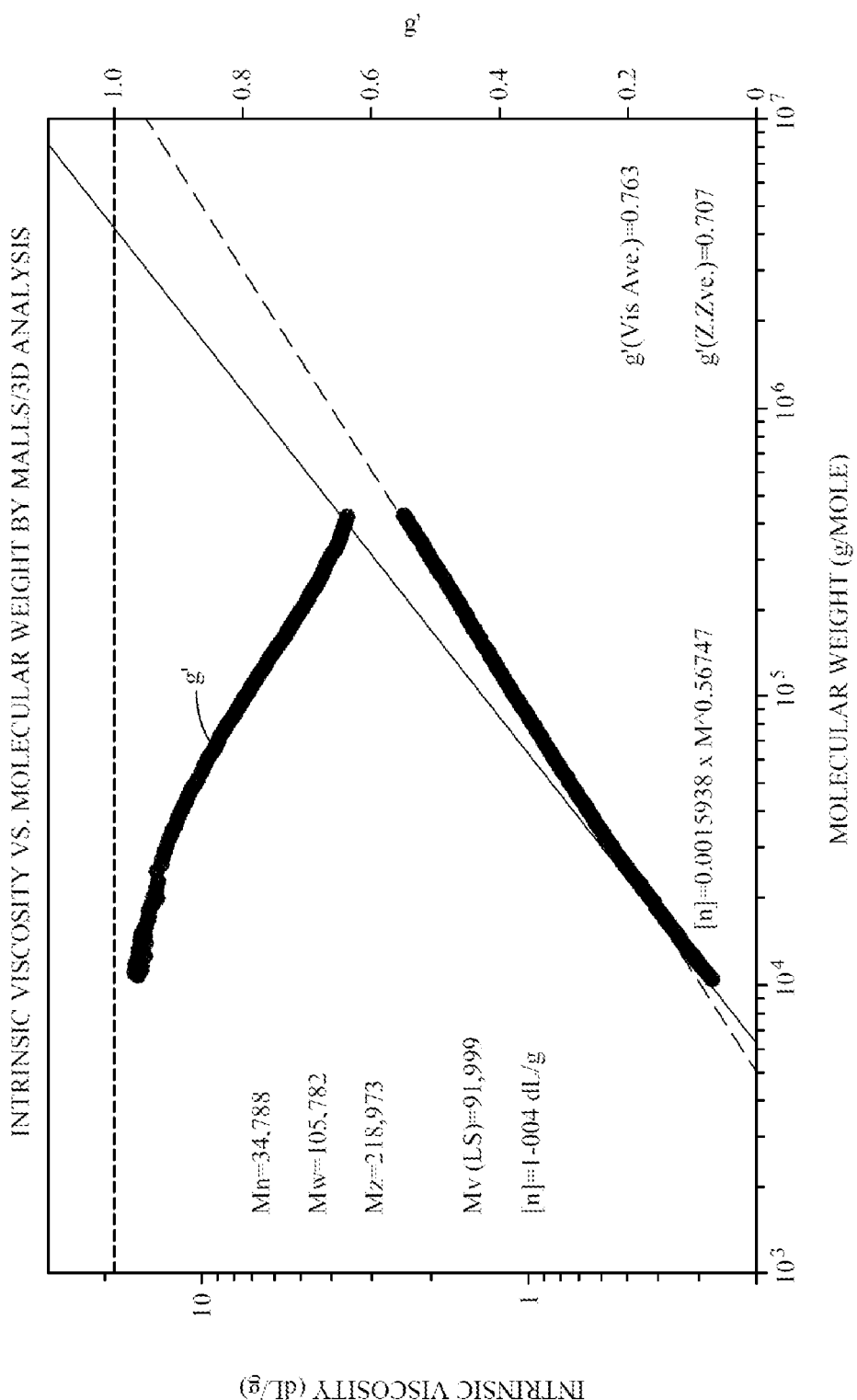
FIG. 2A is a graph illustrating intrinsic viscosity versus molecular weight by multi-angle light scattering/3D analysis of a comb-block ethylene-propylene copolymer, according to at least one embodiment.
Figure 2B:
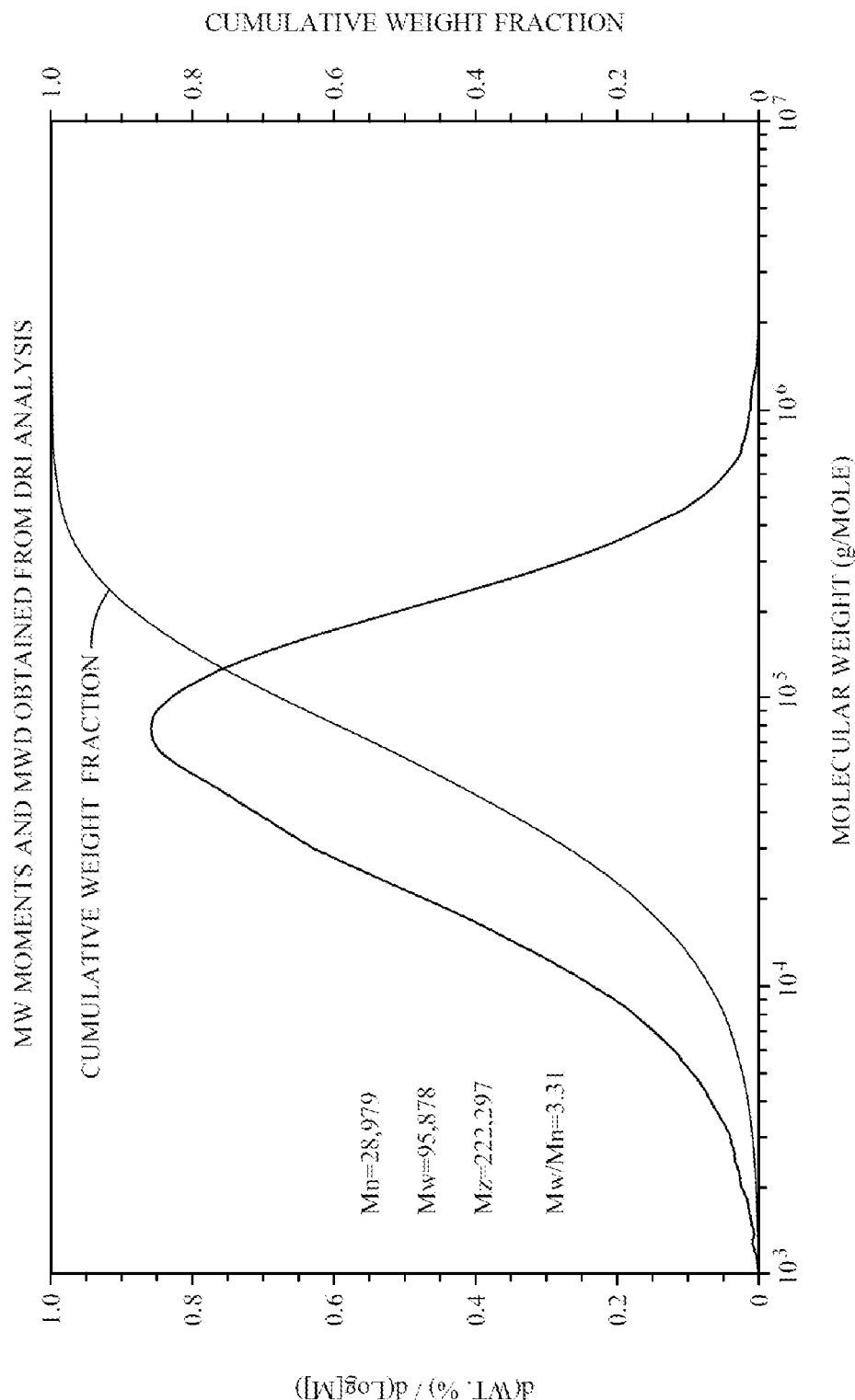
FIG. 2B is a graph illustrating molecular weight moments and molecular weight distribution obtained from differential refractive index analysis of a comb-block ethylene-propylene copolymer, according to at least one embodiment.
Figure 2C:
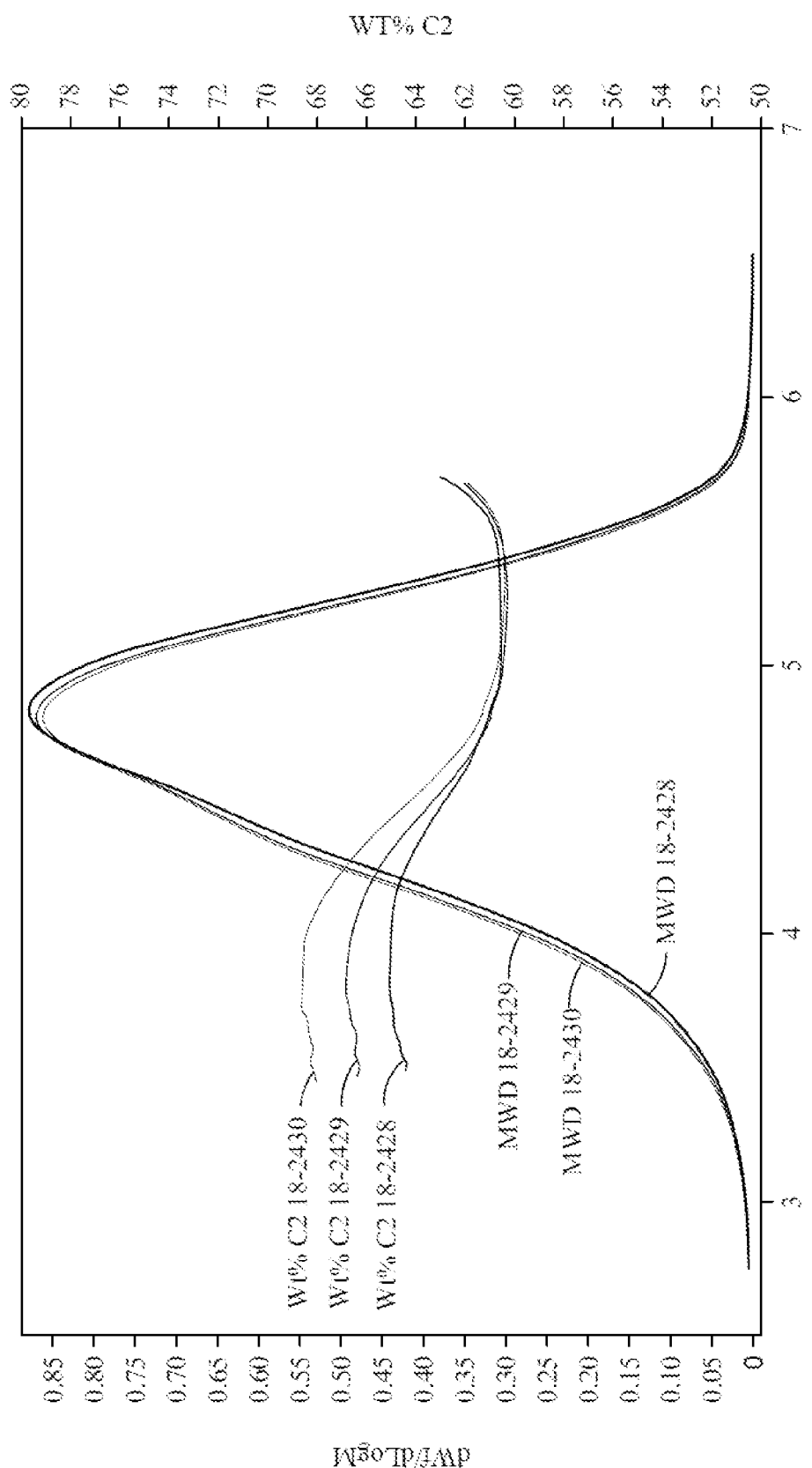
FIG. 2C is a graph illustrating gel permeation chromatography-3D and gel permeation chromatography-4D curves of a comb-block EP copolymer, according to at least one embodiment.
Figure 3:
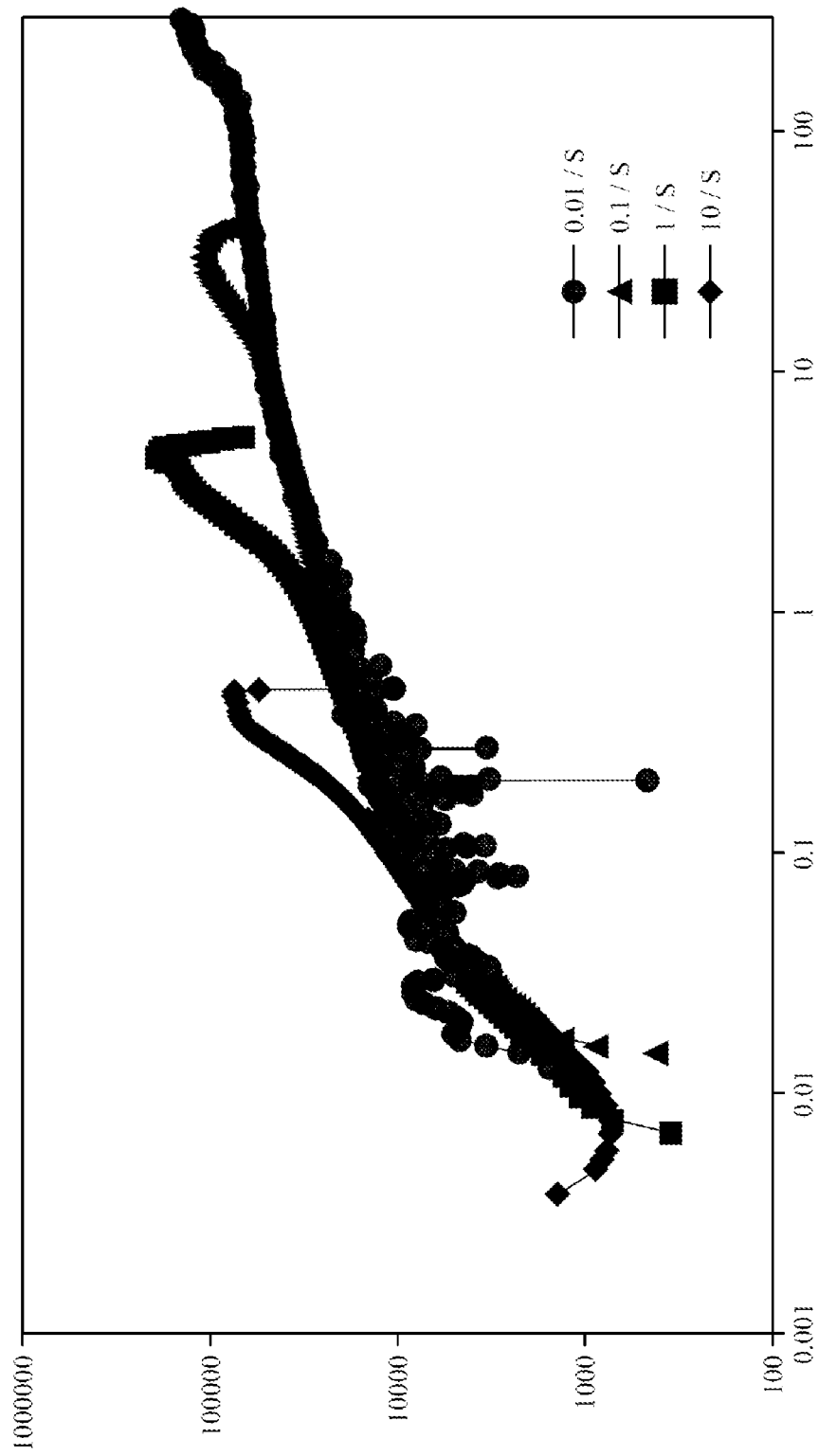
FIG. 3 is a graph illustrating extensional viscosity fixture testing results of a comb-block EP copolymer, according to at least one embodiment.

Results (1) Thermal properties:

Table 4 illustrates analytical results of the prepared comb-block EP copolymer. DSC and GPC data are shown in FIGS. 1-3. Comb-block EP copolymers had much higher Tm values and lower Tg values as compared to commercial Vistamaxx polymers (not shown). The clear crystallization peak in the DSC chromatograph reveals fast crystallization behavior of the prepared comb-block EP copolymers, which is different crystallization behavior than commercial Vistamaxx polymer. The expanded Tg-Tm window allows for potential applications of a comb-block EP copolymer in low temperature ductility, adhesion, compatibilization, use as compound modifiers, etc.

TABLE 4

Analytical results of the comb-block copolymer

| poly(HDPE-cb-EP) | Tg | Tm | Tc | Delta H (heats of melting) | Mw (GPC-3D) | PDI (GPC-3D) | C2% (IR) | g' (Z ave.) |
|---|---|---|---|---|---|---|---|---|
| Polymerization 1 | −60.9° C. | 82.6° C. | 65.7° C. | 11.3 J/g | 105,782 | 3.31 | 62.6% | 0.707 |
| Polymerization 2 | −60.3° C. | 80.3° C. | 63.4° C. | 13.6 J/g | 99,358 | 3.59 | 63.3% | 0.69 |
| Polymerization 3 | −62.2° C. | 79.5° C. | 63.6° C. | 21.1 J/g | 98,444 | 3.35 | 64.4% | 0.69 |

(2) LCB properties:

GPC curves (FIG. 2C, example of Polymerization 1) illustrated a narrow PDI (Mw/Mn) with one peak. A lower ethylene content at high Mw range indicates the incorporation of the HDPE side chain onto the EP backbone. Table 4 also illustrates a low g' value (less than 0.7) from GPC-3D, which indicates a high degree of branching of the comb-block EP copolymer. Also, the g' curve indicates a high degree of branching in the whole molecular weight range and an increased LCB degree with the increase of molecular weight. This feature provides extensional flow hardening which is a critical property for film blowing, thermoforming, extrusion casting, and foaming. Without being bound by theory, it is believed that the extensional flow hardening is provided by the HDPE side chains of the copolymer. Detailed Mw and LCB information could be seen from the GPC-3D and GPC-4D data in FIGS. 2A-2C.

To confirm the property of the LCB of the comb-block copolymer, EVF testing was conducted. FIG. 3 illustrates a high melt strength of the comb-block EP copolymer, which indicates potential applications in film blowing, thermoforming, extrusion casting, and foaming. Furthermore, Table 5 illustrates current uses of ethylene-propylene elastomers and some of the improvements provided by comb-block EP copolymers of the present disclosure.

TABLE 5

Typical applications of $C_2$-$C_3$ based elastomer, related properties' requirements and the opportunities of the new polymer of the present disclosure

| Current applications of $C_2$-$C_3$ based elastomer | Related Properties | Opportunities for comb-block EP copolymers |
|---|---|---|
| Compounding | Elasticity, compatibilization | Lower Tg, better compatiblization than linear copolymer |

TABLE 5-continued

Typical applications of $C_2$-$C_3$ based elastomer, related properties' requirements and the opportunities of the new polymer of the present disclosure

| Current applications of $C_2$-$C_3$ based elastomer | Related Properties | Opportunities for comb-block EP copolymers |
|---|---|---|
| PE-PP mixture recycle | Compatibilization | better compatiblization |
| Filler/color loading for master batch | Amorphous region | Long side chain enables more amorphous regions |
| Multilayer film | Adhesion, cling properties | HDPE side chain show good miscibility with other PE layer |
| Heavy layer mat | Higher filler loading | Long side chain enables more amorphous regions |
| Nonwovens | Softness, elasticity | Better elasticity, fast crystallization |
| Foam | High melt strength | Long side chain enables enhanced melt strength |
| Thermofoaming | Dispersion | Long chain enables better dispersion, better viscosity, etc. |

Overall, it was demonstrated that processes can be used to prepare a comb-block ethylene-propylene copolymer having ethylene-propylene backbone with HDPE side chains. The composition was prepared with a first catalyst precursor (a salan catalyst) and an activator and introduced to ethylene to form branched vinyl/vinylidene-terminated high density polyethylene. The branched vinyl/vinylidene-terminated high density polyethylene can then be introduced to ethylene, propylene, and a second catalyst precursor and an activator to form a comb-block EP copolymer with HDPE sidechain. The composition includes a poly(ethylene-propylene) backbone, and one or more branched high density polyethylene combs pendant to the backbone, where the whole composition has a branching index (g') of less than about 0.8. The expanded Tg-Tm window for the comb-block EP copolymer allows for potential applications in low temperature ductility, adhesion, compatibilization, compound modifiers, etc. In addition, the long chain branching of the comb-block EP copolymer provides high melt strength, which is beneficial for, at least, film blowing, thermoforming, extrusion casting, and foaming.

Compositions

Example 1. Impact and Stiffness Properties of hPP Modified with Comb-Block Copolymer Compositions of homopolymer blended with several grades of Vistamaxx with different weight averaged molecular weights were formulated and were compared with both the homopolymer and a composition of one embodiment of the present disclosure which included homopolymer and comb-block copolymer. Both Vistamaxx™ and PP1024 are available from ExxonMobil. The melt properties of each component are summarized in Table 6 below. For example, "MFR" is melt flow rate based on ASTM D1238 at 230° C. and using a 2.16 kg weight.

TABLE 6

Example 1 Materials Summary

| Grade | Ethylene (wt %) | MFR (g/10 min) ASTM D1238 | $M_w$ (GPC-3D) |
|---|---|---|---|
| PP 1024 (homo) | — | 13 | 209,100 |
| Vistamaxx 3980 | 9 | 8 | 195,297 |
| Vistamaxx 6202 | 15 | 20 | 136,501 |
| Vistamaxx 6102 | 17 | 3 | 231,192 |
| Component A | 62.6 | 7.13 | 105,782 |

As can be seen by Table 6, PP1024 was selected as the polypropylene homopolymer to be mixed with each of the grades of Vistamaxx and the comb-block copolymer. Nine compositions were prepared including 100 wt % PP1024 and mixtures of 90 wt % PP1024 with 10 wt % of each grade of Vistamaxx and Component A. The compositions were formed using a twin-screw extruder compounding machine at the following conditions: barrel temperatures at 165° C., 170° C., 175° C., 180° C., 185° C., 185° C., 158° C.; a die temperature of 190° C.; and a screw speed of 180 rpm. The composition was then pelletized and injection-molded into standard specimens. Notched Izod impact resistance was determined according to modified ASTM D256, at the specified temperature. A TMI Izod Impact Tester was used. Specimens were either cut individually from the center portion of injection-molded ASTM D638 Type I tensile bars, or pairs of specimens were made by cutting injection-molded ASTM D790 "Molding Materials (Thermoplastics and Thermosets)" bars in half. The notch was oriented such that the impact occurred on the notched side of the specimen (following Procedure A of ASTM D256) in most cases; where specified, the notch orientation was reversed (following Procedure E of ASTM D256). The thickness of each specimen was measured (typically about 0.122 inch) for calculation of the impact resistance. All breaks were complete, unless specified otherwise.

The specimens were then conditioned and tested for notched Izod impact strength at both room temperature (23° C.) and low temperature (−29° C.) in accordance with ASTM D256A. The Izod impact results are summarized in Table 7. Additionally, specimens of the compositions were also tested for flexural modulus (1% secant) and percent strain at break in accordance with modified ASTM D790A using ISO 37 TYPE 3. In particular, the test speed was set to 1.0 mm/min, and an average value was obtained from five specimens. The tensile test was performed according to ISO 37, 2005 method with test speed of 50.8 mm/min, and an average value was obtained from five specimens. The results are summarized in Table 8.

TABLE 7

Example 1 Impact Properties

| Sample Name | RTNI (J/m) | RTNI SD | LTNI (J/m) | LTNI SD |
|---|---|---|---|---|
| PP1024 | 19.010 | 1.869 | 16.020 | 1.015 |
| PP1024 + 5% VMX3980 | 24.083 | 1.869 | 15.860 | 0.801 |
| PP1024 + 5% VMX6202 | 35.778 | 2.937 | | |
| PP1024 + 5% VMX6102 | 27.554 | 2.617 | 15.166 | 0.427 |
| PP1024 + 5% Comp. A | 37.380 | 2.563 | 24.564 | 1.388 |
| PP1024 + 10% VMX3980 | 22.375 | 4.699 | 15.646 | 0.694 |
| PP1024 + 10% VMX6202 | 41.332 | 4.219 | | |
| PP1024 + 10% VMX6102 | 43.841 | 2.296 | 15.272 | 0.694 |
| PP1024 + 10% Comp. A | 51.905 | 3.524 | 26.273 | 1.015 |

As demonstrated in Table 7, Izod impact strength at room temperature ("RTNI") for the composition with 5 wt % comb-block copolymer is improved over the compositions with the same percentage of Vistamaxx. Moreover, at 10 wt % of comb-block copolymer, the RTNI is further improved and remains greater than the blends with the same amount of Vistamaxx. For example, the 10 wt % comb-block copolymer composition produced 26% higher impact strength results compared with 10 wt % Vistamaxx 6202, twice the impact results of the 10 wt % Vistamaxx 3980 (similar MFR to the comb-block copolymer), and also outperformed 10 wt % Vistamaxx 6102 which has the highest ethylene among the Vistamaxx grades. The low temperature notched Izod (LTNI) results for the 5 wt % comb-block copolymer and the 10 wt % comb-block copolymer demonstrated over at least 10% comparative improvement over the compositions with Vistamaxx.

TABLE 8

Example 1 Flexural Modulus and Strain @ Break Properties

| Sample Name | Flex Modulus (MPa) | Flex SD | Stain @ Break (%) | Strain SD |
|---|---|---|---|---|
| PP1024 | 1279.25 | 15.81 | 637.47 | 26.70 |
| PP1024 + 5% VMX3980 | 1035.89 | 25.32 | 414.48 | 19.15 |
| PP1024 + 5% VMX6202 | 1067.19 | 25.73 | 426.02 | 1.08 |
| PP1024 + 5% VMX6102 | 992.32 | 26.30 | | |
| PP1024 + 5% Comp. A | 1139.24 | 40.85 | 466.16 | 2.26 |
| PP1024 + 10% VMX3980 | 901.08 | 42.05 | 451.16 | 18.43 |
| PP1024 + 10% VMX6202 | 926.72 | 18.18 | 457.16 | 2.51 |
| PP1024 + 10% VMX6102 | 902.47 | 9.65 | | |
| PP1024 + 10% Comp. A | 1035.89 | 25.32 | 481.27 | 4.21 |

When tested for flexural modulus and strain @ break, the composition with 5 wt % comb-block copolymer significantly retained stiffness properties when compared to the blends with 5 wt % Vistamaxx. Although the addition of 10 wt % comb-block copolymer reduced the flexural modulus results compared with PP1024 homopolymer, the reduction was substantially less than the reduction seen in the blends with 10 wt % Vistamaxx.

Example 2A. Impact and Stiffness Properties of ICP Modified with Comb-Block Copolymer Compositions of ICP blended with common modifiers of ICP including Vistalon™ and Exact™ were formulated and were compared with both the ICP without modifier and a composition of one embodiment of the present disclosure which included ICP and comb-block copolymer. Vistalon™ 785 is about 50/50 EP rubber by weight and similar to the composition of the backbone of the comb-block copolymer. Comparisons were included with a blend that included Vistalon™ in order to understand the effect of the HDPE side chain of the comb-block copolymer on the final compound. Exact™ 9371 is an ethylene-butene copolymer with comparable viscosity with the comb-block copolymer, and was used to understand the effect of the comb-block copolymer on toughening. Both Exact™ 9371 and Vistalon™ 785 are available from ExxonMobil. The grades and other materials are summarized in Table 9.

TABLE 9

Example 2A Materials and Properties

| Material grade | Category | MFR g/10 min (230° C., 2.16 kg) |
|---|---|---|
| AP03B | ICP | 30 |
| Vistalon ™ 785 | Impact modifier | n/a |
| Exact ™ 9371 | Impact modifier | 4.5 MI (190° C., 2.16 kg) |
| EP-cb-HDPE | Impact modifier | 7 |
| Talc | filler | n/a |
| AO1010/AO168 | Antioxidant | n/a |

TABLE 10

Blends

| | AP03B | Vistalon 785 | Exact 9371 | EP-cb-HDPE | Talc | AO1010/AO168 | Avg. Particle Size (µm) |
|---|---|---|---|---|---|---|---|
| 1 | 98.52 | | | | 0.5 | 0.5/0.5 | 0.190 |
| 2 | 88.7 | 9.8 | | | 0.5 | 0.5/0.5 | 0.427 |
| 3 | 88.7 | | 9.8 | | 0.5 | 0.5/0.5 | 0.283 |
| 4 | 88.7 | | | 9.8 | 0.5 | 0.5/0.5 | 0.442 |

Four samples were produced using a compounding process using Tse-11 extruder machine and finished using antioxidants Irganox1010 and Irgafos168 (available from BASF). A talc filler was used to prevent the modifiers from self-agglomerating during the process. The stabilized pellets are then introduced to injection molding equipment, BOY XS. The flex modulus test was conducted using ASTM D790A with ISO 37 TYPE 3 specimen and the Izod impact test was conducted using methods based on ASTM D256A using injection molded samples as described in FIG. 4. Four sample compositions were produced each with 10 wt % modifier and 90 wt % of polypropylene impact copolymer (ICP) (grade AP03B, available from ExxonMobil) of the total polymer content. The blends are summarized in Table 10.

Table 11 summarizes the flexural modulus and Izod impact properties for the samples. As can be seen, each of the samples with modifiers show a comparable decrease of flexural modulus results. However, when comparing the Izod Impact results, the composition with comb-block copolymer performed significantly better than the other samples with an improvement over neat ICP by about 7 to 8 times, which is nearly double the improvement seen with the other modifiers.

TABLE 11

Example 2A Physical Properties

| | Flex | | | | Izod | | | |
|---|---|---|---|---|---|---|---|---|
| | +None | +Vistalon 785 | +Exact 9371 | +EP-g-HDPE | +None | +Vistalon 785 | +Exact 9371 | +EP-g-HDPE |
| Value | 1215 | 1024 | 1026 | 1009 | 79.3 | 352.9 | 344.7 | 576.2 |
| Stdev | 7 | 15 | 10 | 37 | 4.9 | 131.4 | 126.1 | 11.8 |

To better understand the reasoning for improved impact strength, each of the blends was evaluated under atomic force microscopy (AFM) and analyzed to measure average particle size. As can be seen in Table 10, the composition with comb-block copolymer has an increased average domain size of about 2.3 times the average particle size of neat ICP. The increase is larger than any of the other samples. Without being bound by any particular theory, it is believed that the increase in rubber domain sizes help absorb more energy, thus improving impact properties. The morphology comparisons of neat ICP, ICP+Vistalon 785, ICP+Exact 9371, and ICP+comb-block copolymer provide additional insight on a possible theory to explain the improved impact performance. Without being bound by theory, compared with other impact modifiers and neat ICP, adding comb-block copolymer gives rise to a hard core surrounded by dangling moieties ("tentacles") visible by microscopy, which are believed to be attributed to the crystalized portion of the comb-block copolymer. The unique comb structure provides the EP backbone that is miscible with the rubber domain of ICP, and HDPE side chain that is generally not miscible with rubbers. Thus, it is further believed that the HDPE side chains tend to aggregate and form rigid crystals in the rubber phase. The effect is an increase rubber domain size with crystallization, improving impact properties.

Example 2B. Stress Whitening Properties of ICP Modified with Comb-Block Copolymer In addition to improved impact strength, ICP polymers can be modified to improve stress whitening. Common modifiers that are often used include HDPE and Vistamaxx™. For the purposes of comparison, compositions of ICP (grade AP03B) blended with 10 wt % Vistamaxx and ICP blended with 10 wt % HDPE were formulated and were compared with both the ICP without modifier and a composition of one embodiment of the present disclosure which included ICP and comb-block copolymer (EP-cb-HDPE). The samples were produced using a compounding process using Tse-11 extruder machine and finished using antioxidants 1010 and 168. A talc filler was used to prevent the modifiers from self-agglomerating during the process. The stabilized pellets were then introduced to injection molding equipment, BOY XS. Each of the materials used are summarized in Table 12.

TABLE 12

Example 2B Material Grade and Properties

| Material grade | Category | MFR g/10 min |
| --- | --- | --- |
| AP03B | ICP | 30 |
| Vistamaxx ™ 3000 | modifier | 7 |
| Vistamaxx ™ 6202 | modifier | 20 |
| EP-cb-HDPE | modifier | 7 |
| HDPE HTA 108 | modifier | 0.7 g/10 min MI (190° C. 2.16 kg) |

Stress whitening test plaques were prepared with an average thickness of 2 mm through compounding and compression molding. The center of the plaques were impacted using a Gardner ambient impact tester in which a 4 lb. metallic ball is dropped directly onto the center of the plaques from a height of 5 inches. The whiteness was measured at the point of impact of the plaque and at a portion of the plaque that was not impacted using a colorimeter. $L_A$ is the color measurement at the center of the plaque and $L_B$ is the average of the color measurements taken an inch away from the center at four different points of the plaque. These measurements were performed on three plaques per composition and averaged to produce the values summarized in Table 13. The difference in color measurements are depicted by $\Delta L$ which is also shown in Table 13.

TABLE 13

Example 2B Color Results

| Blend | $L_A$ | $L_B$ | Color, $\Delta L$ | SD |
| --- | --- | --- | --- | --- |
| AP03B | 85.19 | 65.49 | 19.71 | 1.059 |
| +Vistamaxx 3000 | 85.44 | 63.52 | 21.92 | 0.748 |
| +Vistamaxx 6202 | 87.21 | 65.98 | 21.23 | 0.228 |
| +HDPE HTA 108 | 88.97 | 75.82 | 13.4 | 0.728 |
| +EP-cb-HDPE | 89.41 | 87.17 | 2.24 | 0.311 |

The results of Table 13 show that there was no significant difference when adding 10 wt % Vistamaxx™ as a modifier. Although Vistamaxx™ is a common solution for ICP stress reduction, the results show that Vistamaxx™ involves more than 10 wt % of Vistamaxx™ to be effective, which is often costly and affects physical properties other than just stress whitening.

The stress whitening of the composition with HDPE HTA 108 showed a stress whitening decrease of about 32% when compared with neat ICP. The addition of HDPE has been provided in the industry as a solution to whitening. When HDPE is added to ICP, a core-shell morphology is formed as the HDPE is encapsulated by the EP rubber portion of the ICP. Thus, the whitening decrease may be attributed to the difference in the shrinkage between ICP and ICP/PE blends. However, processing is an issue as HDPE may not be encapsulated by EP rubber as easily through injection molding.

The stress whitening of the samples with comb-block copolymer showed an even greater decrease of about 89% when compared with neat ICP. Comb-block copolymer used as a modifier for ICP has the effect of improving stress whitening. Due to its unique EP backbone structure and HDPE side chain, the comb-block copolymer can have an affinity to EP rubber, and thus can be encapsulated by EP rubber to form a core-shell morphology. Without being bound by theory, it is believed that the comb-block structure can increase the shrinkage of the EP rubber which reduces the shrinkage differences between the matrix and the dispersed phase which in turn, lowers the stress applied on the interface between the PP matrix and EP rubber. Moreover, HDPE side chains tend to aggregate and form rigid crystals in the rubber phase since they are not miscible in rubber, which can be seen by the fringed-micelle structure revealed by AFM morphology analysis. The propylene rich components in the core are pushed outwards to the interface between EP rubber and the homopolypropylene matrix of the ICP to form bridges. Interfacial adhesion between the dispersed phase and the matrix in ICP is therefore improved which is beneficial for stress whitening reduction.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while some embodiments have been illustrated and described, various modifications can be made without departing from the spirit and scope of the disclosure. Accordingly, it is not intended that the disclosure be limited thereby. Likewise, the term "comprising" is considered synonymous with the term "including." Likewise whenever a composition, an element or a group of elements is preceded with the transitional phrase "comprising", it is understood that we also contemplate the same composition or group of elements with transitional phrases "consisting essentially of," "consisting of", "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A copolymer comprising:
a first block comprising an ethylene-propylene copolymer; and
a second block comprising a high density polyethylene.

2. The copolymer of claim 1, wherein the copolymer comprises a plurality of blocks comprising a high density polyethylene.

3. The copolymer of claim 1, wherein the ethylene-propylene copolymer has a propylene content of from 75 wt % to 95 wt %, based on the weight of the ethylene-propylene copolymer, as determined by Fourier-transform infrared spectroscopy.

4. The copolymer of claim 1, wherein the ethylene-propylene copolymer has an ethylene content of from 5 wt % to 25 wt %, based on the weight of the ethylene-propylene copolymer, as determined by Fourier-transform infrared spectroscopy.

5. The copolymer of claim 1, wherein the ethylene-propylene copolymer has a weight average molecular weight of from 50,000 g/mol to 300,000 g/mol, based on the molecular weight of the ethylene-propylene copolymer, as determined by gel permeation chromatography-4D.

6. The copolymer of claim 1, wherein the high density polyethylene has a branching index (g') of from 0.8 to 0.95, as determined by gel permeation chromatography-4D.

7. The copolymer of claim 1, wherein the copolymer has a branching index (g') of from 0.4 to 0.8, as determined by gel permeation chromatography-4D.

8. A polyethylene composition comprising:
the copolymer of claim 1; and
a branched vinyl/vinylidene-terminated high density polyethylene.

9. The composition of claim 8, wherein the branched vinyl/vinylidene-terminated high density polyethylene has a number average molecular weight (Mn) of from 5,000 g/mol to 30,000 g/mol, as determined by gel permeation chromatography-4D.

10. The composition of claim 9, wherein the branched vinyl/vinylidene-terminated high density polyethylene has a branching index (g') of from 0.8 to 0.95, as determined by gel permeation chromatography-4D.

11. The composition of claim 10, wherein the branched vinyl/vinylidene-terminated high density polyethylene has a level of allyl terminal groups (vinyl and/or vinylidene) of greater than 90% relative to all unsaturated chain ends of the branched vinyl/vinylidene-terminated high density polyethylene, as determined by $^1$H nuclear magnetic spectroscopy.

12. The composition of claim 11, wherein the branched vinyl/vinylidene-terminated high density polyethylene has an Mw/Mn value from 2.0 to 3.2, as determined by gel permeation chromatography-4D.

13. The composition of claim 8, wherein the polyethylene composition has a number average molecular weight (Mn) of from 20,000 g/mol to 100,000 g/mol, as determined by gel permeation chromatography-4D.

14. The composition of claim 8, wherein the polyethylene composition has a weight average molecular weight (Mw) of from 50,000 g/mol to 200,000 g/mol, as determined by gel permeation chromatography-4D.

15. The composition of claim 8, wherein the polyethylene composition has a molecular weight distribution (Mw/Mn) of from 2 to 10, as determined by gel permeation chromatography-4D.

16. The composition of claim 8, wherein the polyethylene composition has a branching index (g') of from 0.6 to 0.85, as determined by gel permeation chromatography-4D.

17. The composition of claim 8, wherein the polyethylene composition has an ethylene content of from 50 wt % to 90 wt %, based on the weight of the polyethylene composition, as determined by Fourier-transform infrared spectroscopy.

18. The composition of claim 8, wherein the polyethylene composition has a propylene content of from 20 wt % to 50 wt %, based on the weight of the polyethylene composition, as determined by Fourier-transform infrared spectroscopy.

19. The composition of claim 8, wherein the polyethylene composition has a peak melting temperature (Tm) of from 75° C. to 85° C., as determined by differential scanning calorimetry.

20. The composition of claim 8, wherein the polyethylene composition has a heat of crystallization (Tc) of from 60° C. to 70° C., as determined by differential scanning calorimetry.

21. The composition of claim 8, wherein the polyethylene composition has a glass transition temperature (Tg) of from −65° C. to −55° C., as determined by differential scanning calorimetry.

22. The composition of claim 8, wherein the polyethylene composition has a density of from 0.935 g/cm$^3$ to 0.955 g/cm$^3$, as determined by ASTM D1505.

23. The composition of claim 8, wherein the polyethylene composition has a melt strength (at 190° C.) of from 1 cN to 50 cN.

24. A process for producing a polyethylene composition comprising:
polymerizing ethylene, at a temperature of at least 100° C., by introducing the ethylene to a first catalyst system comprising a first catalyst compound and a first activator to form a branched vinyl/vinylidene-terminated high density polyethylene;
introducing the branched vinyl/vinylidene-terminated high density polyethylene to additional ethylene, propylene, and a second catalyst system comprising a second catalyst compound and a second activator; and
obtaining the polyethylene composition, the polyethylene composition comprising:
a copolymer comprising:
a first block comprising an ethylene-propylene copolymer, and
a second block comprising a high density polyethylene; and
a branched vinyl/vinylidene-terminated high density polyethylene.

25. The process of claim 24, wherein the first catalyst compound is represented by Formula (I):

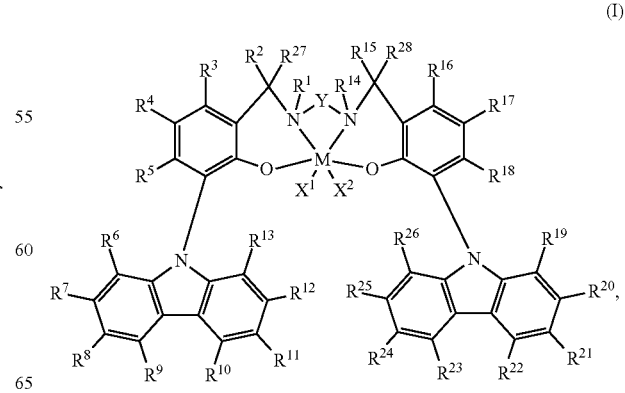

wherein:
M is a Group 3, 4, 5 or 6 transition metal chemically bonded to each oxygen atom and each nitrogen atom;
each of $X^1$ and $X^2$ is independently a univalent $C_1$ to $C_{20}$ hydrocarbyl radical, a functional group comprising elements from Groups 13 to 17 of the periodic table of the elements, or $X^1$ and $X^2$ join together to form a $C_4$ to $C_{62}$ cyclic or polycyclic ring structure;
each of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$ and $R^{28}$ is independently a hydrogen, a Ci to $C_{40}$ hydrocarbyl, a functional group comprising elements from Group 13 to 17 of the periodic table of the elements, or independently, may join together to form a $C_4$ to $C_{62}$ cyclic or polycyclic ring structure, or a combination thereof; and
Y is a divalent hydrocarbyl radical.

26. The process of claim 24, wherein the second catalyst compound is represented by Formula (IV):

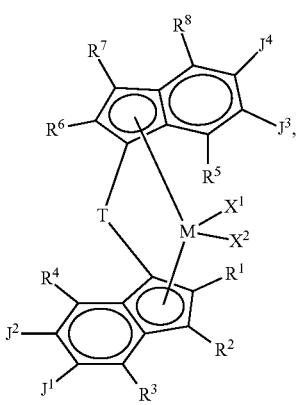

(IV)

wherein:
M is a Group 4 metal such as Hf, Zr, or Ti;
T is a bridging group;
each of $X^1$ and $X^2$ is a univalent anionic ligand, or $X^1$ and $X^2$ are joined to form a metallocycle ring;
each of $R^1$, $R^2$, $R^3$, $R^4$, $R^5$, $R^6$, $R^7$, $R^8$ is independently selected from the group consisting of hydrogen, a halogen, an unsubstituted $C_1$-$C_{40}$ hydrocarbyl, a $C_1$-$C_{40}$ substituted hydrocarbyl, an unsubstituted $C_4$-$C_{62}$ aryl, a substituted $C_4$-$C_{62}$ aryl, an unsubstituted $C_4$-$C_{62}$ heteroaryl, a substituted $C_4$-$C_{62}$ heteroaryl, —$NR'_2$, —SR', —OR, —$SiR'_3$, —$OSiR'_3$, —$PR'_2$, or —R"—$SiR'_3$, wherein R" is $C_1$-$C_{10}$ alkyl and each R' is hydrogen, halogen, $C_1$-$C_{10}$ alkyl, or $C_6$-$C_{10}$ aryl;

$J^1$ and $J^2$ are joined to form a substituted or unsubstituted $C_4$-$C_{62}$ saturated or unsaturated cyclic or polycyclic ring structure, or a combination thereof; and
$J^3$ and $J^4$ are joined to form a substituted or unsubstituted $C_4$-$C_{62}$ saturated or unsaturated cyclic or polycyclic ring structure, or a combination thereof.

27. The process of claim 26, wherein, for the second catalyst compound represented by Formula (IV), T is $Si(CH_2)_4$, each of $J^1$ and $J^2$ and $J^3$ and $J^4$ are joined to form an unsubstituted $C_5$ saturated cyclic ring, each of $R^3$, $R^4$, $R^5$, and $R^8$ is methyl, and each of $R^1$, $R^2$, $R^6$, and $R^7$ is hydrogen.

28. The process of claim 24, wherein the first activator is a borate activator and the second activator is a borate activator.

29. The process of claim 24, wherein the polyethylene composition has:
an ethylene content of from 60 wt % to 70 wt %, based on the weight of the polyethylene composition, as determined by Fourier-transform infrared spectroscopy; and
a propylene content of from 30 wt % to 40 wt %, based on the weight of the polyethylene composition, as determined by Fourier-transform infrared spectroscopy.

30. The process of claim 24, wherein the polyethylene composition has one or more of the following properties:
a number average molecular weight (Mn) of from 25,000 g/mol to 40,000 g/mol, as determined by gel permeation chromatography;
a weight average molecular weight (Mw) of from 25,000 g/mol to 100,000 g/mol, as determined by gel permeation chromatography;
a z-average molecular weight (Mz) of from 175,000 g/mol to 250,000 g/mol, as determined by gel permeation chromatography;
a molecular weight distribution (Mw/Mn) of from 3 to 4, as determined by gel permeation chromatography;
a branching index (g') of from 0.65 to 0.8, as determined by gel permeation chromatography;
a peak melting temperature (Tm) of from 75° C. to 85° C., as determined by differential scanning calorimetry;
a heat of crystallization (Tc) of from 60° C. to 70° C., as determined by differential scanning calorimetry;
a glass transition temperature (Tg) of from −65° C. to −55° C., as determined by differential scanning calorimetry;
a density of from 0.935 g/cm³ to 0.955 g/cm³, as determined by ASTM D1505; or
a melt strength (at 190° C.) of from 5 cN to 15 cN.

* * * * *